Feb. 15, 1949. J. FOSSA 2,461,889
MACHINE AND METHOD FOR MANUFACTURE OF SHOES
Filed July 19, 1944 42 Sheets-Sheet 1

Witness
Jas. J. Maloney

Inventor
Joseph Fossa
by Maxwell Fish
Atty.

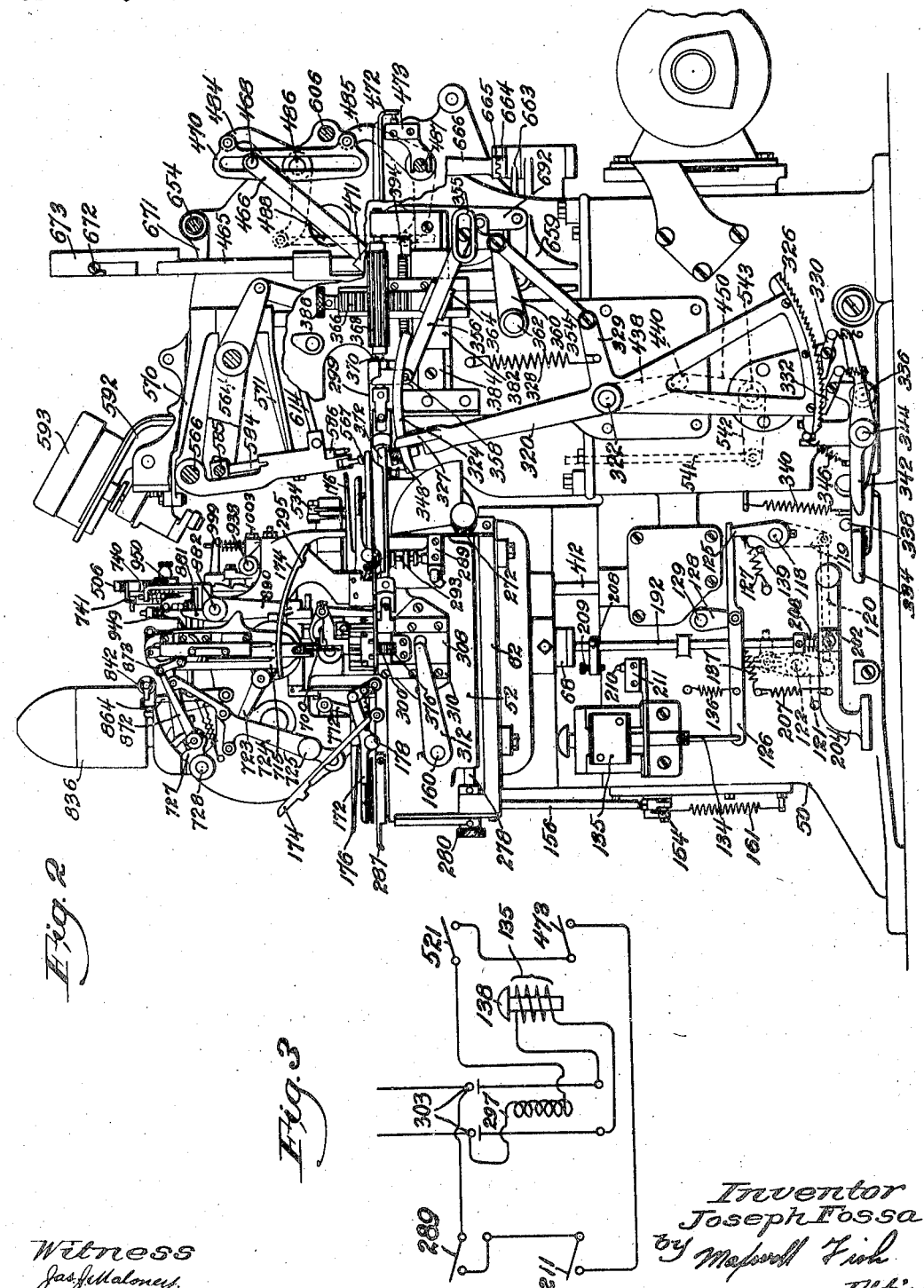

Feb. 15, 1949.   J. FOSSA   2,461,889
MACHINE AND METHOD FOR MANUFACTURE OF SHOES
Filed July 19, 1944   42 Sheets-Sheet 3

Witness
Jos. F. Maloney

Inventor
Joseph Fossa
by Maxwell Fish
Atty.

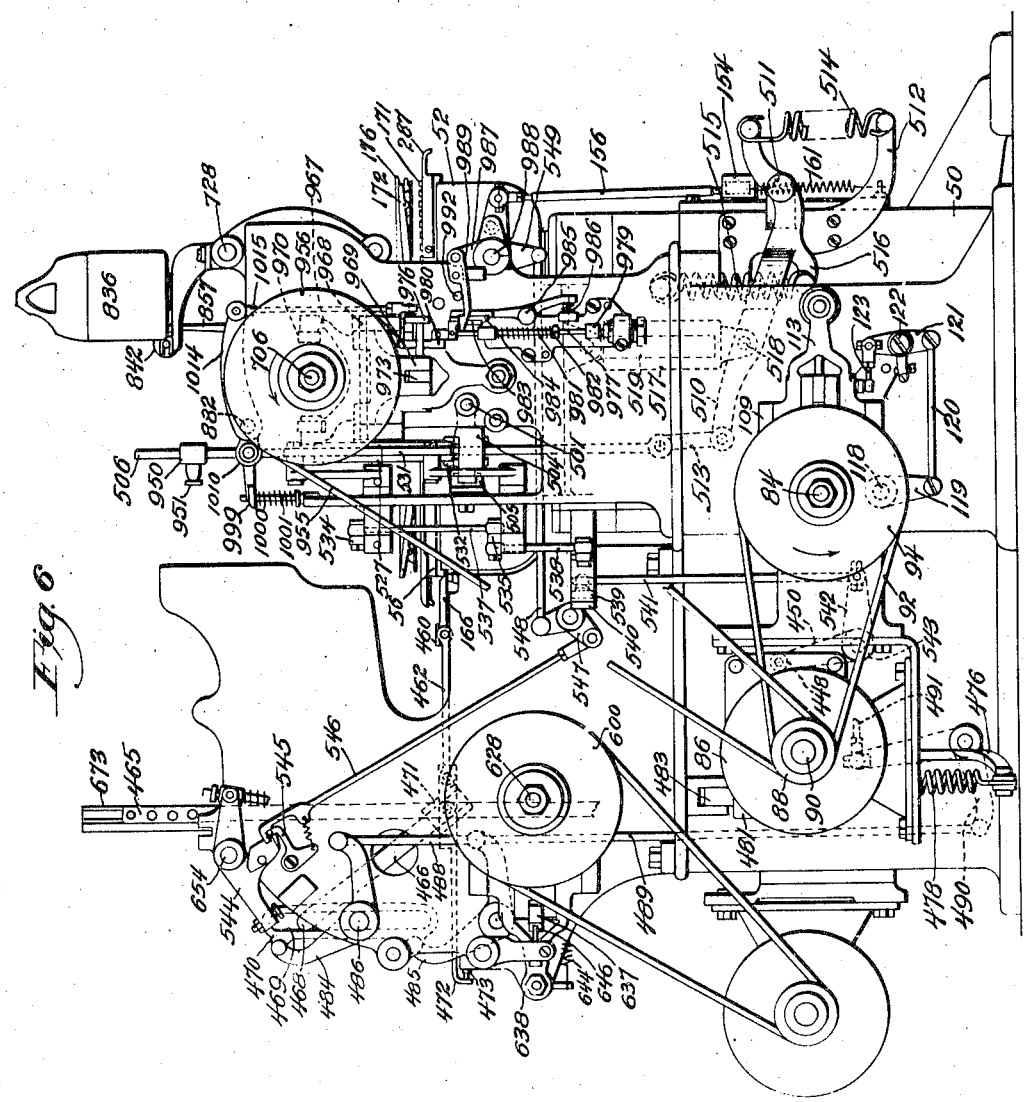

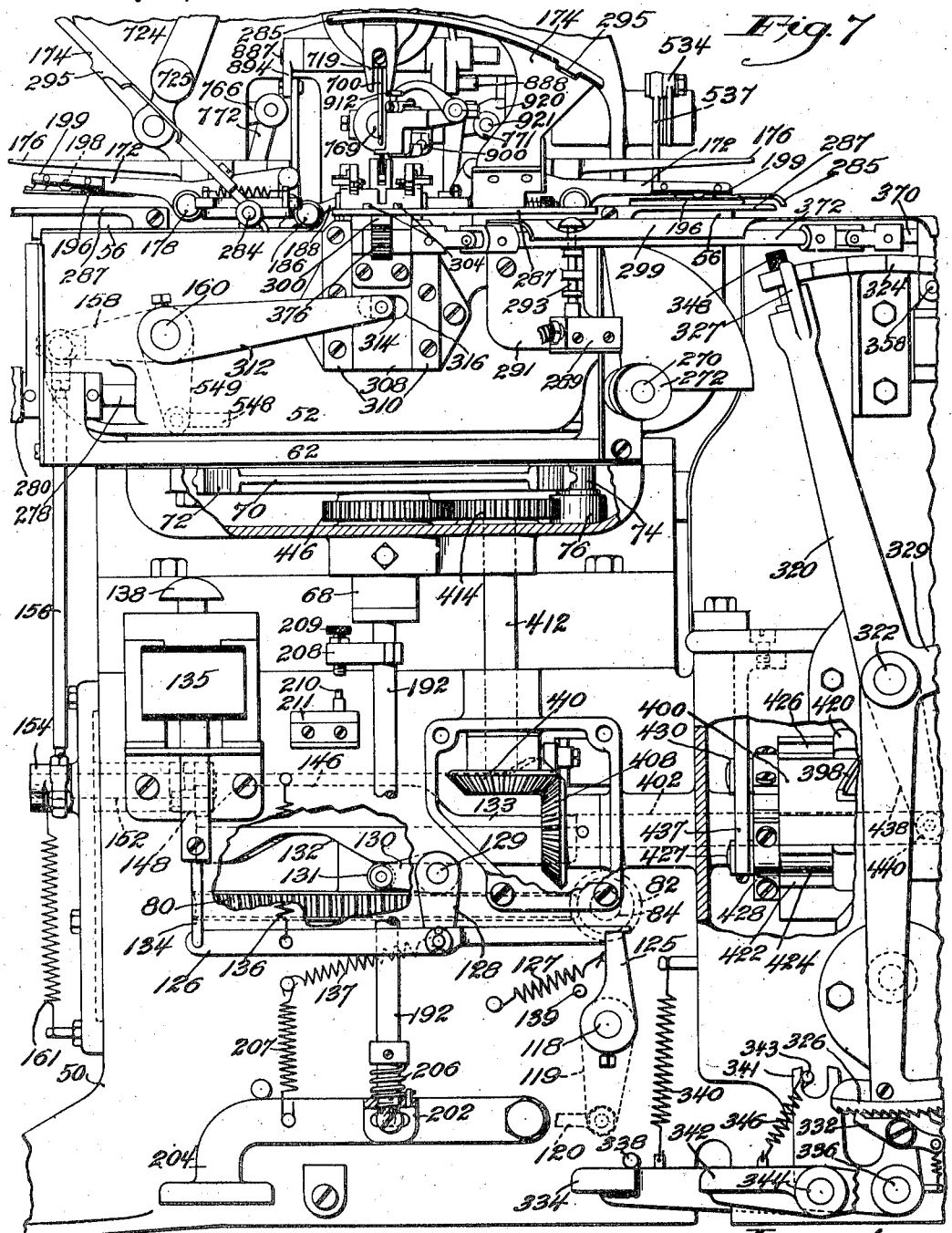

Feb. 15, 1949.   J. FOSSA   2,461,889
MACHINE AND METHOD FOR MANUFACTURE OF SHOES
Filed July 19, 1944   42 Sheets-Sheet 6
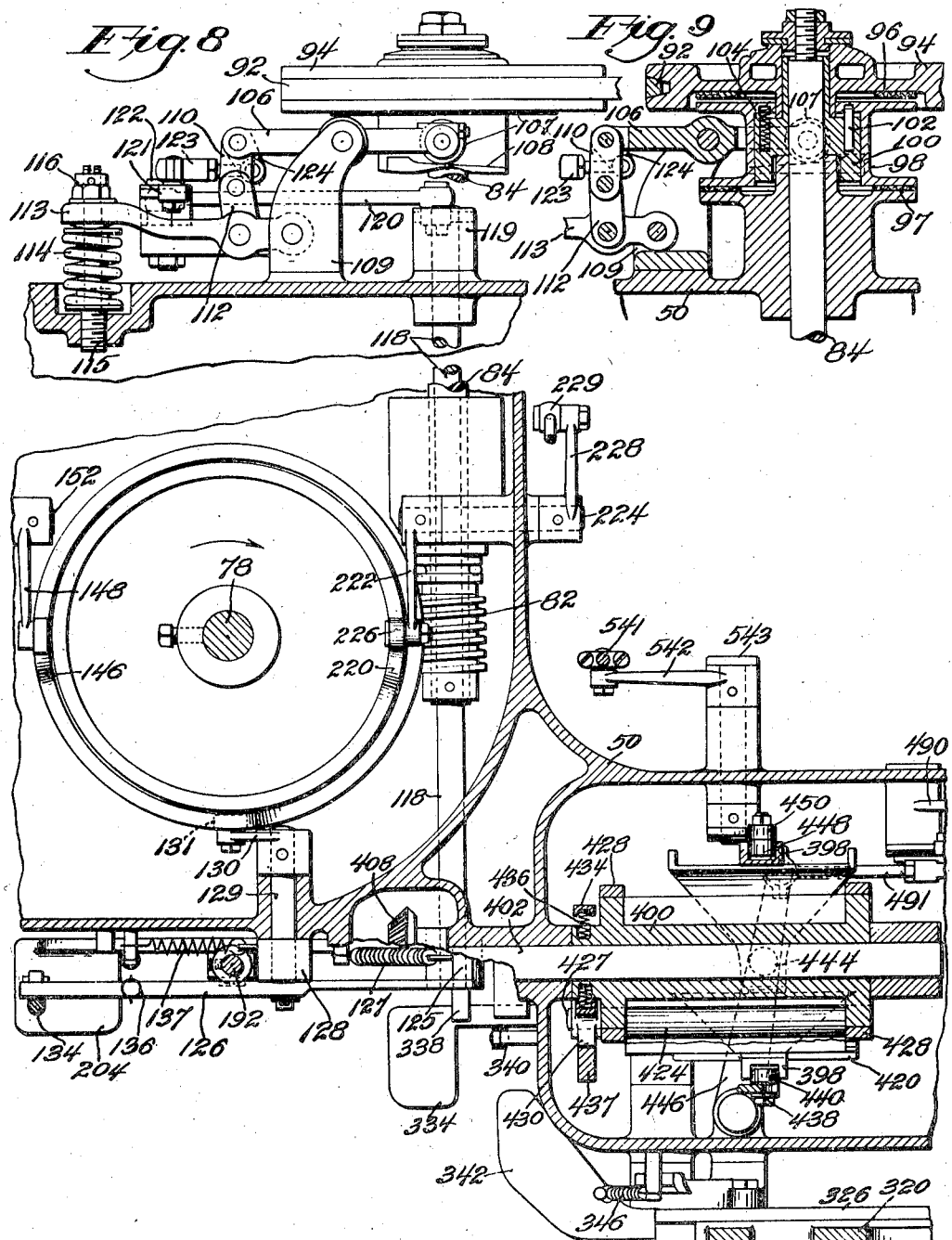
Witness
Jas. J. Maloney.
Inventor
Joseph Fossa
by Maxwell Fish
Atty.

Feb. 15, 1949. J. FOSSA 2,461,889
MACHINE AND METHOD FOR MANUFACTURE OF SHOES
Filed July 19, 1944 42 Sheets-Sheet 7

Fig. 10

Witness
Jas. J. Maloney

Inventor
Joseph Fossa
by Maxwell Fish
Att'y.

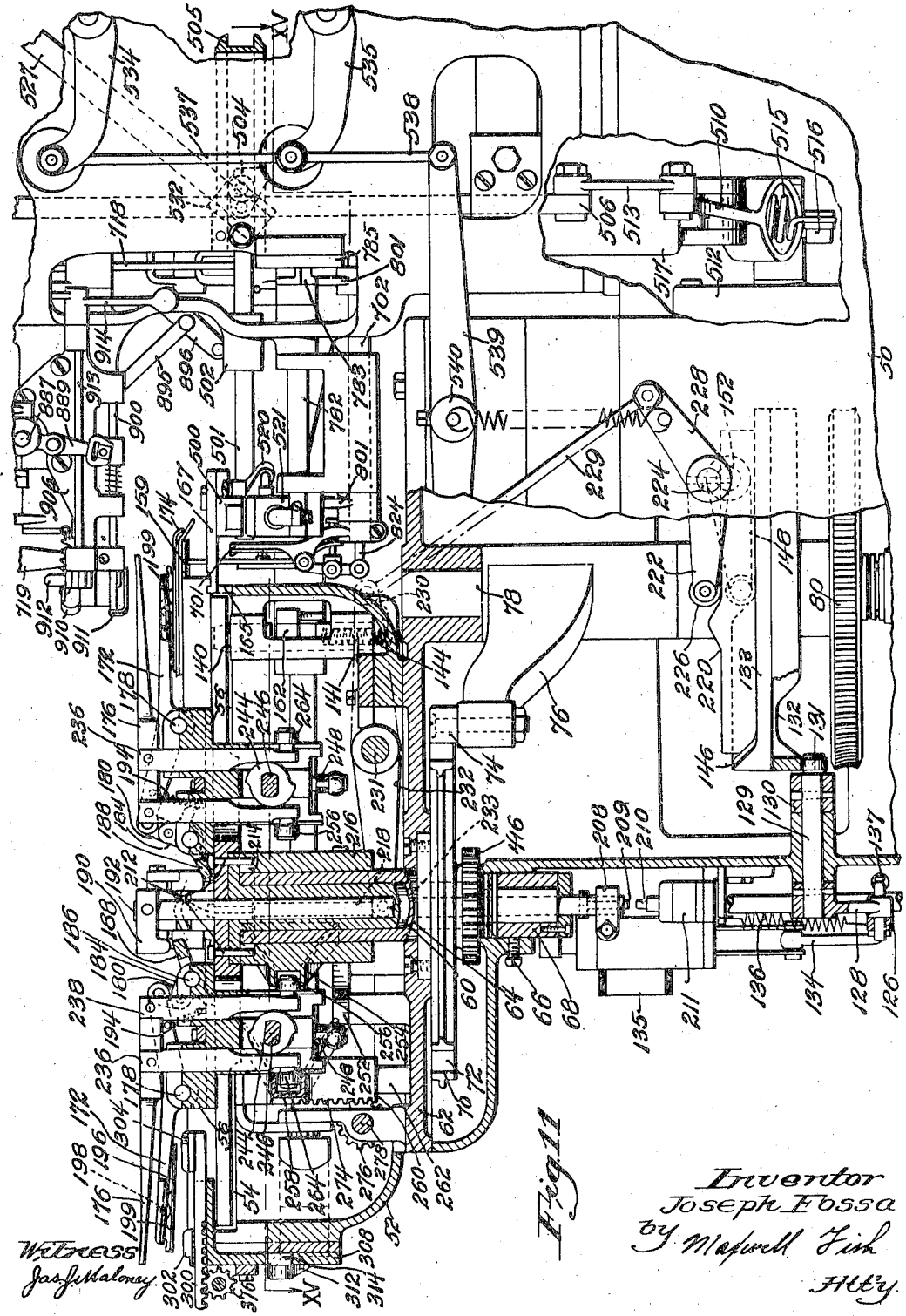

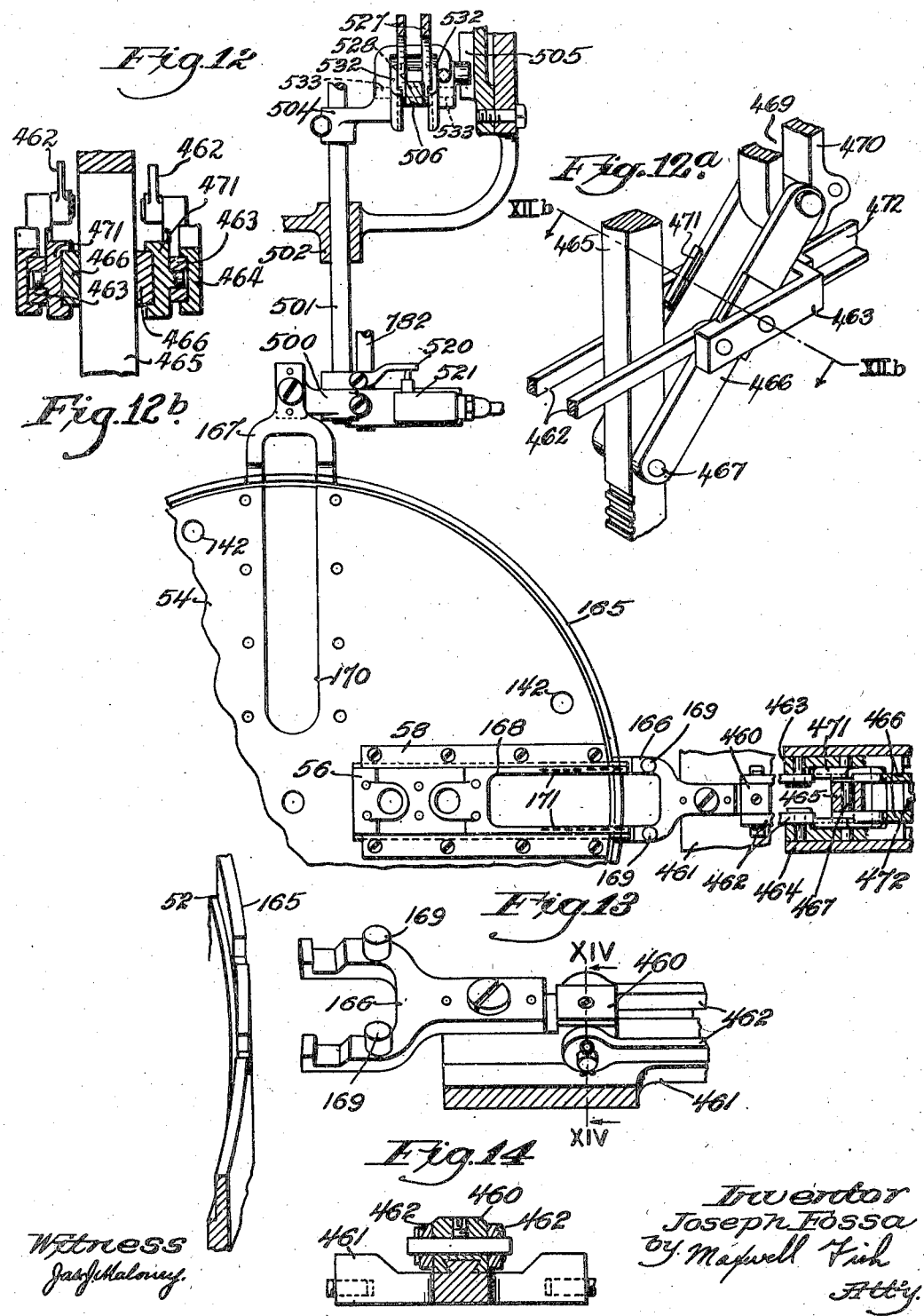

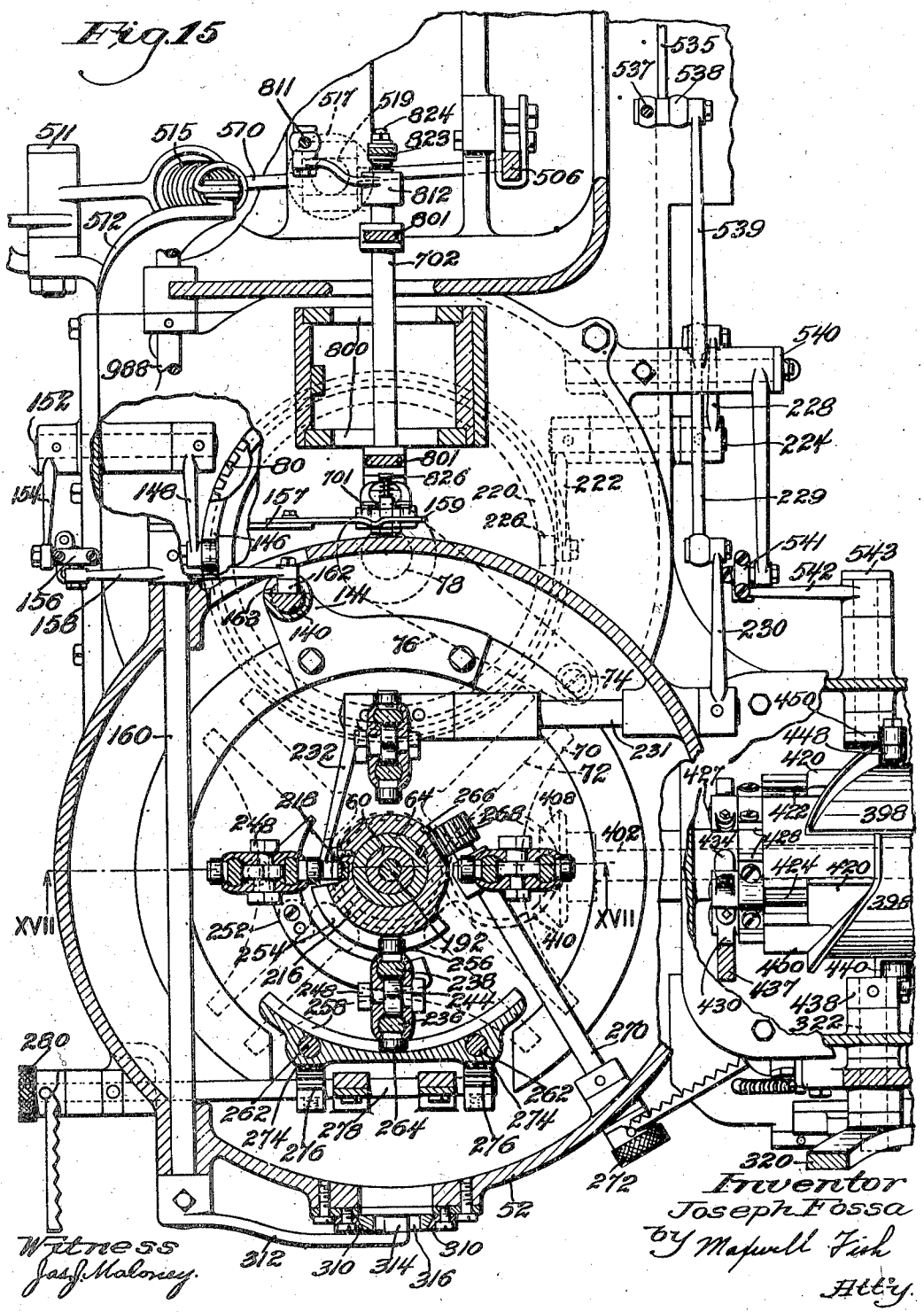

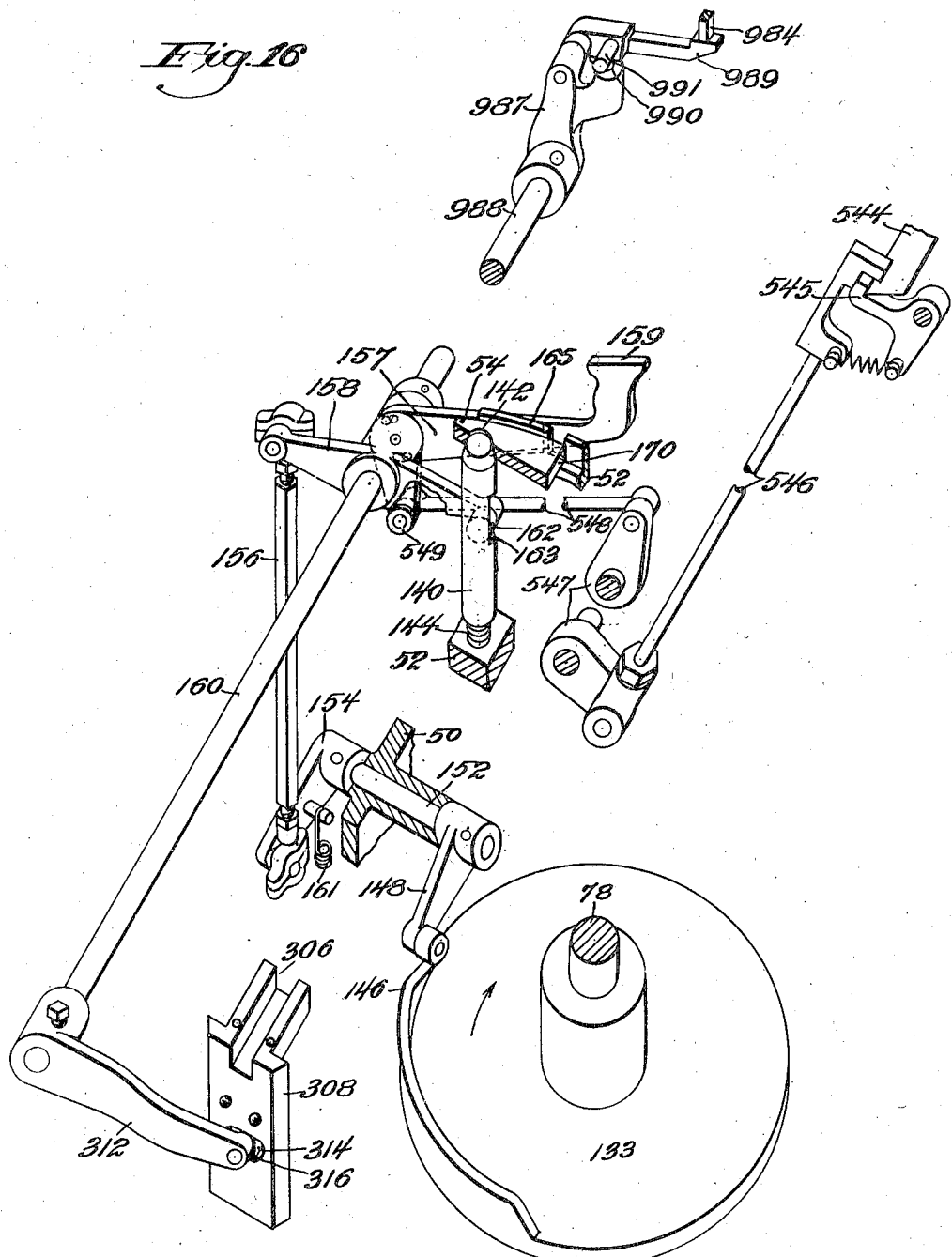

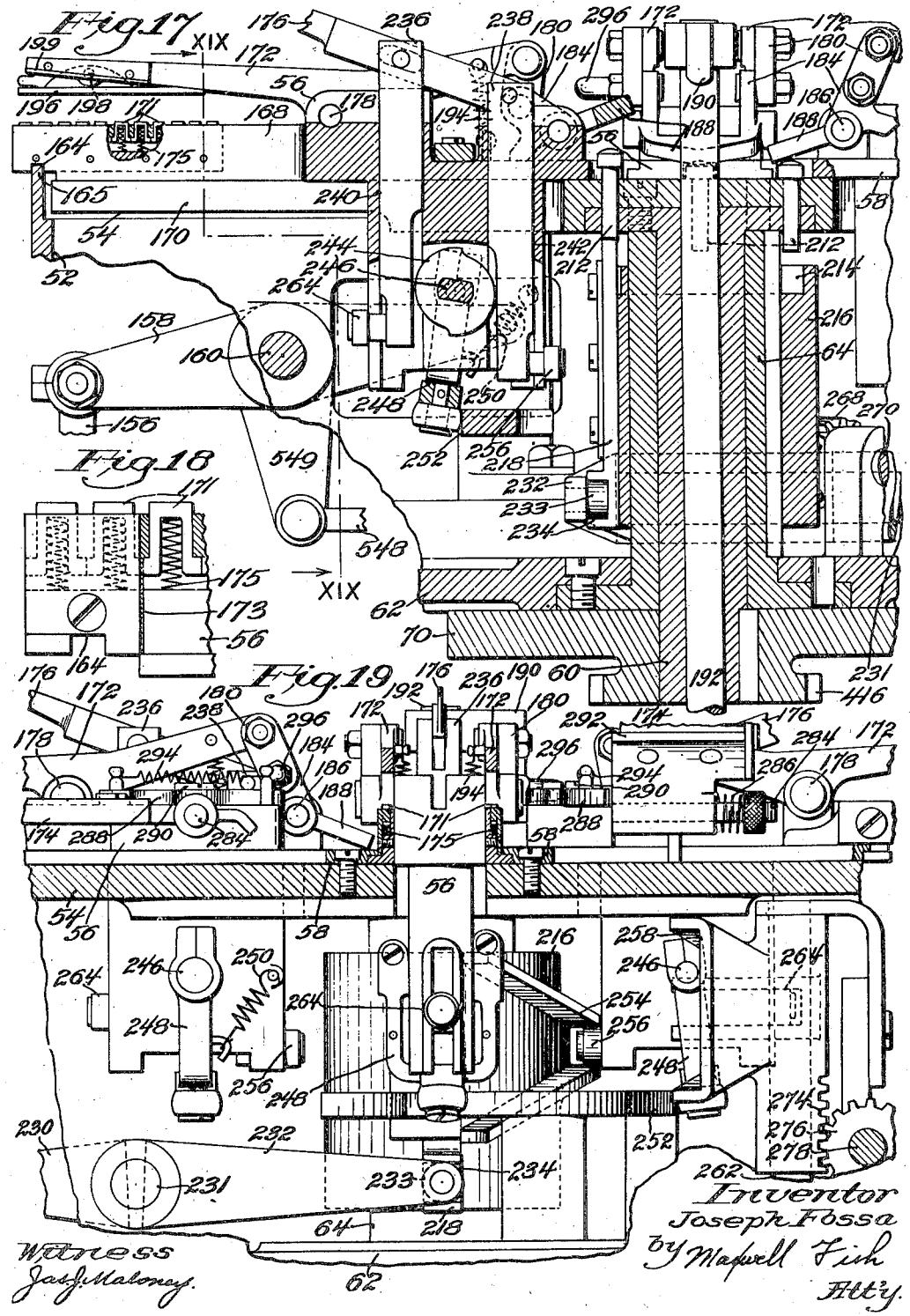

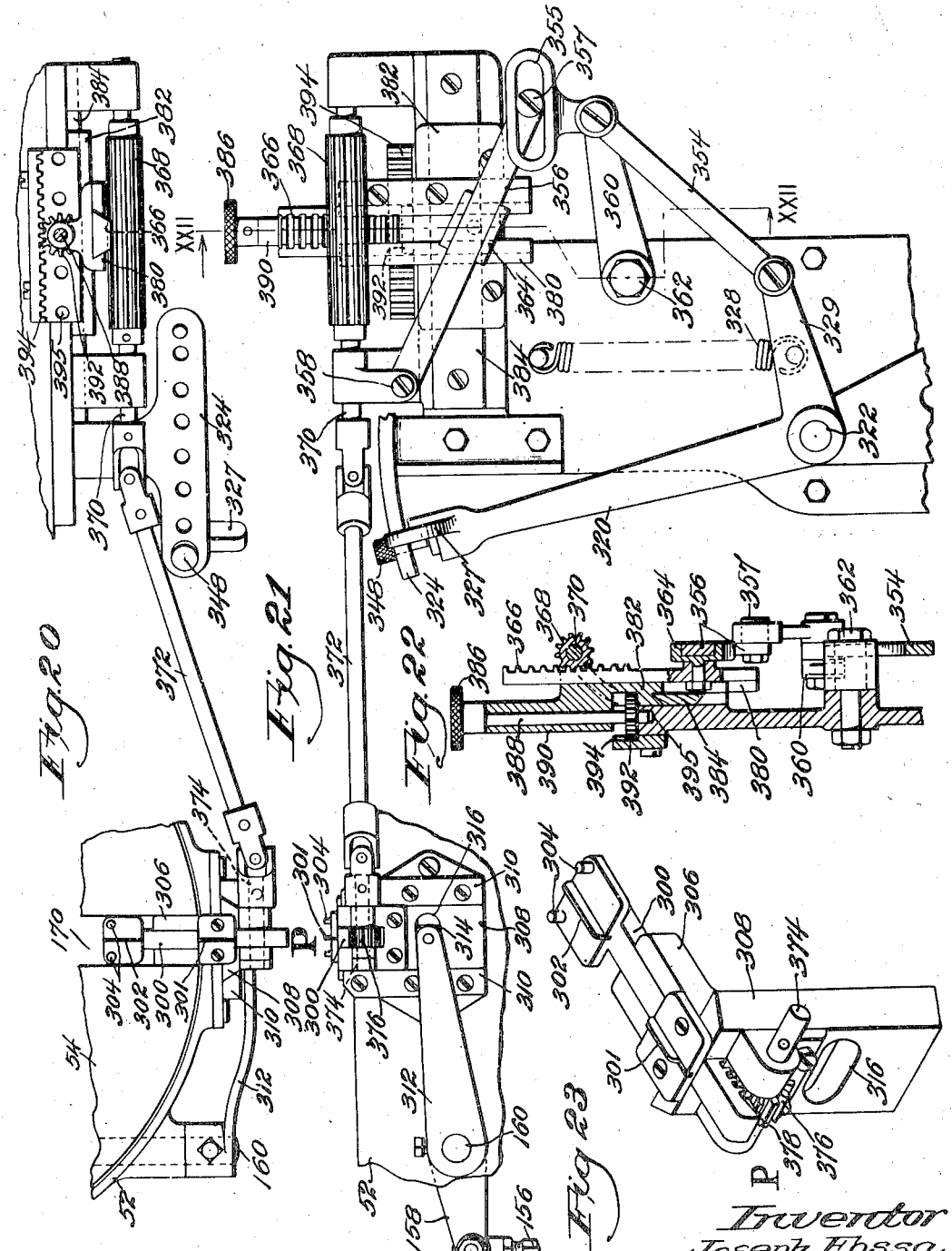

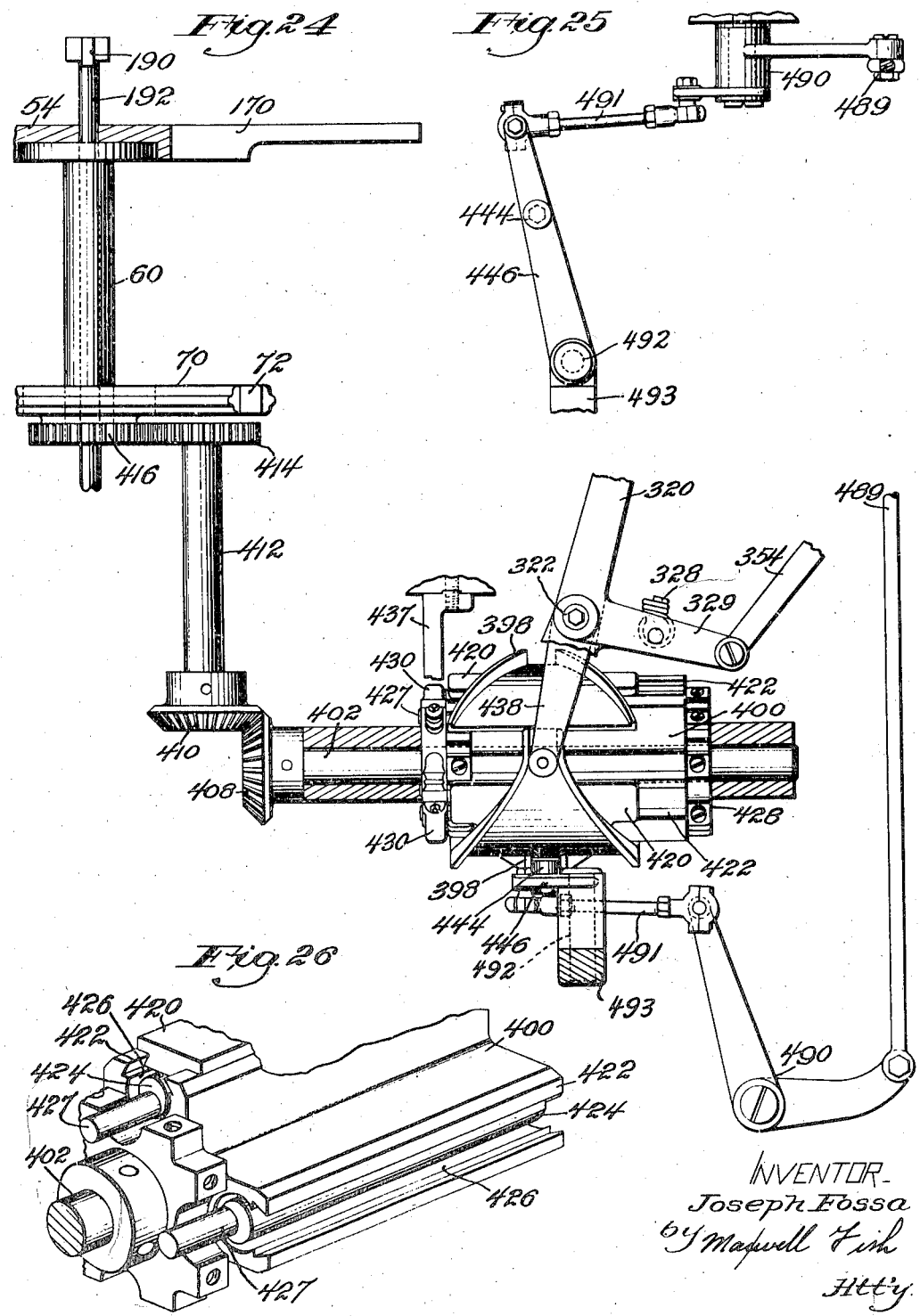

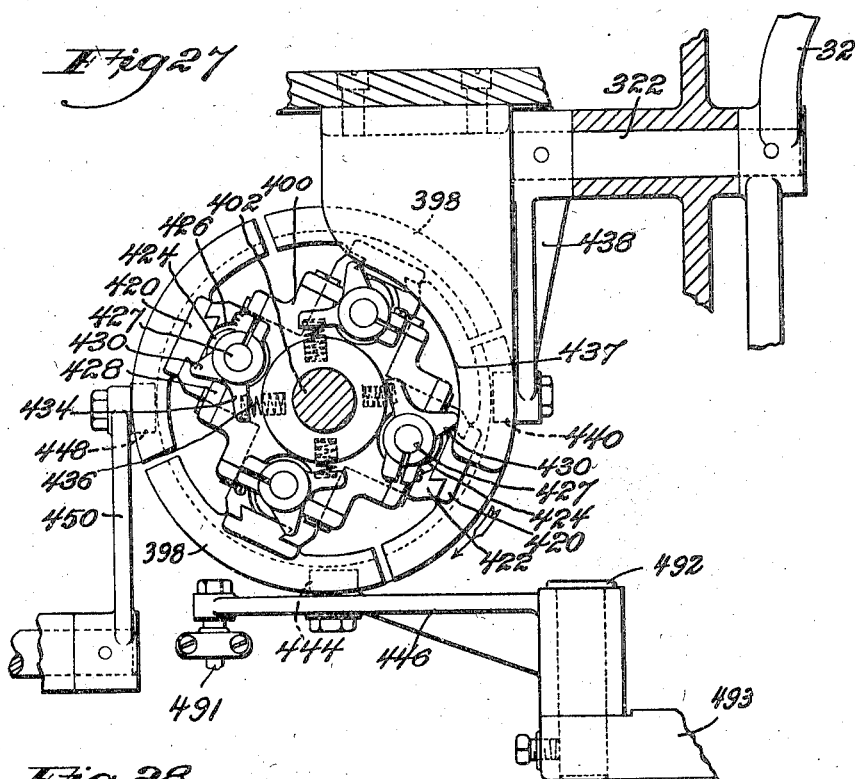
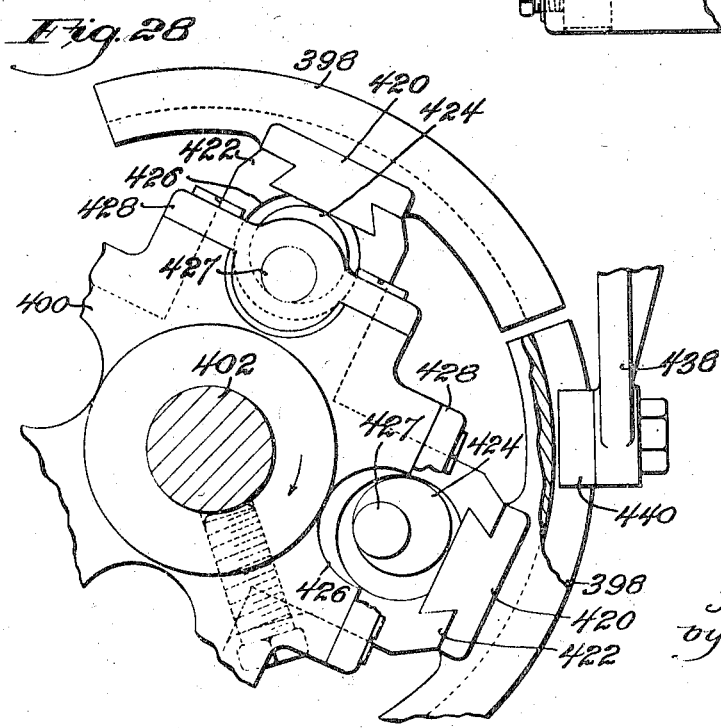

Feb. 15, 1949.                J. FOSSA                  2,461,889
            MACHINE AND METHOD FOR MANUFACTURE OF SHOES
Filed July 19, 1944                              42 Sheets-Sheet 16

INVENTOR
Joseph Fossa
by Maxwell Fish
Att'y

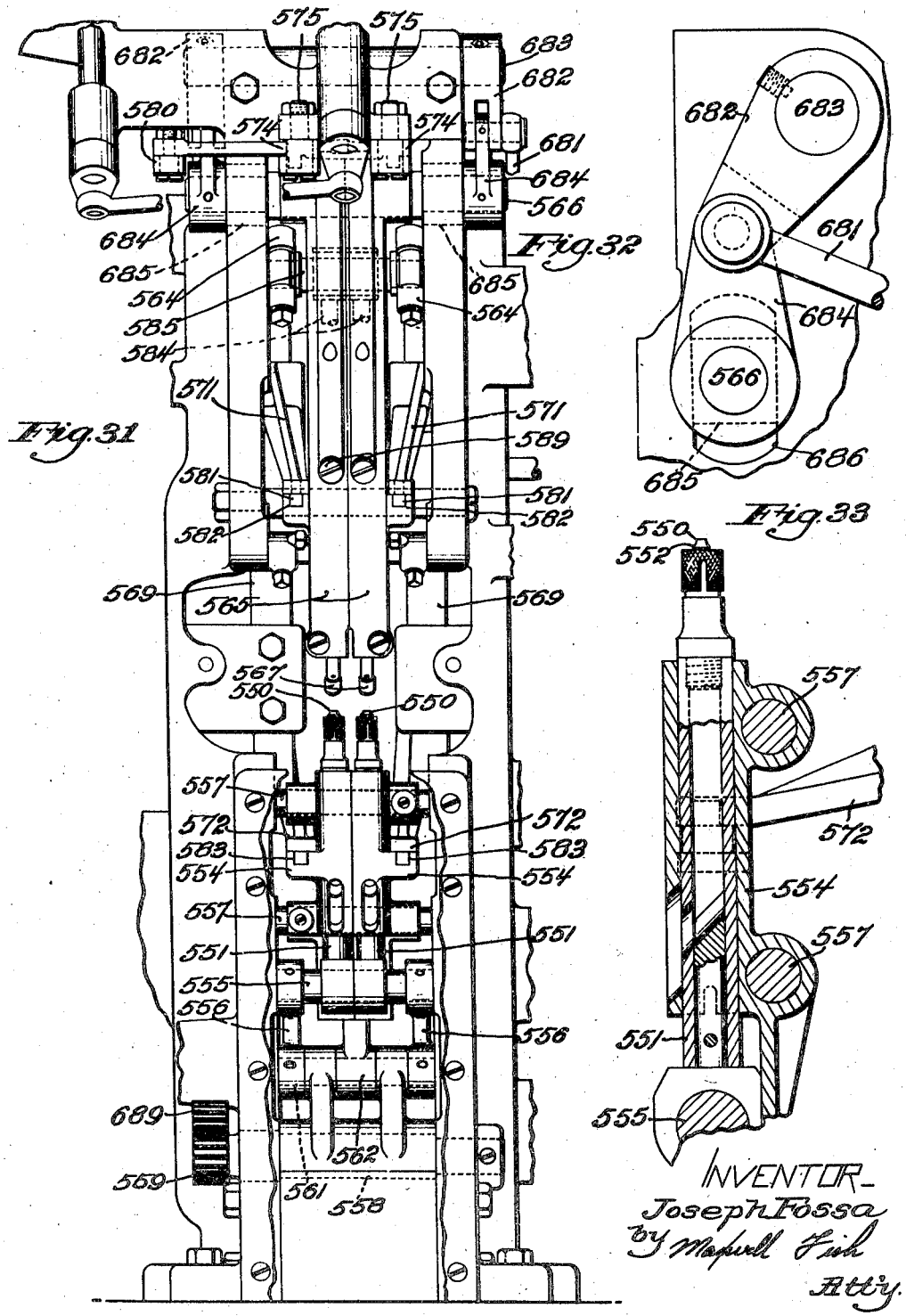

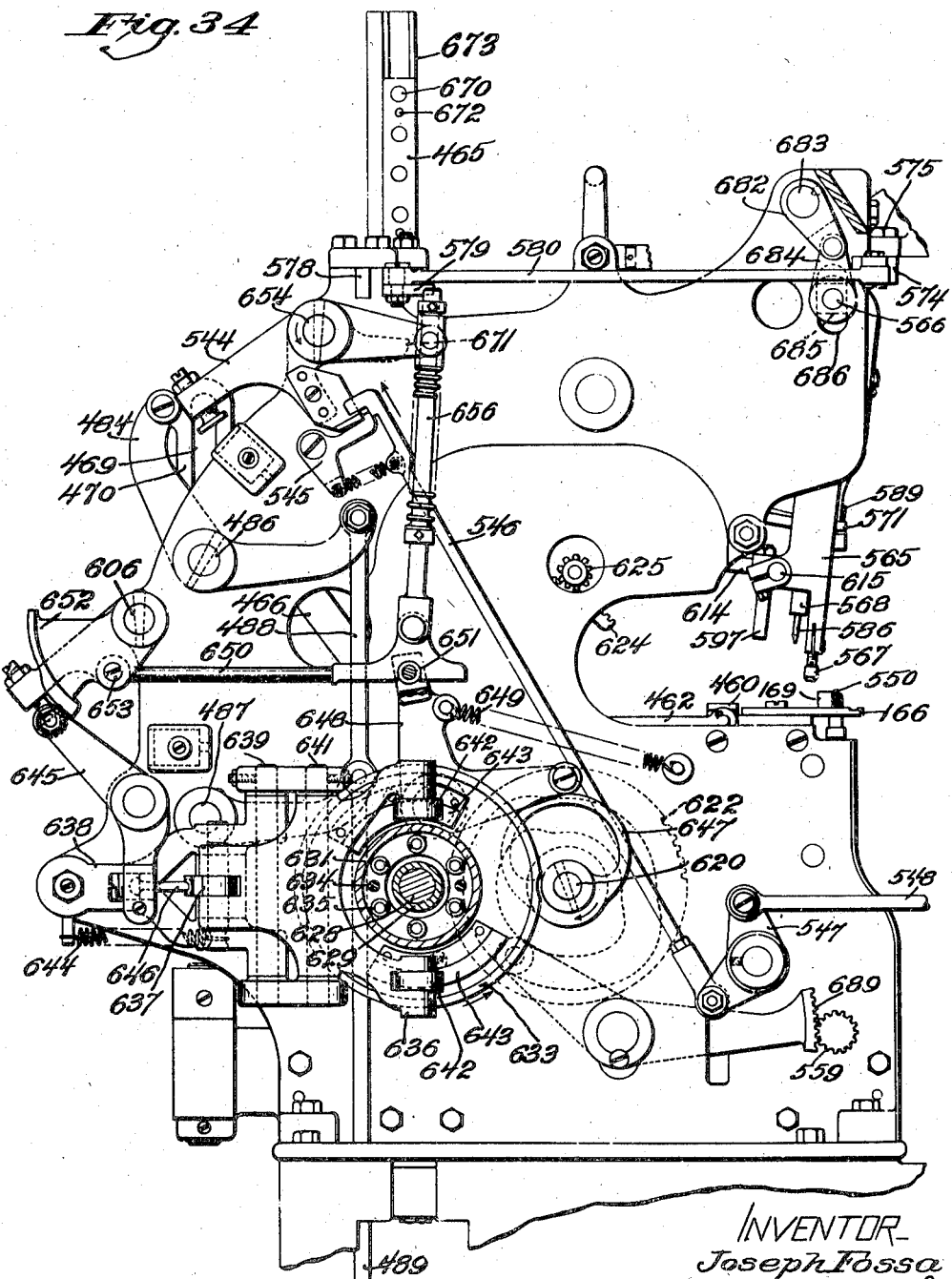

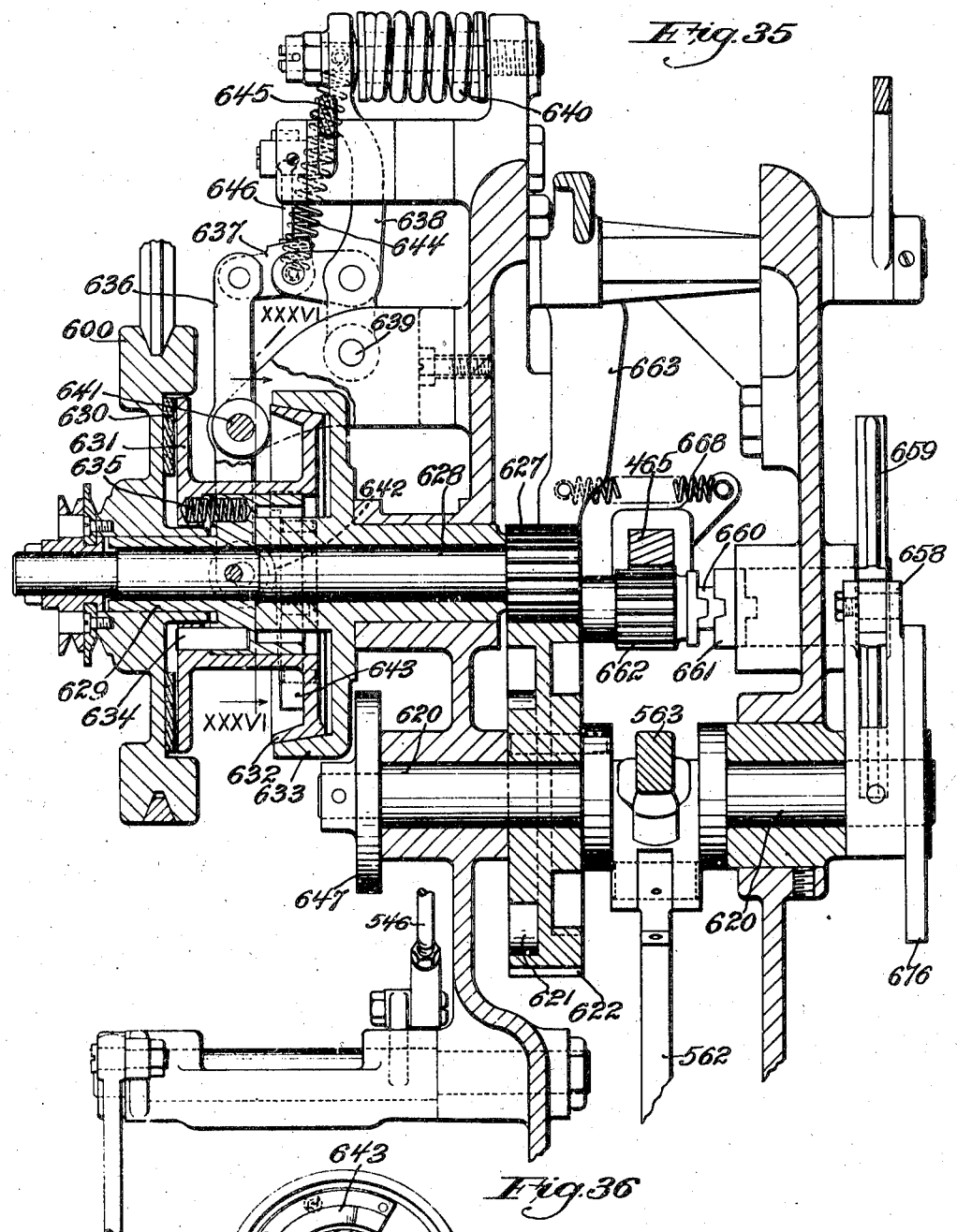
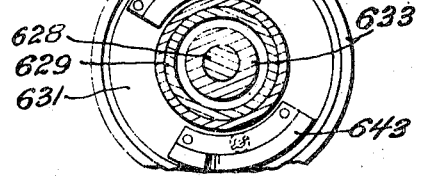

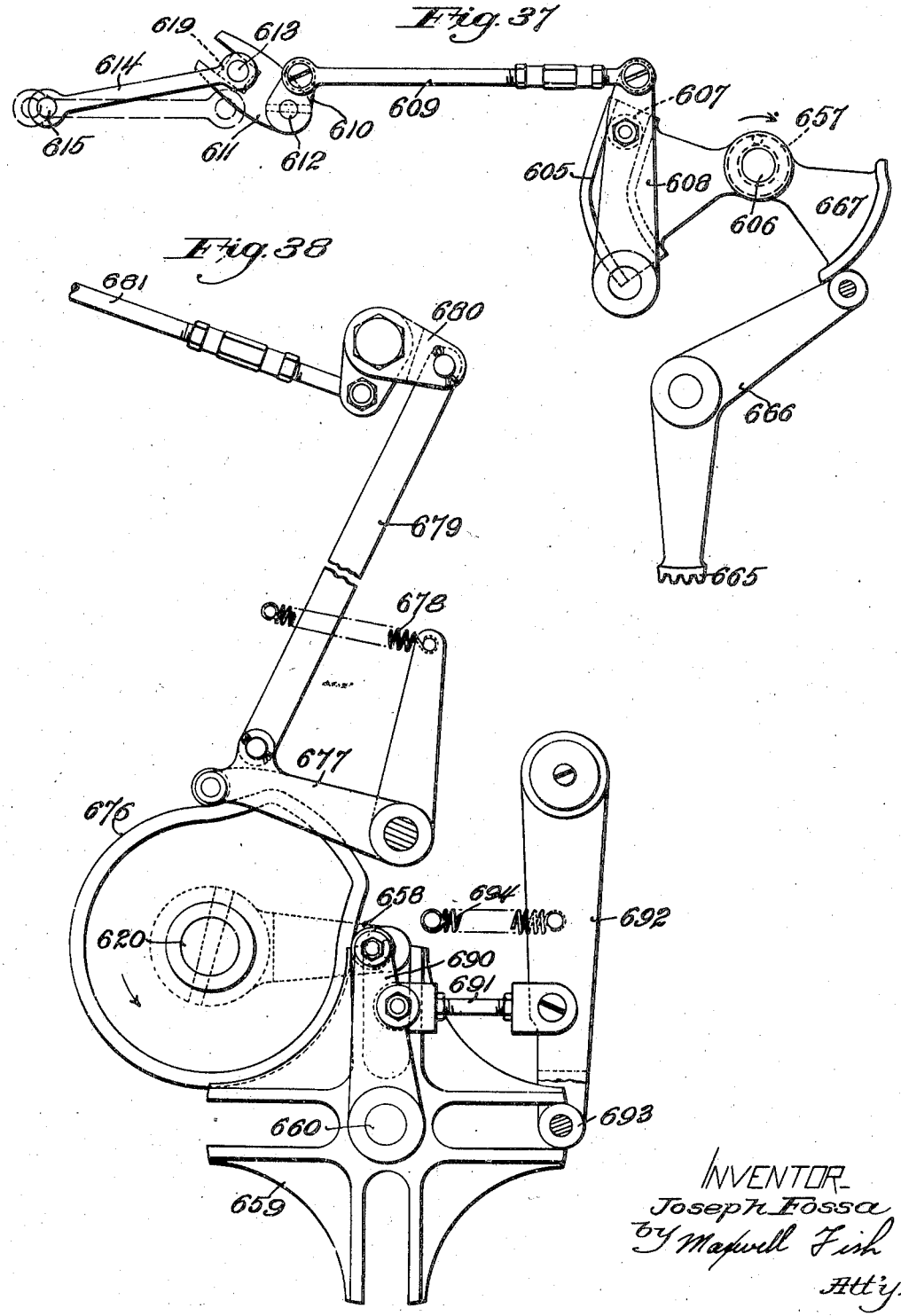

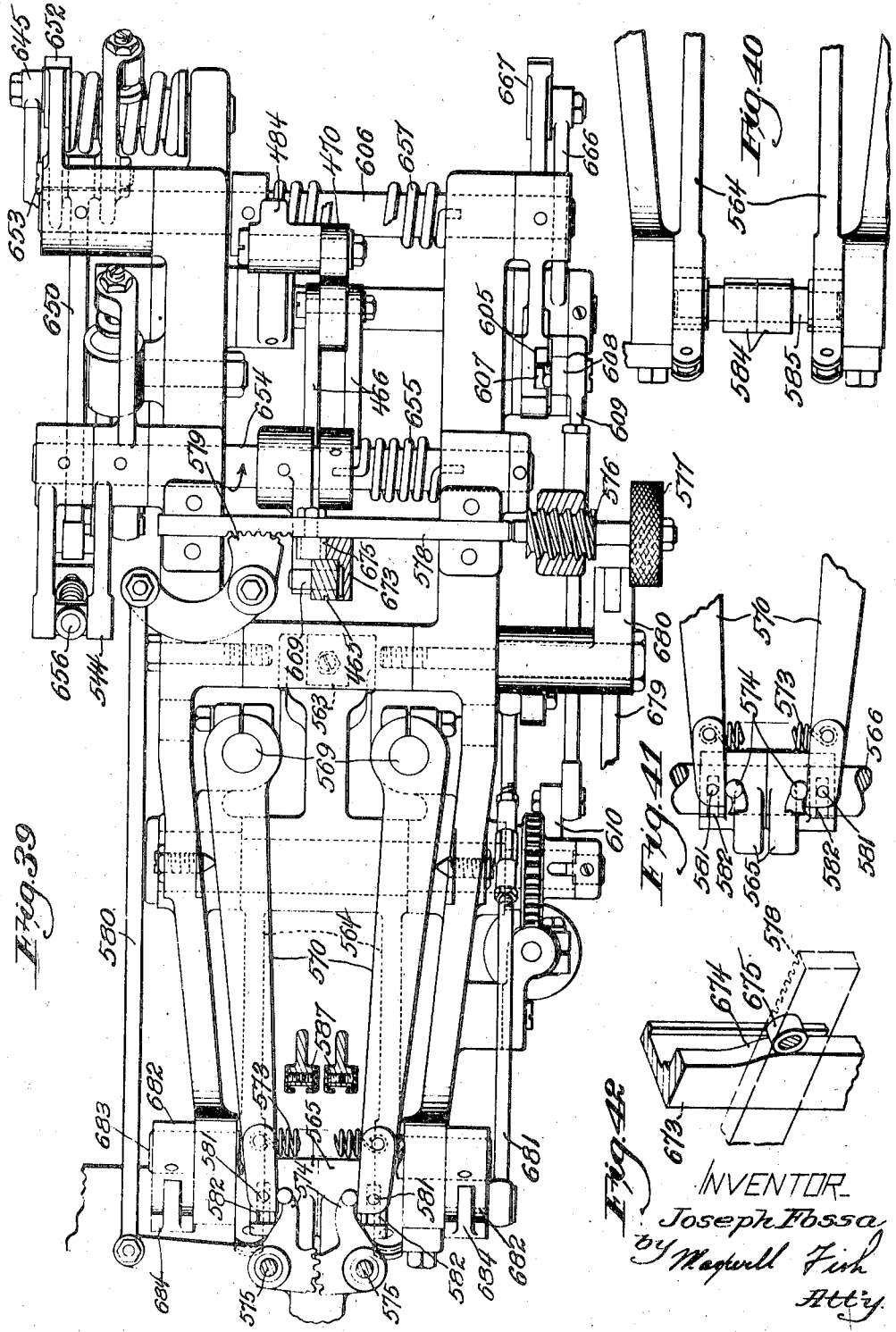

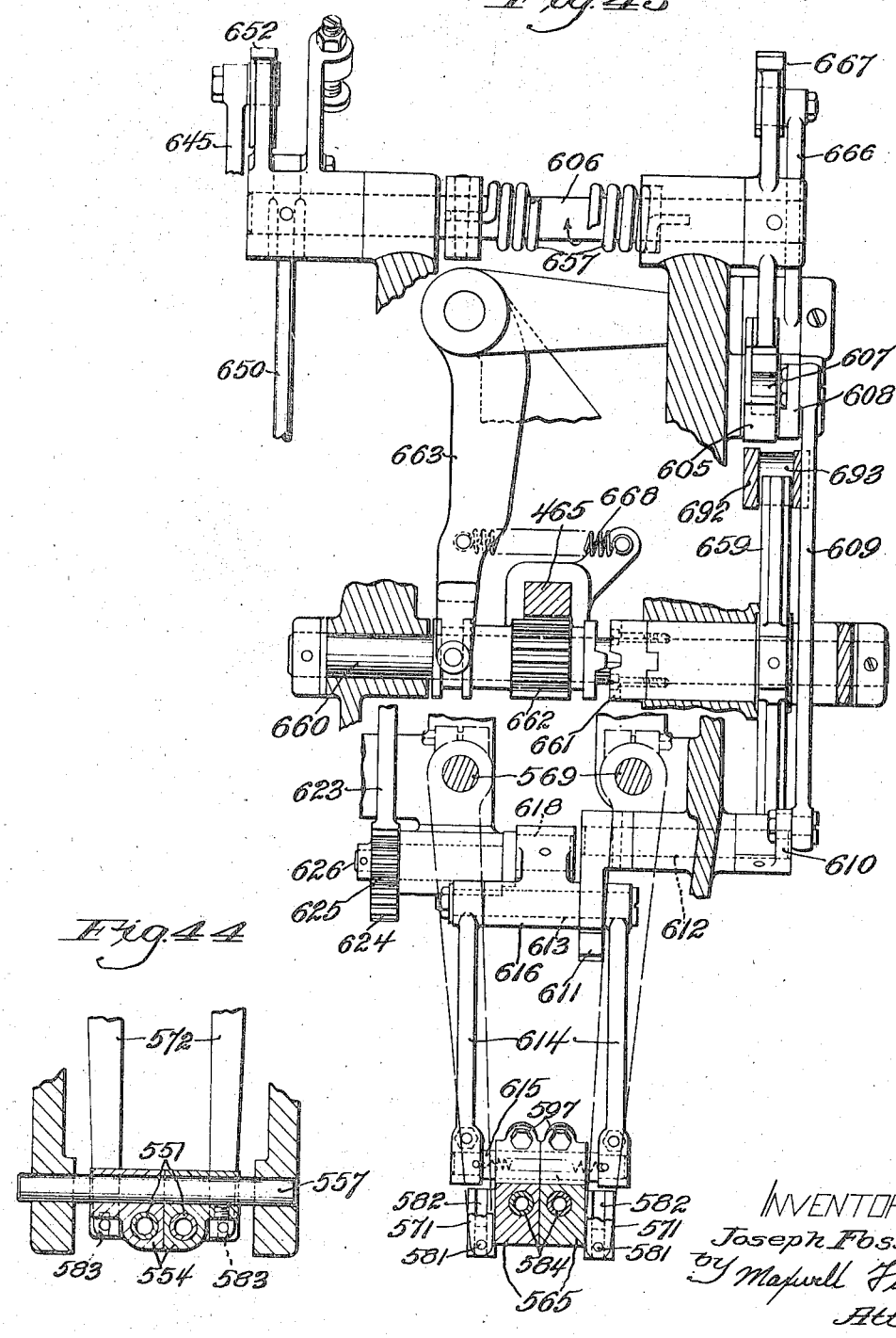

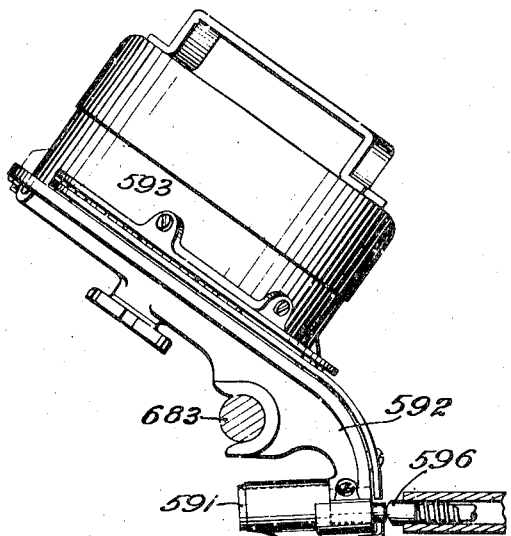
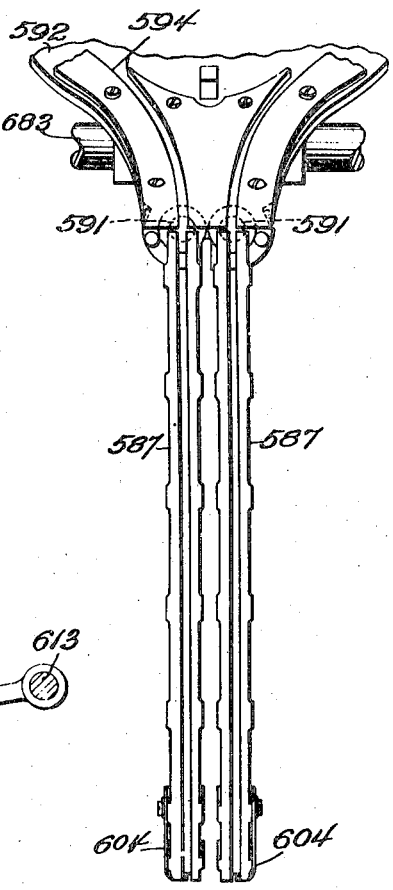
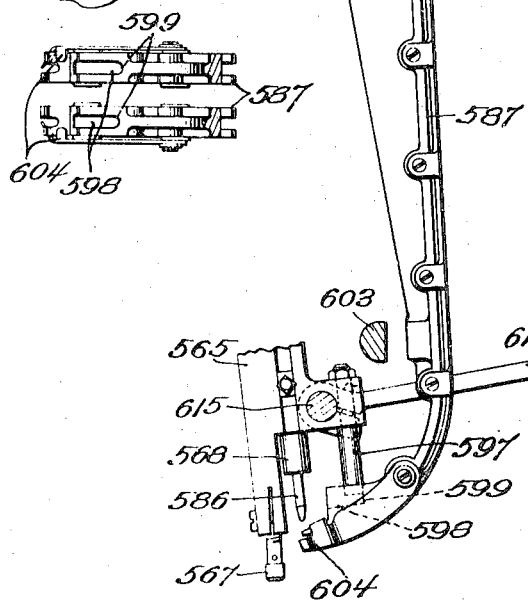

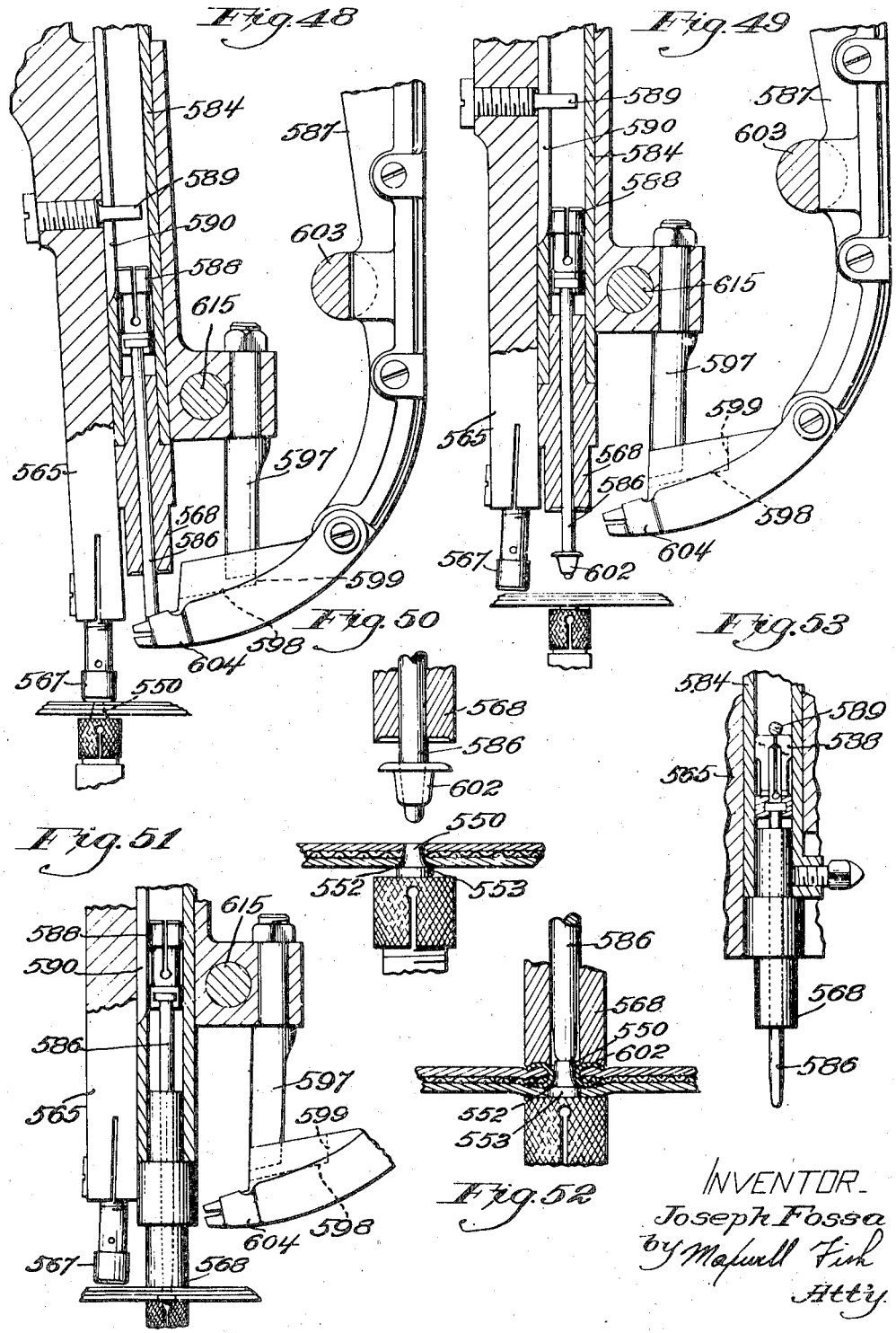

Feb. 15, 1949.　　　　　　　J. FOSSA　　　　　　　2,461,889
MACHINE AND METHOD FOR MANUFACTURE OF SHOES
Filed July 19, 1944　　　　　　　　　　　　42 Sheets-Sheet 25
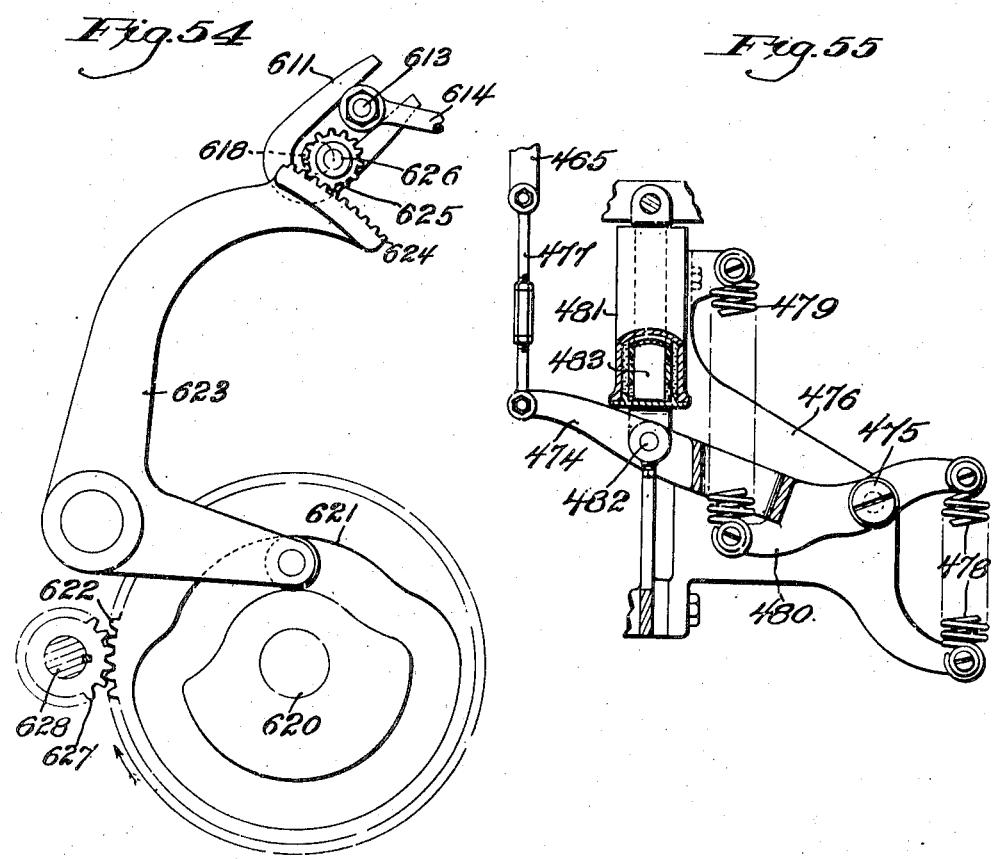
INVENTOR
Joseph Fossa
by Maxwell Fish
Att'y

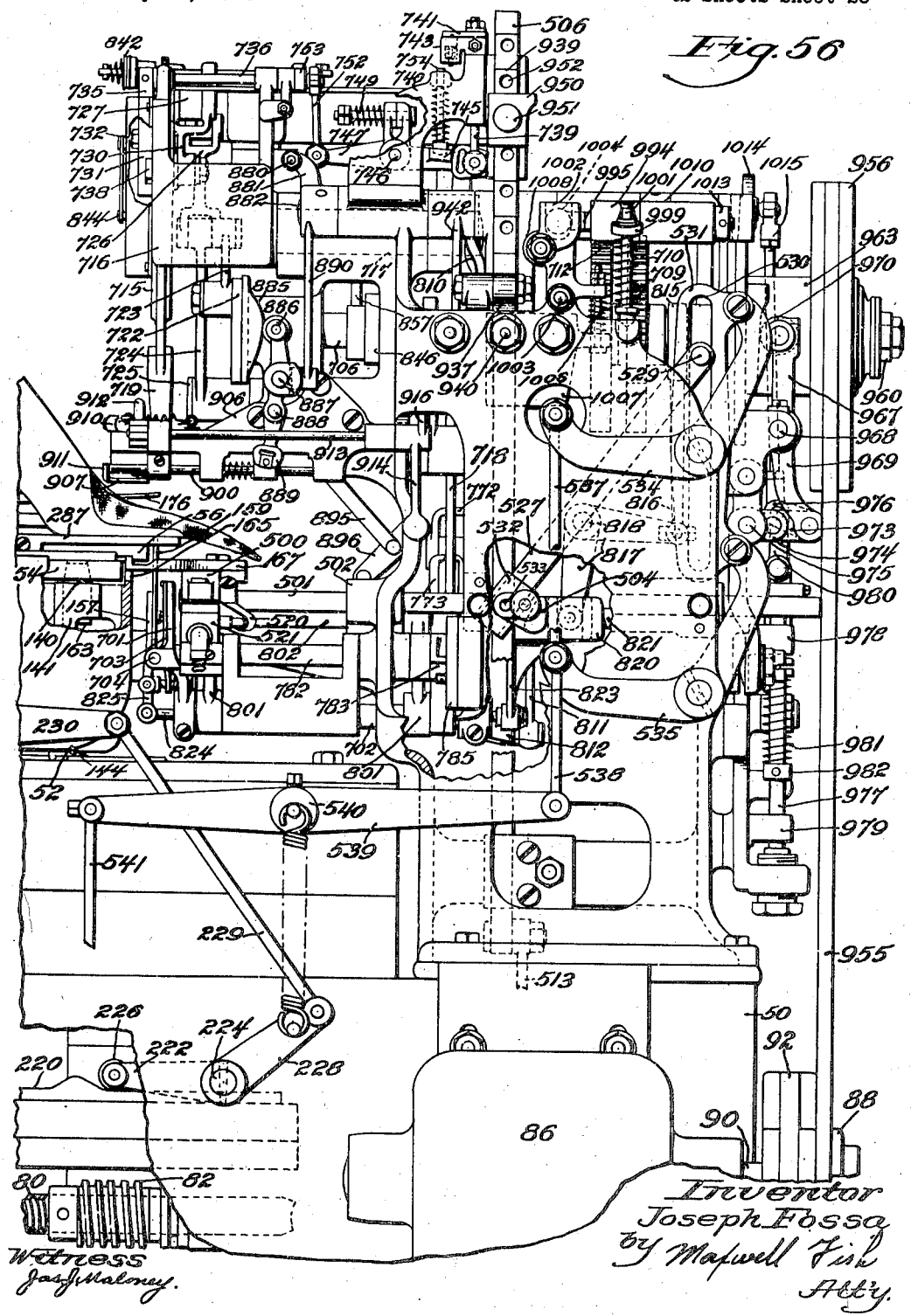

Feb. 15, 1949.   J. FOSSA   2,461,889
MACHINE AND METHOD FOR MANUFACTURE OF SHOES
Filed July 19, 1944   42 Sheets-Sheet 27

Witness
Jas. J. Maloney

Inventor
Joseph Fossa
by Maxwell Fish
Atty.

Feb. 15, 1949.    J. FOSSA    2,461,889
MACHINE AND METHOD FOR MANUFACTURE OF SHOES
Filed July 19, 1944    42 Sheets-Sheet 32

Witness
Jas. J. Maloney.

Inventor
Joseph Fossa
by Maxwell Fish
Atty.

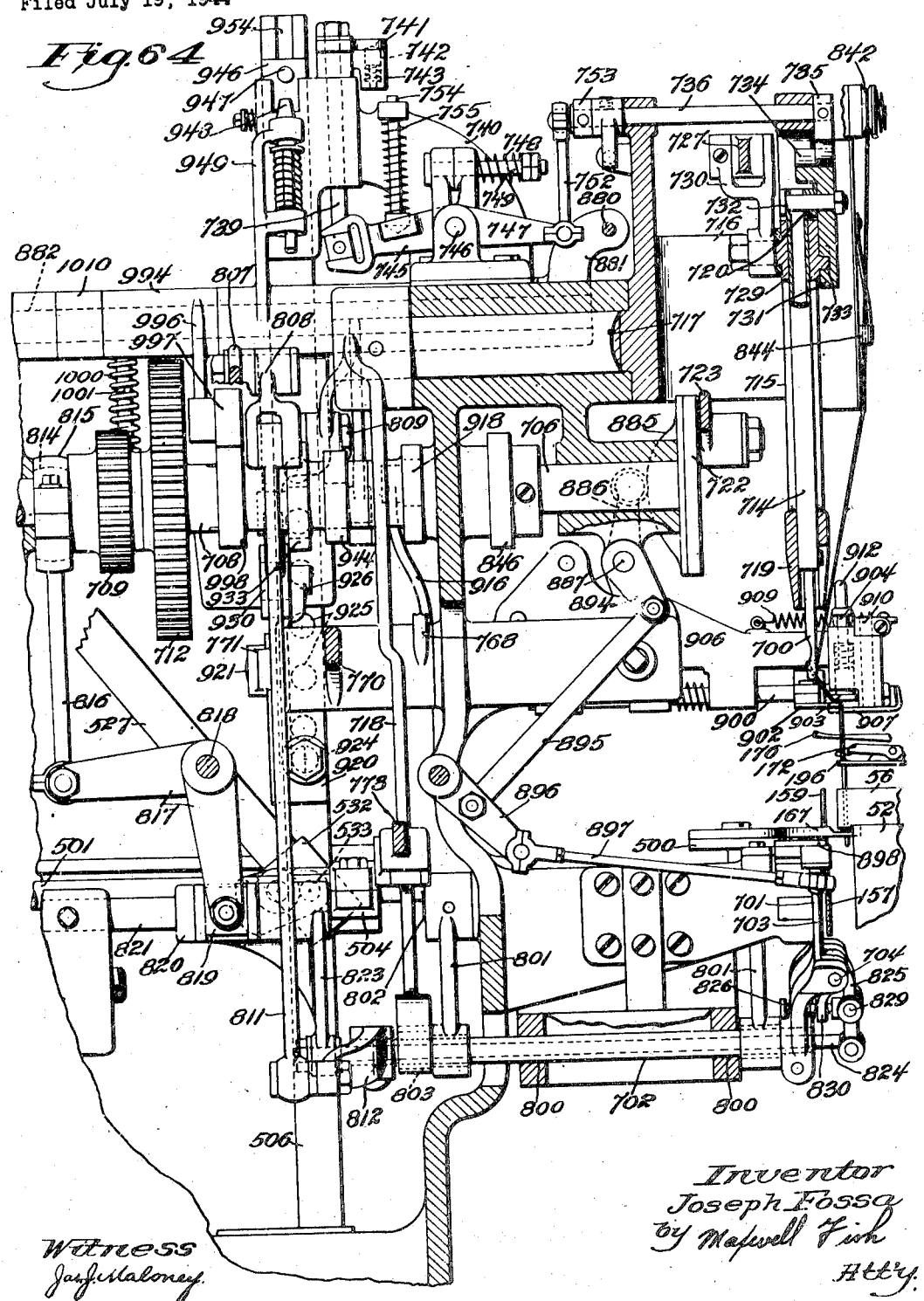

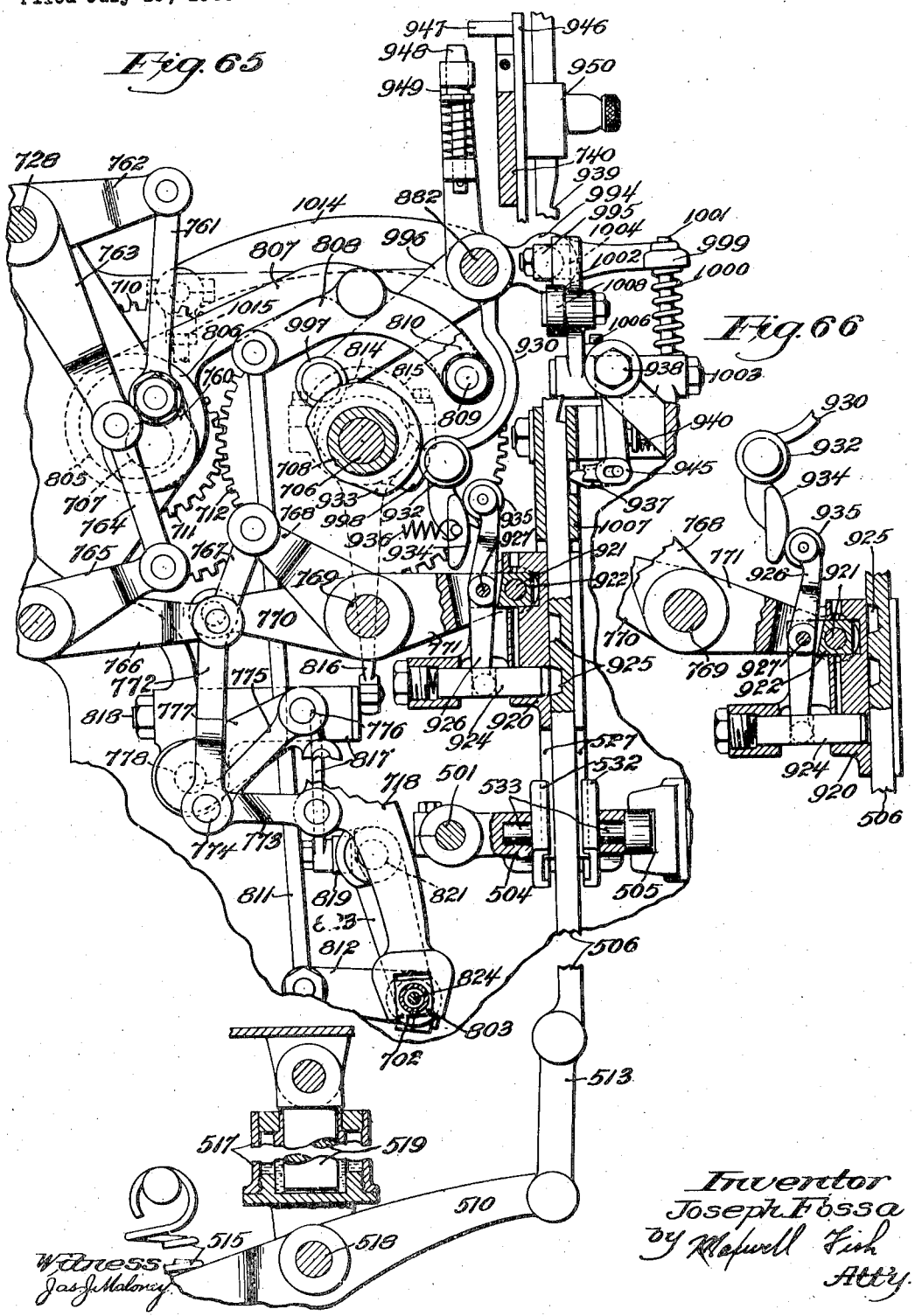

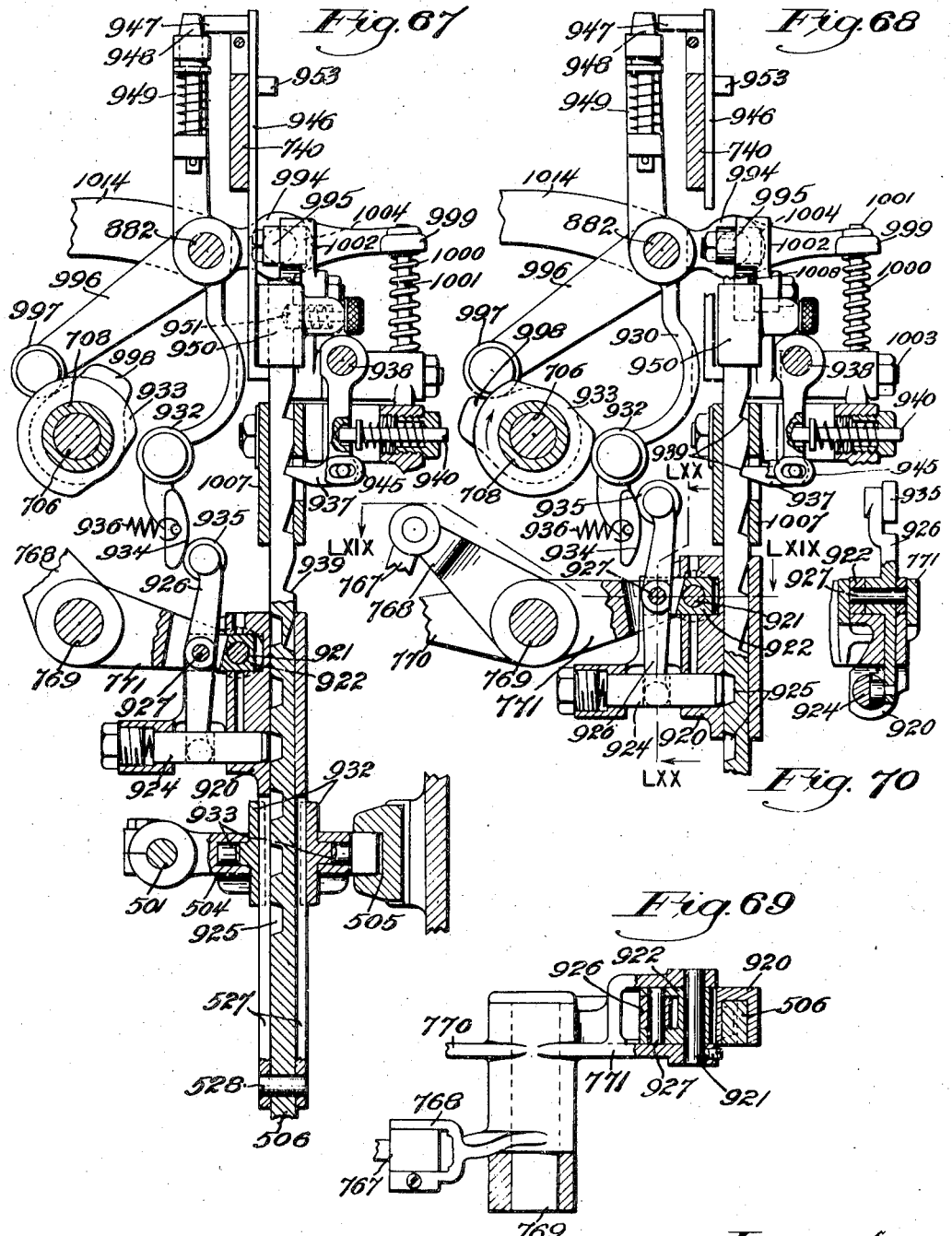

Feb. 15, 1949. J. FOSSA 2,461,889
MACHINE AND METHOD FOR MANUFACTURE OF SHOES
Filed July 19, 1944 42 Sheets-Sheet 36
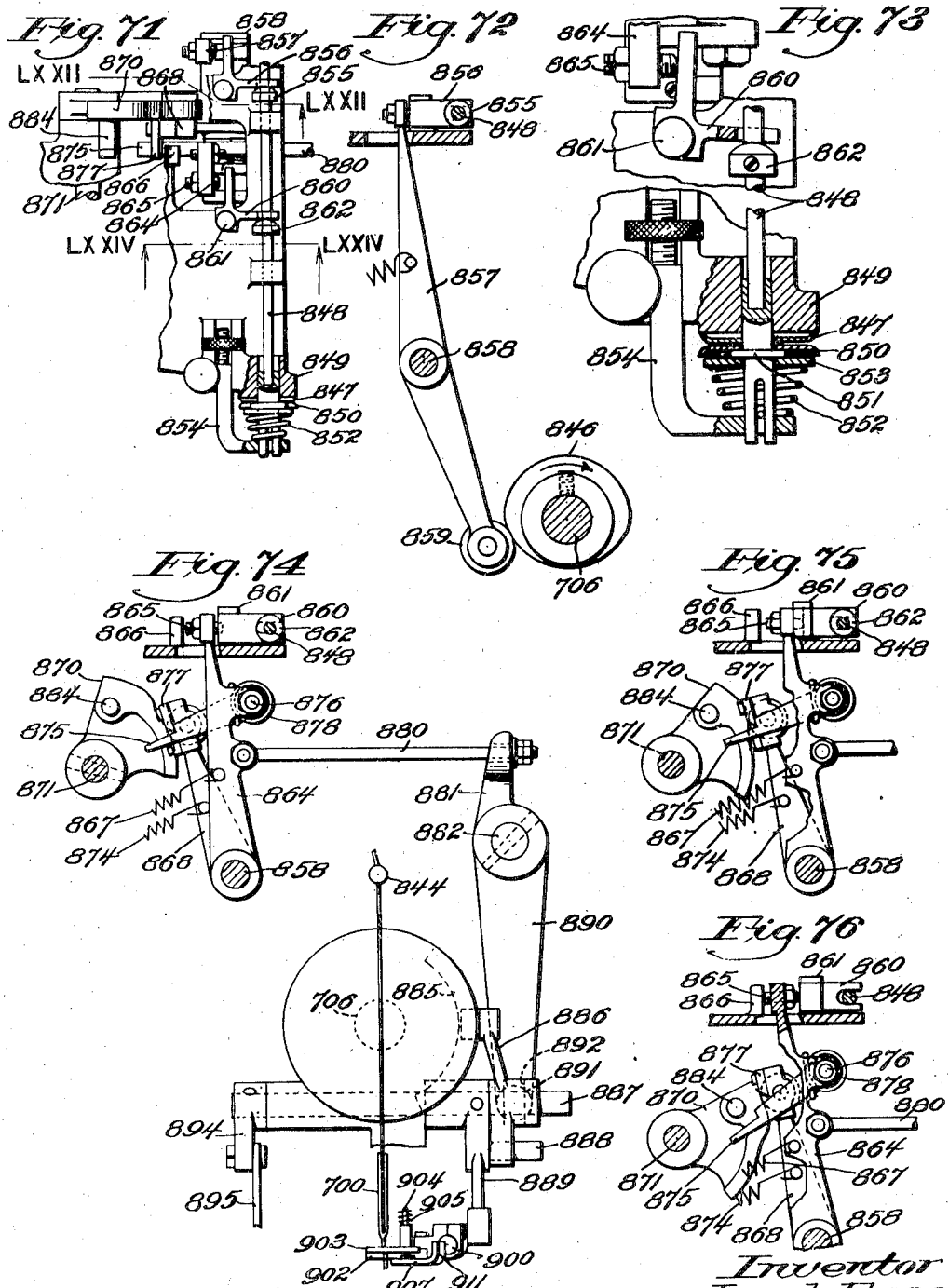
Witness
Jas. J. Maloney
Inventor
Joseph Fossa
by Maxwell Fish
Atty.

Feb. 15, 1949. J. FOSSA 2,461,889
MACHINE AND METHOD FOR MANUFACTURE OF SHOES
Filed July 19, 1944 42 Sheets-Sheet 37
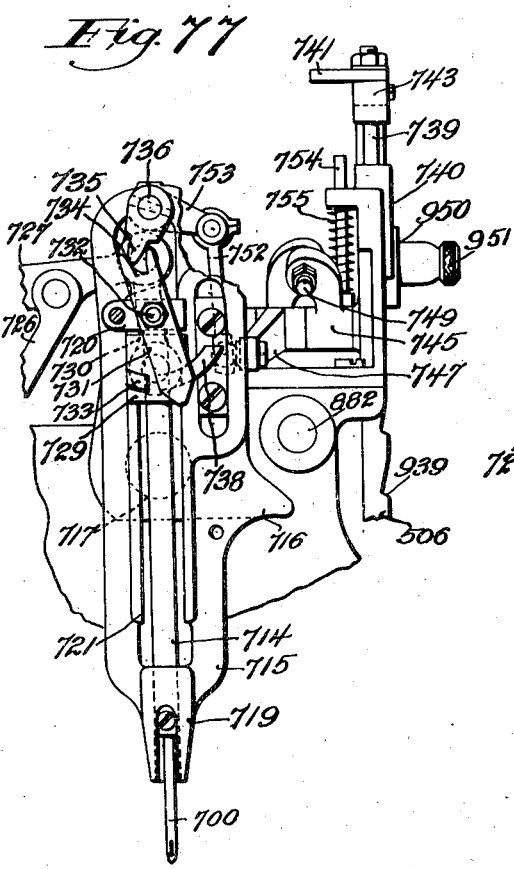
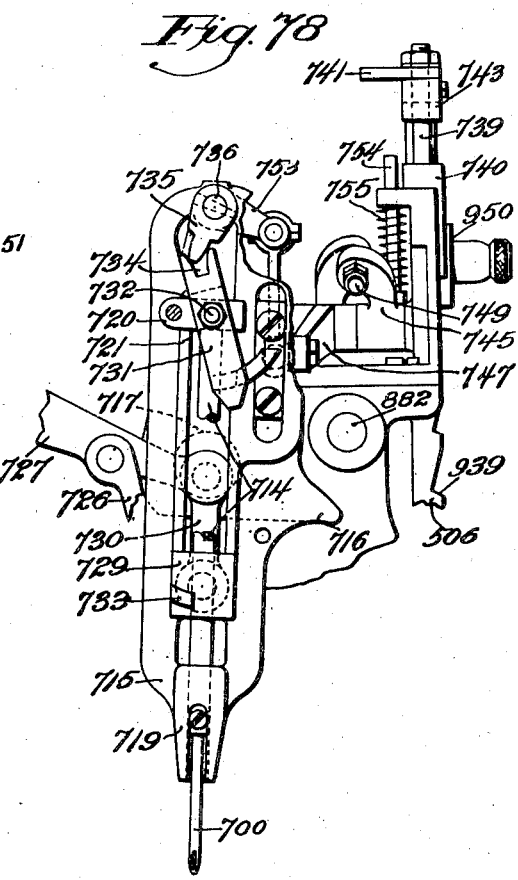
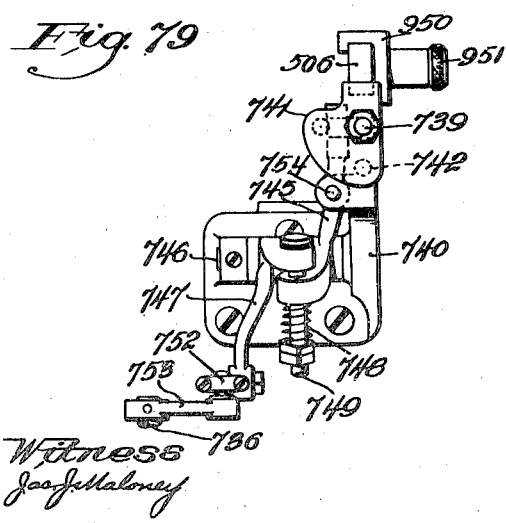
Inventor
Joseph Fossa
by Maxwell Fish
Att'y
Witness
Jas J. Maloney Feb. 15, 1949. J. FOSSA 2,461,889
MACHINE AND METHOD FOR MANUFACTURE OF SHOES
Filed July 19, 1944 42 Sheets-Sheet 38

Witness
Jas. J. Maloney

Inventor
Joseph Fossa
by Maxwell Fish
Atty

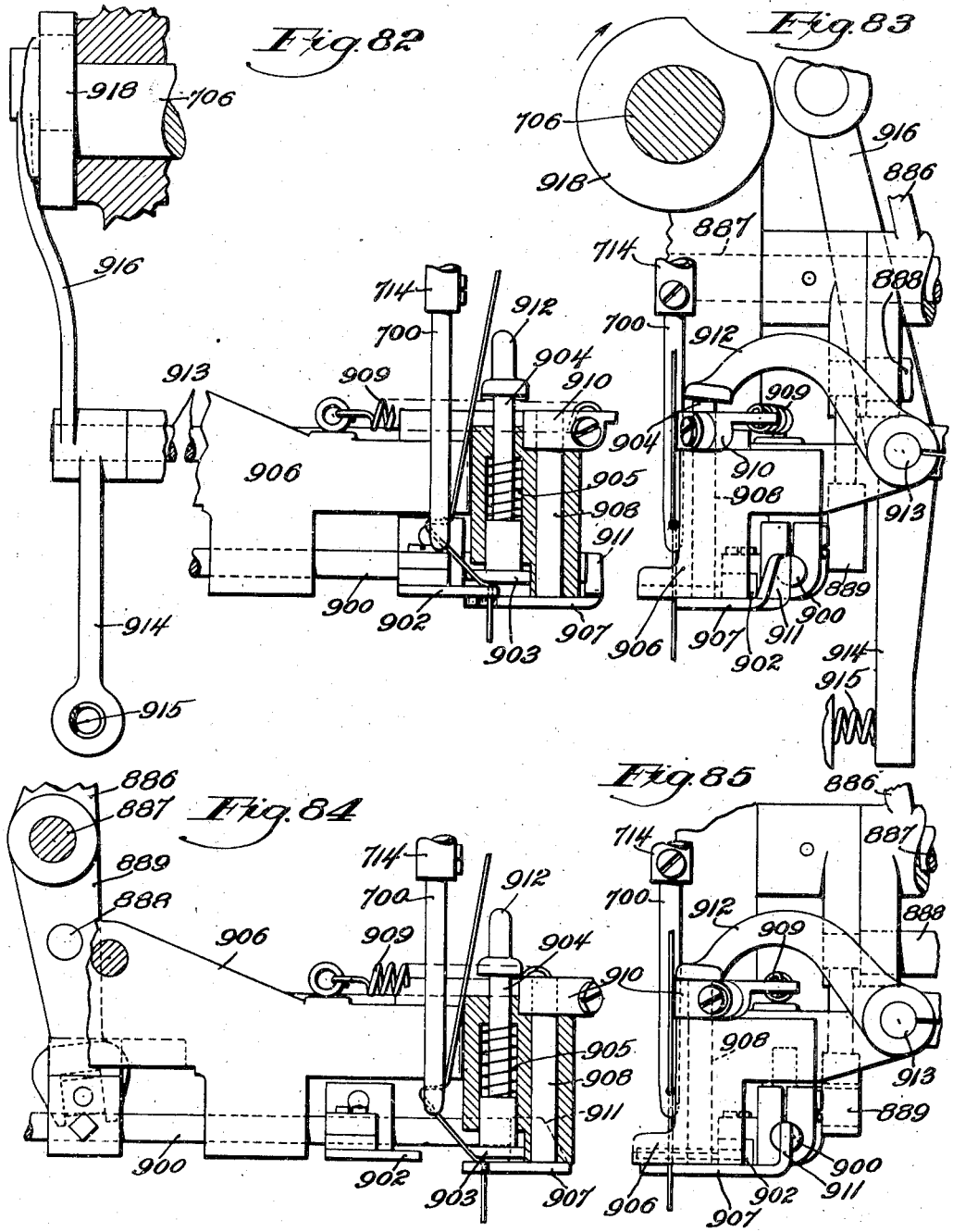

Feb. 15, 1949.　　　　　J. FOSSA　　　　　2,461,889
MACHINE AND METHOD FOR MANUFACTURE OF SHOES
Filed July 19, 1944　　　　　　　　　　　　42 Sheets-Sheet 40

Witness
Jas. J. Maloney

Inventor
Joseph Fossa
by Maxwell Fish
Atty.

Feb. 15, 1949. J. FOSSA 2,461,889
MACHINE AND METHOD FOR MANUFACTURE OF SHOES
Filed July 19, 1944 42 Sheets-Sheet 41

Witness
Jas. J. Maloney.

Inventor
Joseph Fossa
by Maxwell Fish
Atty.

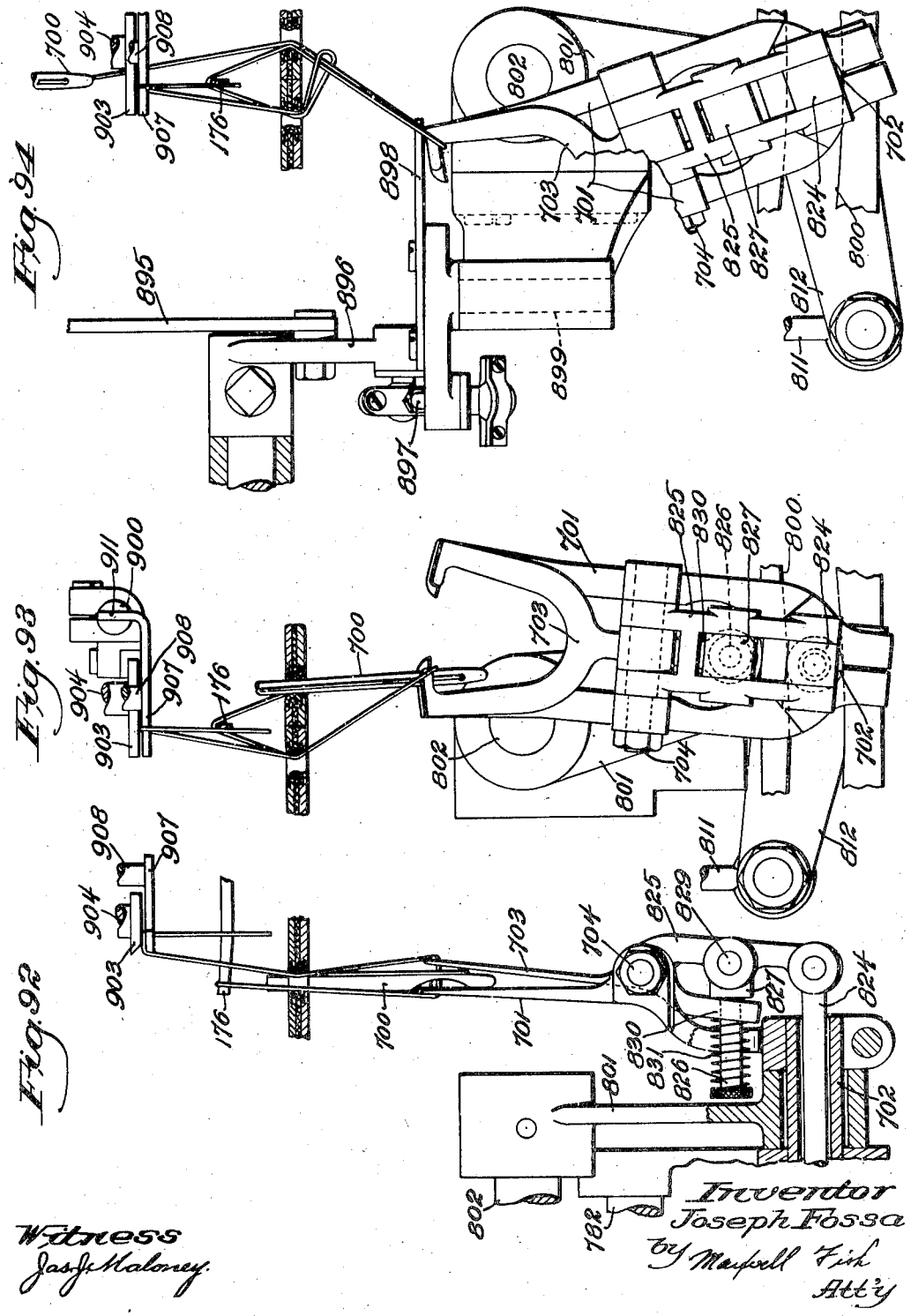

Patented Feb. 15, 1949

2,461,889

UNITED STATES PATENT OFFICE 2,461,889

MACHINE AND METHOD FOR MANUFACTURE OF SHOES

Joseph Fossa, Lynn, Mass., assignor to United Shoe Machinery Corporation, Flemington, N. J., a corporation of New Jersey Application July 19, 1944, Serial No. 545,590

160 Claims. (Cl. 12—51)

The present invention relates to improvements in the manufacture of shoes, and more particularly to an improved method and a machine capable of carrying out that method for the performance of a number of related operations upon a shoe upper preparatory for the assembly of the upper with other shoe parts on a last. The operations with which the present invention is more particularly concerned include the eyeleting of the upper and the lacing of the eyeleted upper.

It is one object of the invention to provide a method of performing a series of related operations upon an upper including particularly the operations of inserting eyelets in the upper, and of lacing the eyeleted upper, which will effect substantial savings both in time and in labor required for the performance of these steps in the manufacture of a shoe. In accordance with this object of the invention, it is proposed to locate an upper in a predetermined position on the work support, and while the upper is so supported, to present the support and upper successively to mechanisms for performing eyeleting, lacing, and if so desired, other related operations upon the upper.

It is another object of the invention to provide a machine which is adapted and arranged for automatic operation for the performance of a series of related operations upon a shoe upper, including eyeleting and lacing.

It is another object of the invention to provide a machine organization particularly adapted for carrying out the steps of applicant's method and including mechanisms adapted for performing the several operations of the series upon an upper presented to each of these mechanisms in turn while mounted in a predetermined position on a work support.

More specifically, it is an object of the invention to provide novel and improved shoe upper supporting and transferring devices and shoe operating mechanisms associated therewith, which are well adapted for the performance of the several operations upon an upper having the portions of the upper adjacent the eyelet slit supported in an opened-out condition, and with the edges of the eyelet flaps in substantially parallel relation.

It is another object of the invention to provide novel loading and operating control devices for the machine which are adapted and arranged for the assistance of the operator in loading and unloading shoe uppers from the machine, and in making necessary adjustments of the several mechanisms in accordance with size and style characteristics of the shoe upper being operated upon, and with minimum requirements for skill and effort on the part of the operator.

It is another object of the invention to provide in a machine of this general description, means for effecting adjustments of the several locating, supporting and actuating mechanisms in accordance with the size of upper being operated upon, and including means automatically operable for transferring a particular size adjustment from one to the other of the several operating mechanisms in synchronism with the transfer of the upper for the performance of the successive operations thereon.

It is a further object of the invention to provide a novel operating and control system for the machine well adapted for causing the several cooperating mechanisms to function in accordance with an automatic cycle, including safety devices operable to prevent the starting of the machine until after the work supporting and holding devices of the machine have been properly located and conditioned for the start of the next operating cycle.

It is another object of the invention to provide a novel and improved eyeleting mechanism which is particularly adapted for use in combination with the lacing mechanism and automatic positioning mechanism herein disclosed and for automatic operation in the illustrated machine.

It is a further object of the invention to provide a novel and improved lacing mechanism which is particularly adapted for use in combination with the eyeleting mechanism and automatic positioning mechanism herein disclosed and for automatic operation in the illustrated machine.

Other objects of the invention are concerned more specifically with the provision of various mechanisms and features of construction embodied in applicant's machine, as hereinafter more fully set forth.

In accordance with the objects above set forth, a machine organization is provided which comprises eyeleting and lacing mechanisms and an automatic shoe upper supporting and transfer mechanism constructed and arranged to present uppers in succession to each of the eyeleting and lacing mechanisms in a predetermined relation. The uppers are arranged to be located in an opened-out condition, and with the eyelet flaps in substantially parallel relation on work supports which are mounted to move with and to be shiftable radially upon a rotatable turret.

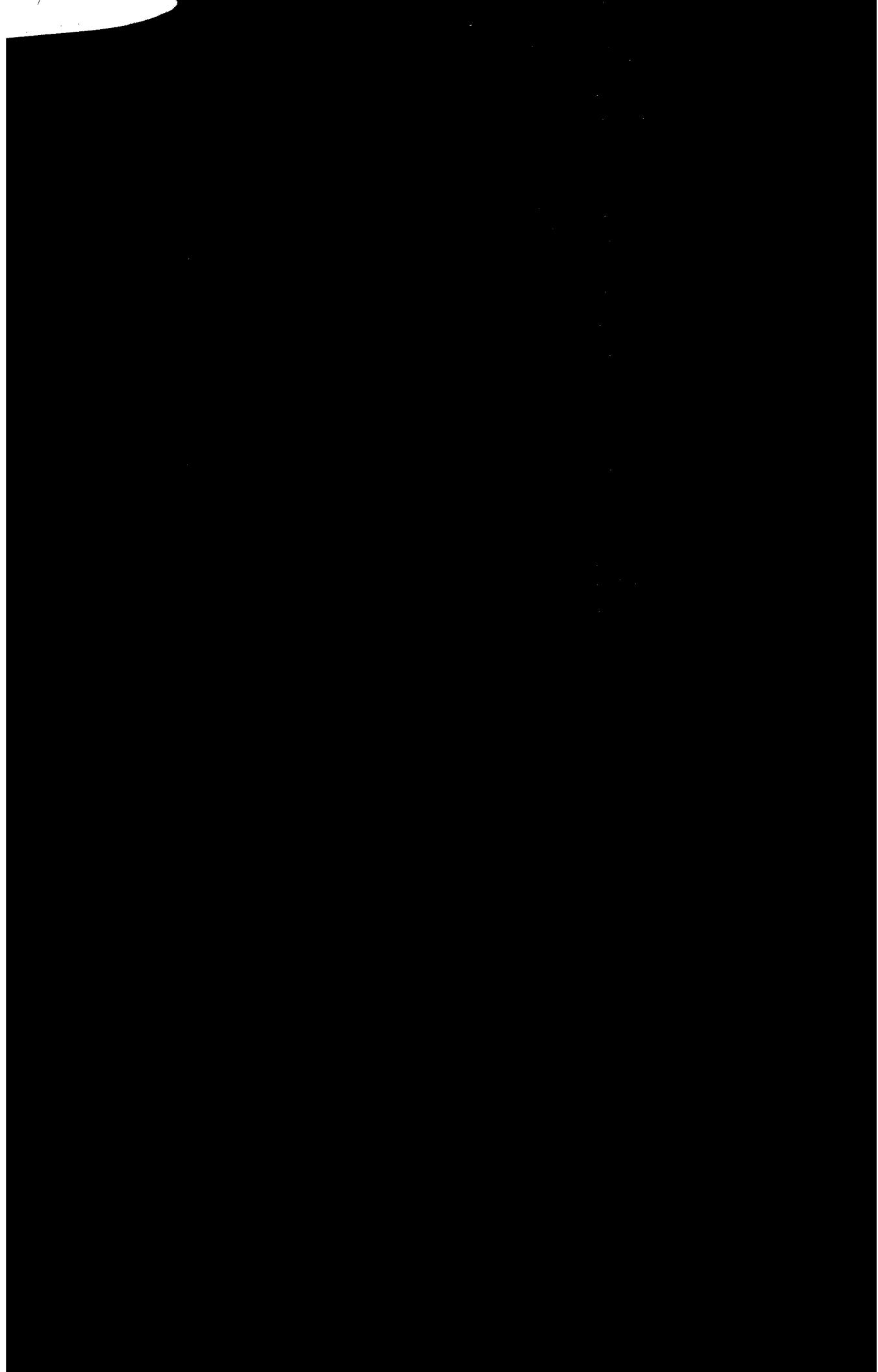

Further in accordance with the invention, provision is made for locating the upper on the work support in a position which is determined in accordance with the size of upper, and for correspondingly adjusting each of the eyeleting and lacing mechanisms for operation upon an upper of that particular size as the work support with the upper supported thereon is presented to each in turn. For effecting the adjustment of the several mechanisms in accordance with the size of the shoe upper to be operated upon, a manual control is provided which is set to the position indicated for the size of shoe upper at the same time that the upper is placed on the work support, and operates to effect the desired adjustment of the locating device. A feature of applicant's construction consists in the provision of means for transferring the size adjustment secured by the setting of the manual control to each of the eyeleting and lacing mechanisms as the work support with the upper mounted thereon is presented to each of these mechanisms in turn.

Specifically, the devices for effecting adjustments of the several upper supporting and operating mechanisms in accordance with the size of shoe upper being operated upon include a manual lever shiftable to a plurality of size positions, and linkage connections actuated thereby for controlling the longitudinal position of the control fin and the positioning pins of the locating device. Adjustment of the sizing lever acts also through appropriate connections to control the position of an adjustable segment of a control cam which is operative to transfer the size adjustment to one and then to the other feed mechanism as the work support is moved first to the eyeleting station and then to the lacing station. The control cam referred to, is arranged to be driven through one complete revolution for each full revolution of the indexing turret. In order that the proper adjustments of the several mechanisms may be effected for each work support in turn at each of the operating stations, the control cam above referred to is provided with four adjustable segmental portions, one being associated with each of the four work supports.

In accordance with the invention, the illustrated machine is organized and arranged to operate in accordance with an automatic cycle which will simplify and reduce to a minimum the work handling and machine manipulation required of the operator. It is the principal task of the operator at the loading station to remove the completed upper and to place a new upper in position on the work support, and to start the machine. In order to locate a new upper in its proper position, the operator first positions the sizing lever in accordance with the size of the shoe upper to be operated upon, then locates the upper on the work support in the position determined by the locating pins and central fin of the locating device, presses downwardly on the foot treadle to cause the upper to be clamped securely in position on its support, and finally moves the vamp spreader downwardly into its operating position. Inasmuch as the movement of the vamp spreader is logically the last operation which will be performed by the operator in connection with the positioning of the new upper in the machine, and cannot readily be accomplished until the other operations referred to have been carired out, this downward movement of the vamp spreader is employed to effect the actual starting of the machine. Movement of the vamp spreader is effective to close an electrical switch which causes the main clutch of the machine to be shifted from the stop to the running position.

The automatic mechanism of the machine acts upon completion of the indexing movement of the turret to put in operation the eyeleting and lacing units, each of which then operates in accordance with an automatic cycle which includes the stepped outward feed of the associated work holder and shoe upper thereon for the performance of the respective eyeleting and lacing operations, and the subsequent rapid return of the work holder to its initial position for indexing with the turret.

The driving mechanism for the machine comprises the main clutch above referred to and a Geneva motion driven thereby which is connected to index the turret through a 90° angle, and then to disengage the main clutch. The operation of the Geneva motion to turn the turret is effective also to engage individual secondary clutches for driving the eyeleting and lacing mechanisms, respectively. The secondary clutches are subsequently disengaged automatically through the agency of clutch shifting devices actuated by the eyeleting and lacing mechanisms upon completion of the eyeleting and lacing operations, respectively. Mechanism is also provided which is controlled from the Geneva mechanism upon the starting of the turret indexing movement to depress the locating device, to remove the turret locking plunger, and to lock the sizing device including the newly adjusted cam segment in its adjusted position. The operation of the Geneva mechanism for indexing the turret also acts through operating connections to release the work clamp and upper guard associated with the support now brought into position at the loading station. Upon completion of the indexing movement the locating device is again raised to its operating position for the locating of a new upper on the work support at the loading station.

Further in accordance with the invention, an electrical control system for the machine is provided which embodies therein an actuating solenoid for the turret driving clutch, and a number of safety switch connections, all of which must be closed before the machine may be started. Such switches are provided in connection with each of the eyeleting and lacing mechanisms, and are shifted to closed position only when the feed slides associated with each of the eyeleting and lacing mechanisms have returned to their fully retracted starting positions. An additional safety switch is provided which is closed by the actuation of the foot treadle to clamp the work on the support at the loading station. The connections for operating this switch are further arranged to prevent the closing of the switch by the actuation of the foot treadle in the event that the work support has failed to open when moved to the loading station, so that there is no possibility that a previously eyeleting upper may be inadvertently subjected to a second eyeleting operation of the machine. Assuming that each of the eyeleting and lacing mechanisms is located in its proper starting position, and that the operator has actuated the foot treadle to clamp a newly located upper on the work support, the manual operation of moving the vamp spreader downwardly to work engaging position operates through the closing of a starting switch to energize the clutch solenoid to start the machine in operation.

Further in accordance with the invention, individual manual controls are provided for disabling each of the eyeleting and lacing mechanisms, so that either of these mechanisms will not be rendered operative automatically when the machine is started. These manual controls are employed to disconnect either of the eyeleting or lacing mechanisms so that they will not be rendered operative when the indexing movement of the turret causes an empty work support to be brought into register therewith as, for example, when the machine is initially loaded or is stripped of its last work piece.

The several features of the invention consist also in the devices, combinations and arrangement of parts and in the method herein disclosed which, together with the advantages to be obtained thereby, will be readily understood by one skilled in the art from the following description taken in connection with the accompanying drawings, in which Fig. 1 is a plan view of applicant's automatic machine for performing successive eyeleting and lacing operations upon shoe uppers;

Fig. 2 is a front elevation of the machine shown in Fig. 1;

Fig. 3 is an electrical diagram showing the electrical connections for starting the machine and including safety devices for preventing inadvertent starting of the machine;

Fig. 6 is a rear elevation of the machine;

Fig. 7 is an enlarged front elevational view of the base of the machine with portions of the casing broken away to show underlying parts, and illustrating particularly the driving connections in the base and certain of the operating controls;

Fig. 8 is a sectional plan view illustrating the driving connections for the turret and size adjustment transfer mechanism;

Fig. 9 is a detail plan section of the turret driving clutch shown in Fig. 8;

Fig. 10 is a plan view of a portion of the machine including particularly the turret and the work holders with shoe uppers supported on three of the four work holders;

Fig. 11 is a sectional view in right side elevation taken on the line 11—11 of Fig. 10;

Fig. 12 is a fragmentary plan view of the top plate or table of the turret, one sector being illustrated with the work holder and guideway therefor removed, and another sector being shown with the work holder and guideway in place, but with the several fittings including clamps and upper guard removed;

Fig. 12a is a fragmentary detail view in perspective of the cam and follower connection forming part of the eyeleting machine feed mechanism, the parts being shown in the position following the stepped feed of the connection from the position shown in Fig. 12;

Fig. 12b is a sectional view taken on the line 12b—12b of Fig. 12a;

Fig. 13 is a perspective detail view showing a portion of the bifurcated hook associated with the eyeleting machine feed slide for imparting feeding movement to the work holder, the hook being shown in a retracted position with relation to the rim of the locking rim of the turret;

Fig. 14 is a sectional view taken on the line 14—14 of Fig. 13;

Fig. 15 is a sectional plan view of the turret and certain of the actuating and controlling devices associated therewith taken on a line 15—15 of Fig. 11;

Fig. 16 is a somewhat diagrammatic perspective view of the actuating controls shown for the most part in Fig. 15, and arranged for cam actuation to raise and lower the locking device, to release and subsequently to return the turret locking pin to its locking position, and to start each of the eyeleting and lacing mechanisms in operation;

Fig. 17 is a sectional view through the turret in front elevation taken on a line 17—17 of Fig. 15;

Fig. 18 is a fragmentary detail view, partly in section and on an enlarged scale, of the yieldable supporting elements on the work holder against which the upper is pressed by the clamping member;

Fig. 19 is a sectional view taken on the line 19—19 of Fig. 17, and looking from the left side of that view;

Fig. 20 is a detail plan view of the size adjustment control mechanism including particularly the connections for controlling the size adjustment of the locking device;

Fig. 21 is a view in front elevation of the size adjustment control mechanism shown in Fig. 20;

Fig. 22 is a sectional view on the line 22—22 of Fig. 21, illustrating the means for effecting a proportional adjustment of the locating device;

Fig. 23 is a detail view in perspective illustrating particularly the parts of the locating device assembly;

Fig. 24 is a somewhat fragmentary view in front elevation of the size adjustment control mechanism, and particularly of the means for transferring those adjustments to each of the operating stations of the machine in turn;

Fig. 25 is a fragmentary plan view of the cam follower lever and connections to the eyeleting machine shown in Fig. 24;

Fig. 26 is a somewhat fragmentary view in perspective of the size adjustment transfer cam drum, but with the wing cams removed;

Fig. 27 is an end view looking from the left of Fig. 24 of the size adjustment transfer cam assembly including the several operating controls associated therewith;

Fig. 28 is a somewhat fragmentary enlarged detail view of the size adjustment transfer cam drum substantially as shown in Fig. 27;

Fig. 31 is a view in elevation looking from the left of Fig. 29, showing the eyeleting mechanism;

Fig. 32 is an enlarged detail view in front elevation of the toggle actuating connection for the eyelet locating spindles;

Fig. 33 is a detail sectional view looking from the right of Fig. 31, of one of the eyelet set units;

Fig. 34 is a view in rear elevation of the eyeleting mechanism, illustrating particularly certain of the control and clutching mechanisms associated therewith;

Figure 29:
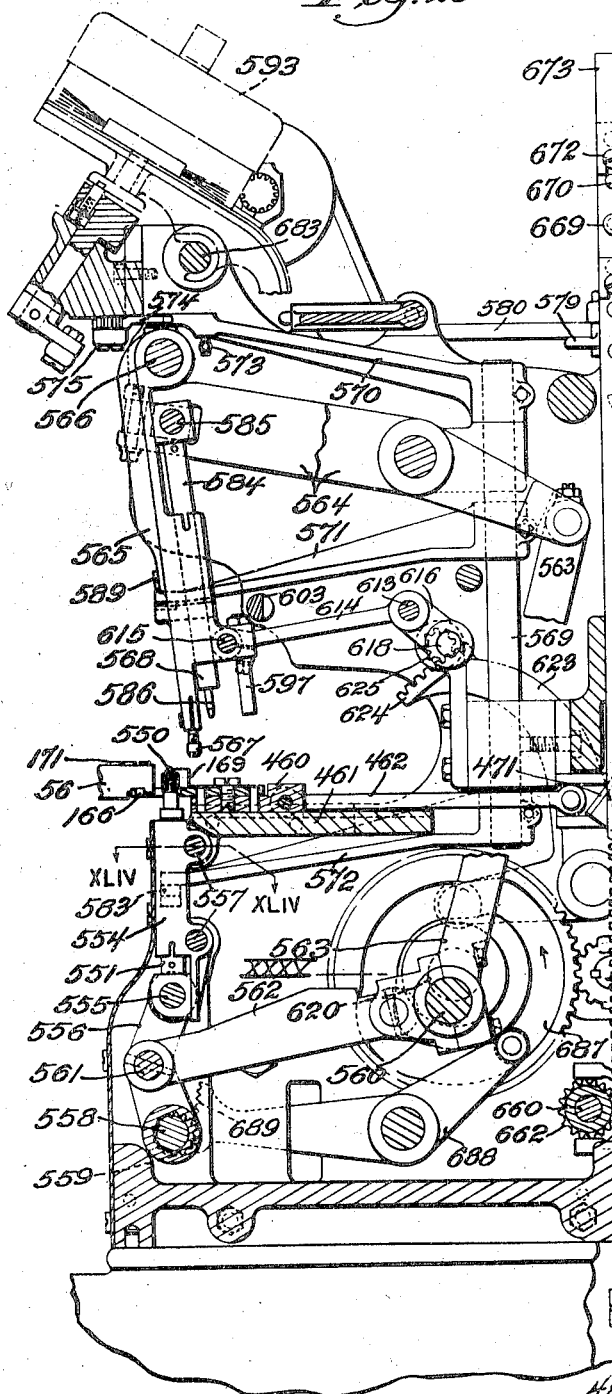
Fig. 29 is a view in front elevation partly in section of the eyeleting mechanism of the machine.
Figure 30:
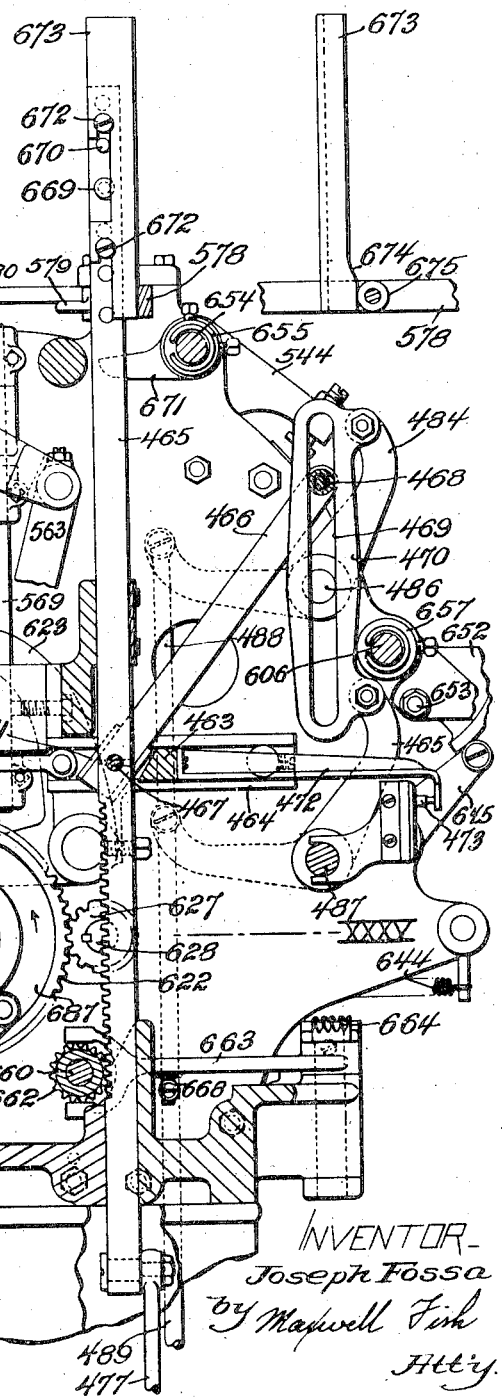
Fig. 30 is a detail view in elevation looking from the left of Fig. 29, illustrating the mechanism controlled from the feed bar for adjusting the spread or widthwise spacing of the eyelets.
Figure 57:
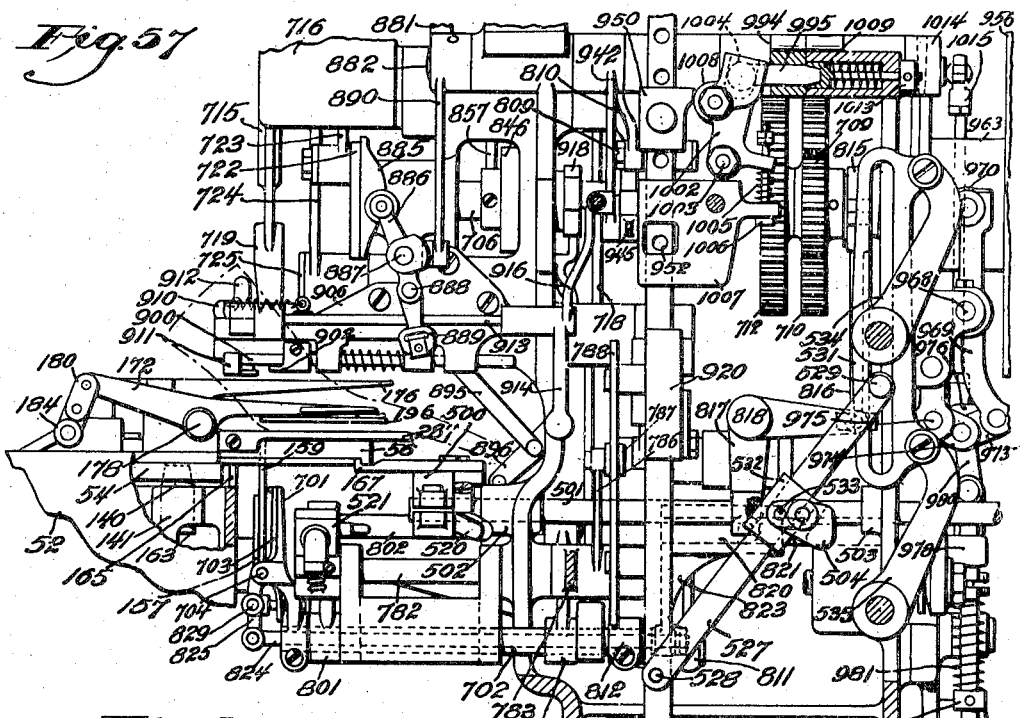
Figure 58:
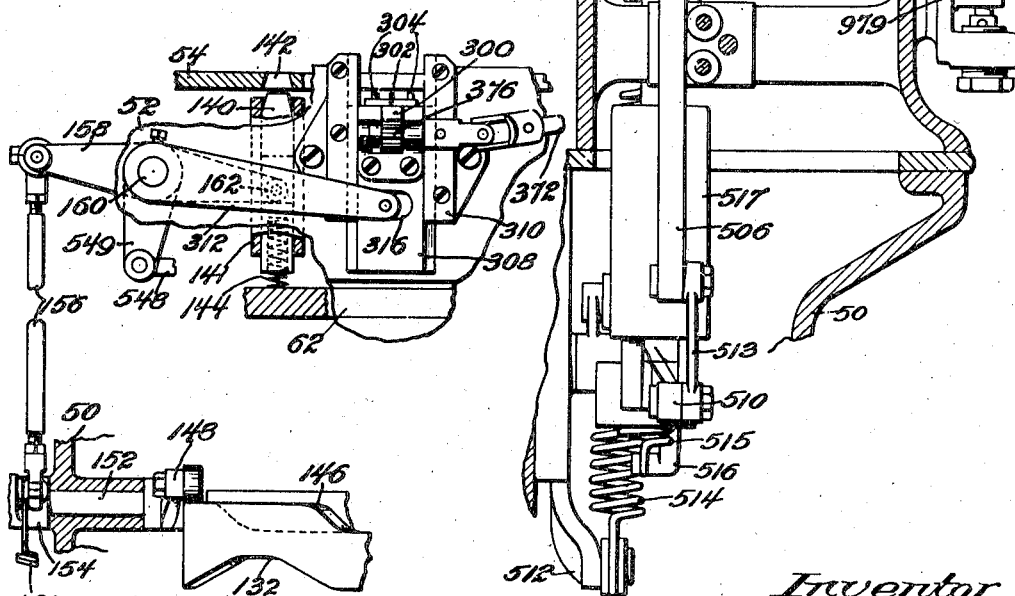
Figure 59:
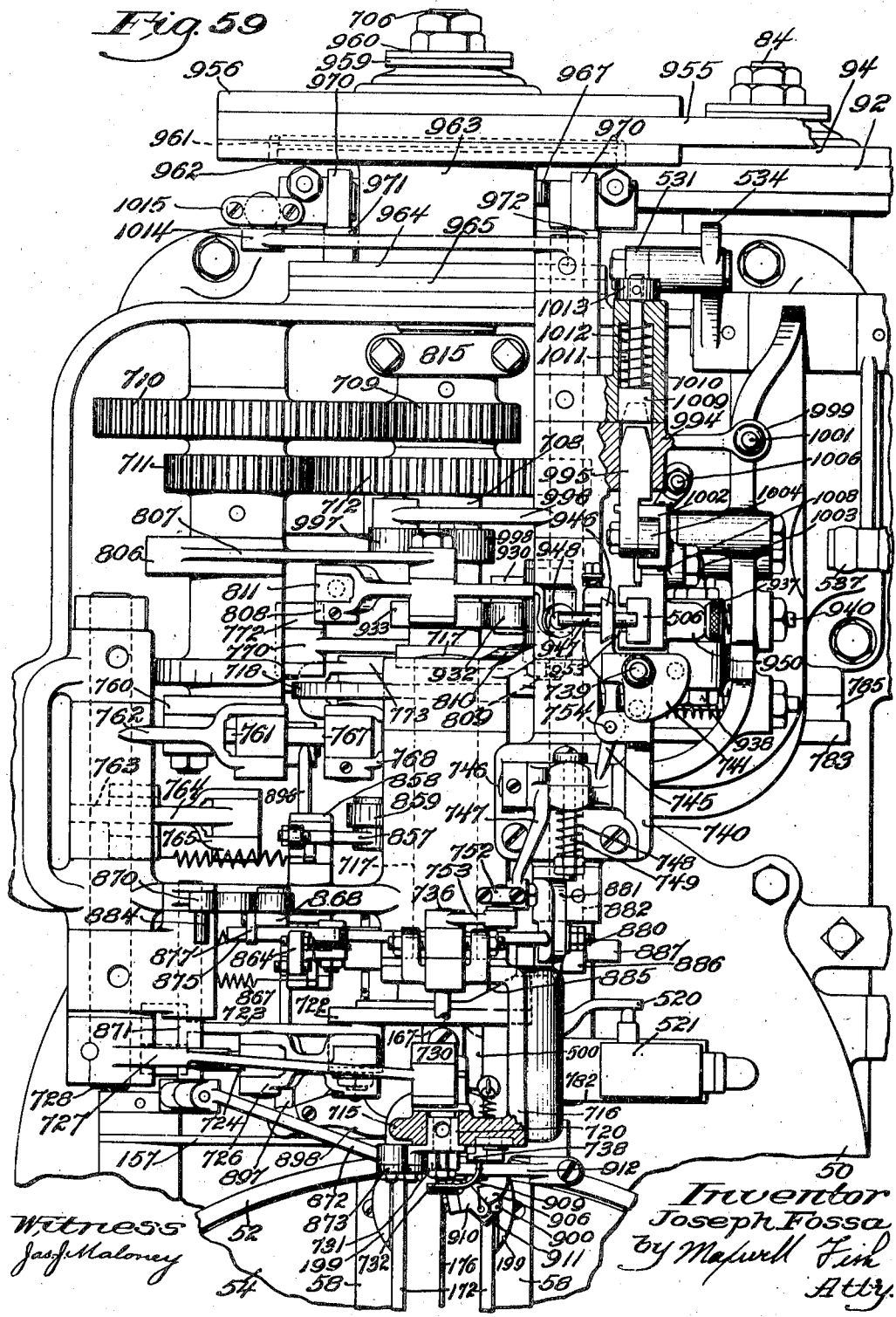
Figure 60:
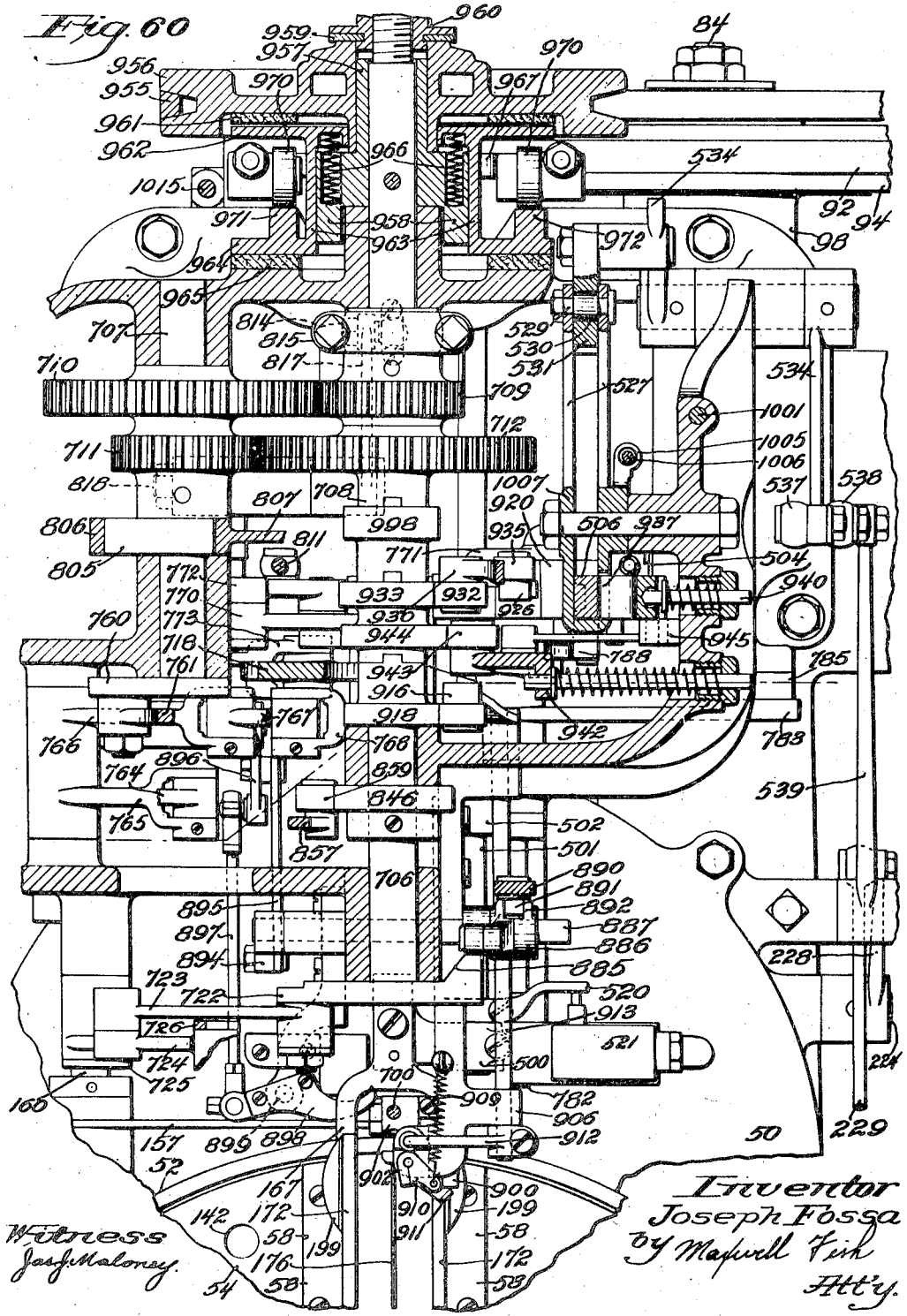
Figure 61:
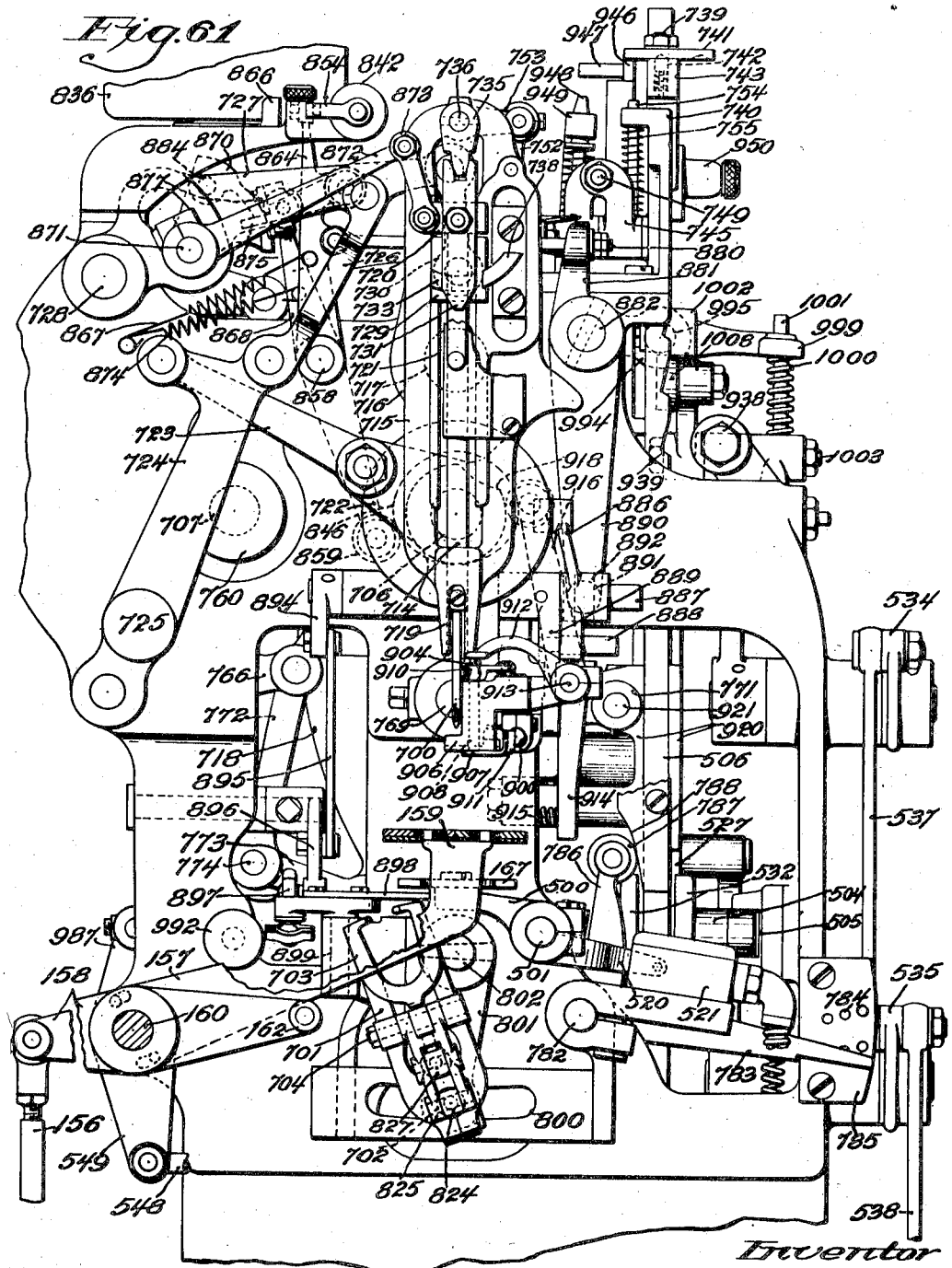
Figure 62:
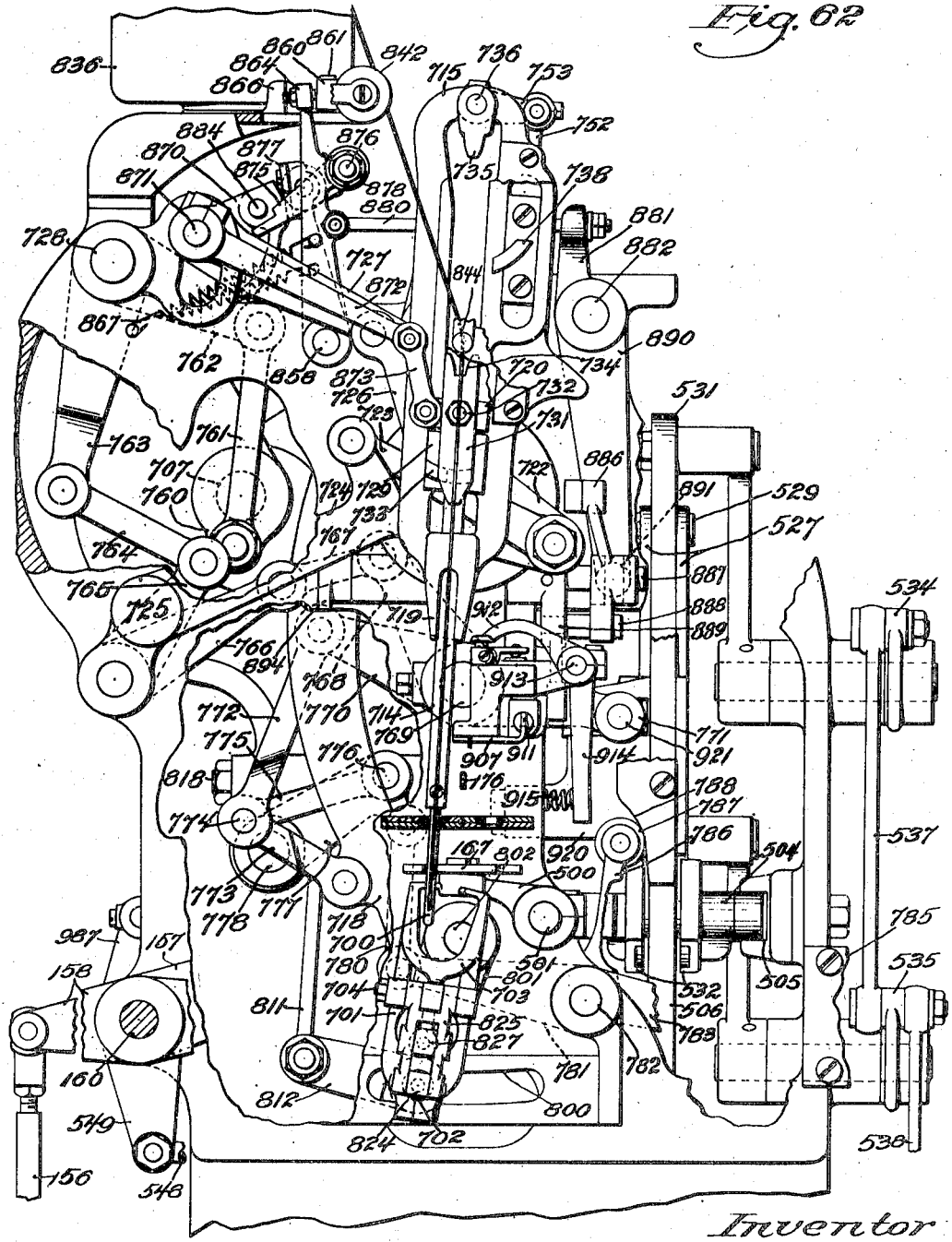
Figure 63:
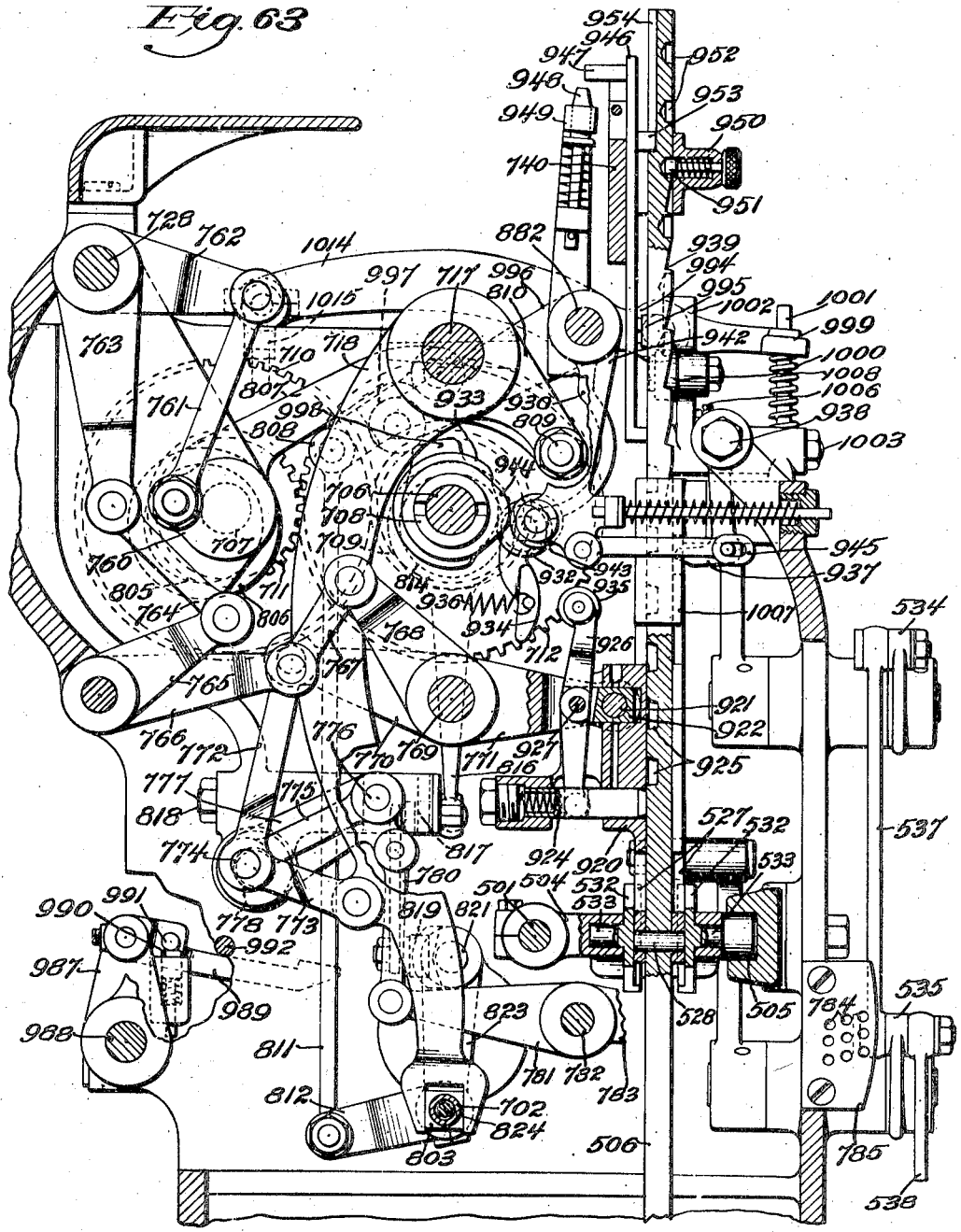
Figure 80:
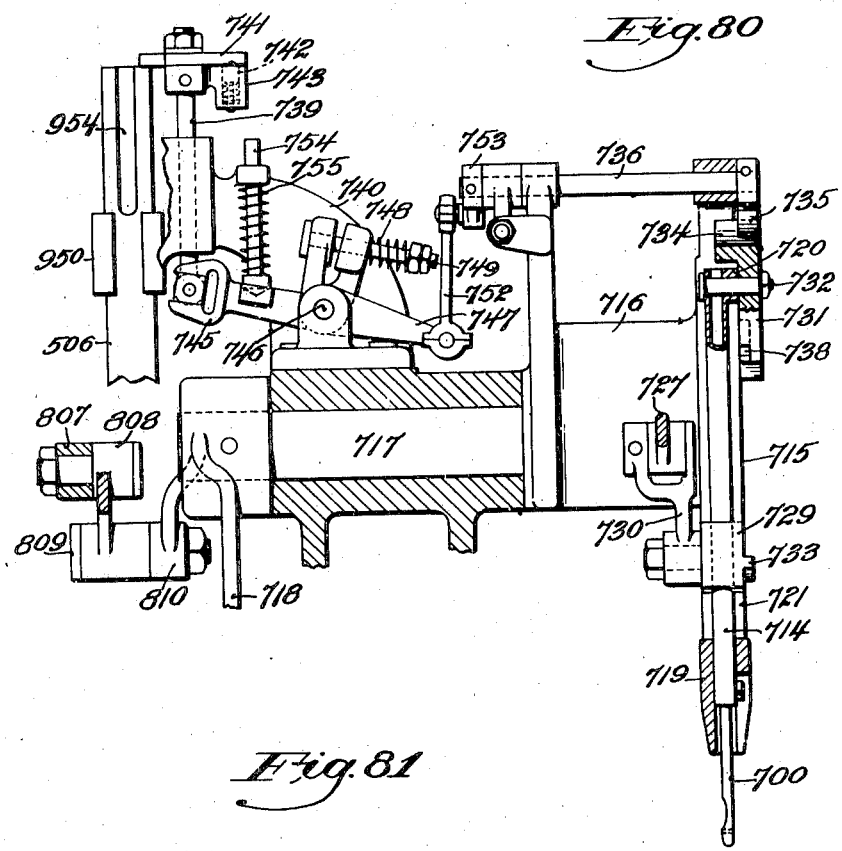
Figure 81:
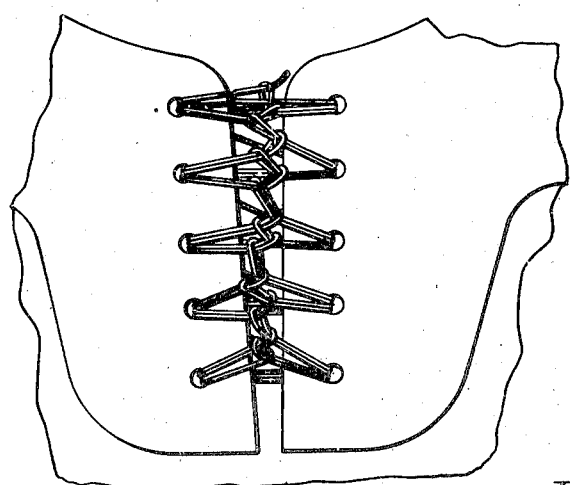
Figure 86:
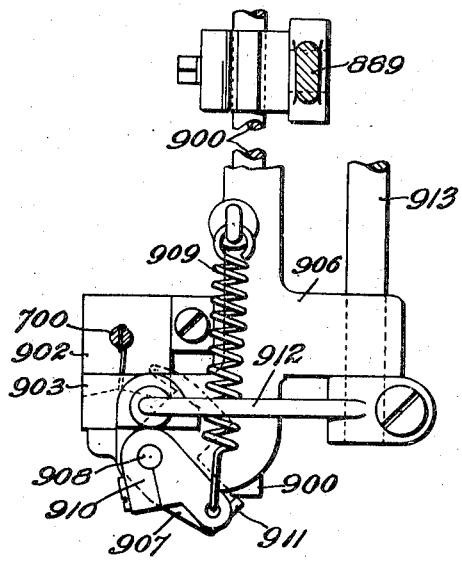
Figure 88:
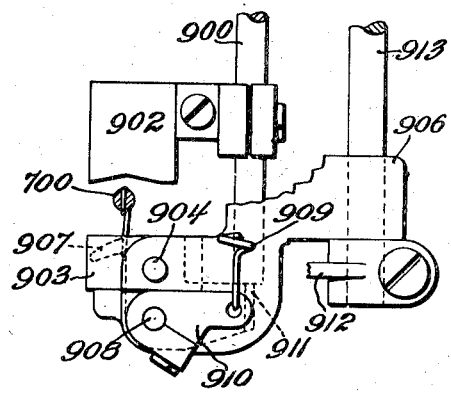
Figure 87:
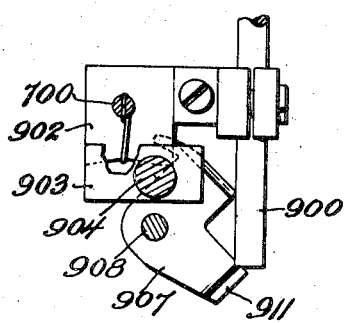
Figure 89:
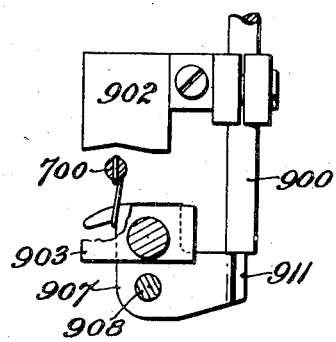
Figures 90, 91:
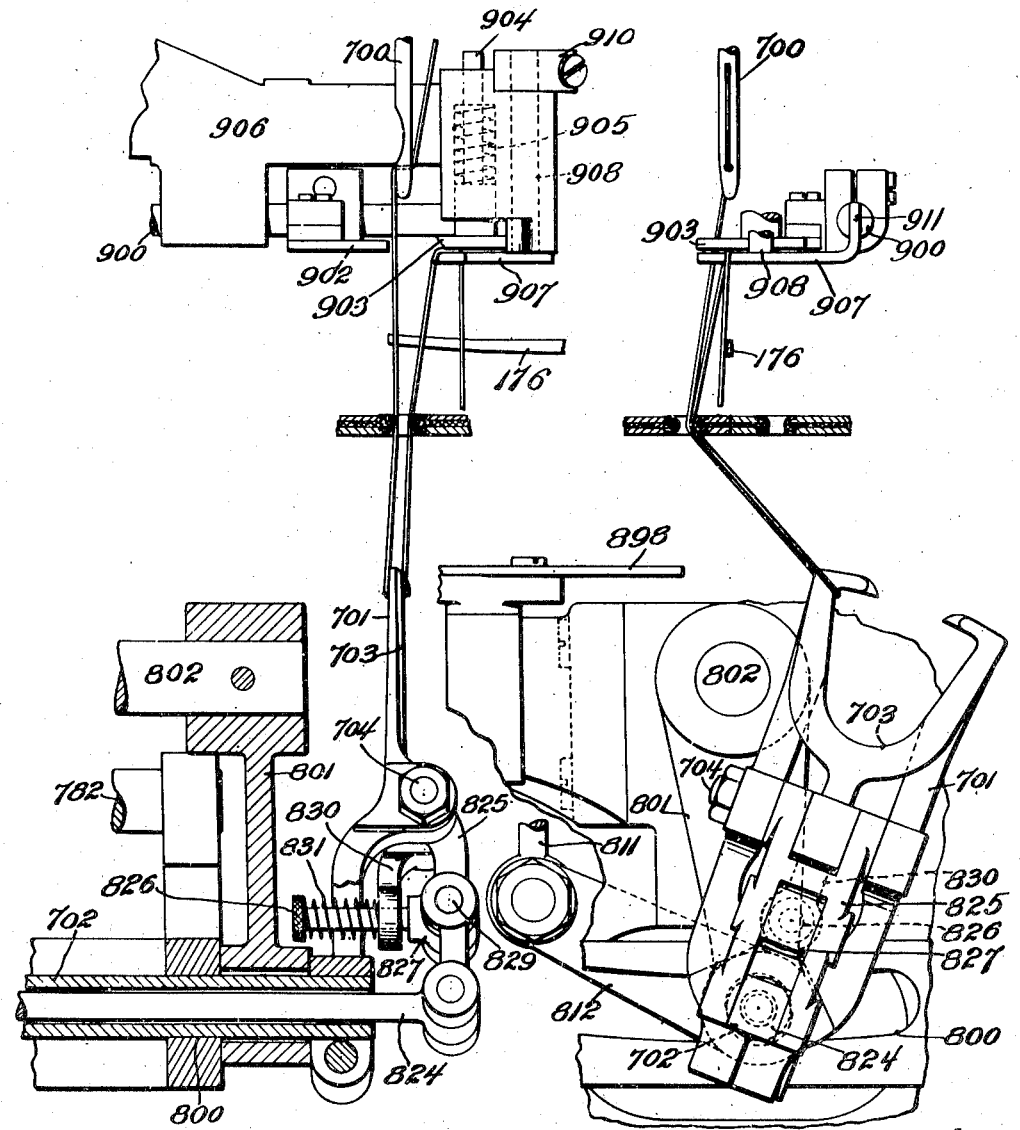

Fig. 35 is a sectional plan view illustrating particularly the driving and control mechanism for the eyeleting mechanism including the clutch shiftable to throw the eyeleting mechanism into and out of operation, and the driving connections to the crank shaft, together with certain of the driving and control mechanisms for the eyelet forming and work feeding devices associated with the eyeleting mechanism;

Fig. 36 is a detail sectional view taken on a line 36—36 of Fig. 35, illustrating particularly the cam shift surfaces associated with the driving and stopping clutch for the eyeleting mechanism;

Fig. 37 is a somewhat fragmentary detail view of the operating connections for shifting the eyelet positioning elements and setting tools forwardly and rearwardly of the machine;

Fig. 38 is an end view of the crank shaft of the machine, showing the intermittent driving connections for imparting a stepped feeding movement to the feed bar, together with the cam and follower connections from the crank shaft for moving the eyelet positioning members between their lowered and raised positions;

Fig. 39 is a plan view of the eyeleting mechanism with upper portions of the machine including the eyelet magazine removed to illustrate underlying parts;

Fig. 40 is a fragmentary detail plan view illustrating the connections between the setting tool plungers and their supporting and actuating levers;

Fig. 41 is a fragmentary detail plan view of the eyelets spacing control arms as shown in Fig. 39;

Fig. 42 is a detail perspective view illustrating particularly the variable widthwise eyelet spacing control cam bracket on the feed bar and the follower roll engaged thereby shown also in Fig. 30;

Fig. 43 is a sectional plan view of the eyeleting mechanism taken on a level to illustrate particularly the intermittent step work feed and clutch mechanism associated with the eyeleting mechanism;

Fig. 44 is a detail sectional plan view taken on a line 44—44 of Fig. 29;

Fig. 45 is a detail view in front elevation of the eyelet magazine and conveyer;

Fig. 46 is a somewhat fragmentary view looking from the right of Fig. 45, illustrating particularly the conveyer mechanism;

Fig. 47 is a detail sectional plan view of the lower end of the magazine guideway for feeding eyelets to the eyelet mechanism;

Fig. 48 is an enlarged detail view partly in section of the lower portion of the guideway and shield shown in Fig. 45, and with the punch in position for the punching operation;

Fig. 49 is a view similar to Fig. 48, but illustrating a different position of the parts with the eyelet tool in the process of locating an eyelet in the work;

Fig. 50 is a still further enlarged detail view in section illustrating the position of the eyelet positioning tool and anvil in the identical position of Fig. 49;

Fig. 51 shows the parts in a subsequent position in which the eyelet has been clenched into position;

Fig. 52 is an enlarged sectional view showing in further detail the position of the parts as in Fig. 51;

Fig. 53 is an enlarged detail sectional view of the eyelet blank tool;

Fig. 54 is a fragmentary view in rear elevation of the cam and follower connections for producing the secondary motion of the bearing members supporting the punch beds and eyelet inserting tools;

Fig. 55 is an enlarged detail view in elevation looking from the right of Fig. 29, illustrating the spring return and snubber mechanisms for the feed bar associated with the eyeleting mechanism;

Fig. 56 is a view in right side elevation of the lacing mechanism of the machine;

Fig. 57 is a view in right side elevation partly in section of the lacing mechanism shown generally in Fig. 56, but with the work support and feed mechanism associated therewith in the fully extended feed position;

Fig. 58 is a fragmentary detail view in front elevation and partly in section of the mechanism for raising and lowering the shoe upper locating device and the locking bolt for the work supporting turret;

Fig. 59 is a top plan view of the lacing mechanism shown in Fig. 56, but with certain parts including the thread locks removed or sectioned to show underlying parts;

Fig. 60 is a sectional plan view of the lacing mechanism, the section line being taken at the level of the main cam shaft to illustrate particularly the driving clutch for the lacing mechanism, the several shafts driven therefrom, a portion of the feed mechanism, and certain of the actuating connections for the lace forming instrumentalities of the machine;

Fig. 61 is a view in front elevation of the lacing mechanism, the parts being shown with the needle in the retracted stop position;

Fig. 62 is a view similar to Fig. 61 showing the lacing mechanism in front elevation but with the needle fully extended through the eyeleted upper at the limit of its first downward stroke and with the looper arm engaged with the needle loop;

Fig. 63 is a sectional view of the lacing mechanism in front elevation, particularly the driving connections for imparting a lateral swinging movement to the needle and looper mechanism and for imparting a stepped advancing movement to the feed bar;

Fig. 64 is a sectional view of the lacing mechanism in left side elevation on a section line which extends downwardly through the center of the machine, the parts being shown in the stopped position as in Fig. 61;

Fig. 65 is a sectional view of the lacing mechanism in front elevation illustrating particularly the mechanisms for imparting a lateral swinging movement to the needle and the looper mechanism, the mechanism for imparting the stepped movement to the feed bar, and the mechanism for controlling or limiting the stepped movement of the feed bar, the parts being shown in the position taken with the needle down during the formation of the first stitch;

Fig. 66 is a detail sectional view of the step feed mechanism shown in Fig. 65, but with the feed lever in its fully retracted position;

Fig. 67 is a detail sectional view of the feed mechanism but with the locking plunger in alignment with one of the notches in the feed bar, the parts being shown in the position taken at the beginning of the last lace forming cycle with the feed bar at the limit of its feeding movement;

Fig. 68 is a view similar to Fig. 67 taken during the last lace forming cycle but with the feed element for actuating the feed bar raised, and the stop pawl for the feed bar about to be released;

Fig. 69 is a detail sectional plan view taken on the line 69—69 of Fig. 68;

Fig. 70 is a detail sectional view taken on the line 70—70 of Fig. 68;

Fig. 71 is a fragmentary detail plan view illustrating particularly the regular thread lock and the alternately available means for actuating said thread lock;

Fig. 72 is a detail sectional view taken on the line 72—72 of Fig. 71, illustrating the cam actuated connection for operating the regular thread tensioner;

Fig. 73 is an enlarged fragmentary view partly in section illustrating the thread clamp and the regular thread tension control device for operating the same;

Fig. 74 is a sectional view in front elevation taken on the line 74—74 of Fig. 71, illustrating particularly the cam control mechanism for releasing the thread tension during a portion of the formation of the first stitch;

Fig. 75 is a view of the mechanism illustrated in Fig. 74, but with the tension released;

Fig. 76 is a view similar to Fig. 75, but with the parts shown in a different position;

Fig. 77 is a detail view in front elevation illustrating particularly the mechanism for disconnecting the needle reciprocating mechanism, the parts being shown in position to disconnect the lacing needle from its actuating mechanism;

Fig. 78 is a similar view but showing the needle retracted;

Fig. 79 is a fragmentary plan view illustrating particularly the mechanism for connecting and disconnecting the needle, this mechanism being shown in Fig. 59 in a different position for a different position of the parts;

Fig. 80 is a view in left side elevation, partly in section, illustrating particularly the control mechanism for connecting and disconnecting the needle, the parts being in the position shown in Fig. 79;

Fig. 81 is a somewhat diagrammatic view of a portion of the shoe upper, eyeleted, and with the completed lacing therein, and looking at the outer face of the upper;

Fig. 82 is a somewhat fragmentary detail view partly in section, in left side elevation, illustrating particularly the thread clamping mechanism, the parts being shown in stopped position;

Fig. 83 is a view in front elevation of the parts shown in Fig. 82;

Fig. 84 is a view similar to Fig. 82, but with the parts shown in running position;

Fig. 85 is a view in front elevation of the parts shown in Fig. 84;

Fig. 86 is a plan view of the thread gripping or clamping mechanism in the stopped position shown in Fig. 82;

Fig. 87 is a sectional plan view of a portion of the clamping mechanism illustrated in Fig. 86;

Fig. 88 is a view similar to Fig. 86, but with the parts in running position;

Fig. 89 is a sectional plan view illustrating the hook portion of the thread clamp with the parts in the position indicated in Fig. 88;

Fig. 90 is an enlarged detail sectional view in left side elevation illustrating particularly the looper mechanism;

Fig. 91 is a view in front elevation of the parts shown in Fig. 90, the parts in these figures being shown in the position subsequent to the first position taken when the needle has completed its first advancing and retracting movement;

Fig. 92 is a view in left side elevation illustrating particularly the looper mechanism with the needle at the limit of its loop drawing stroke for the formation of the third stitch of the group forming a single eyelet lacing;

Fig. 93 is a view in front elevation of the parts shown in Fig. 92, and in the same position; and Fig. 94 is a view in front elevation of the needle and looper mechanism in still another position.

Turret mechanism

The machine for operating upon shoe uppers illustrated in the drawings as embodying in a preferred form the several features of the present invention, comprises a base portion 50 upon which is mounted within a cylindrical casing 52 (Fig. 11) an indexing work supporting turret 54. The turret provides support for four work holders 56 which are slidable radially toward and away from the axis of rotation of the turret on ways 58 (Fig. 10) spaced 90° apart around the turret. At the front side of the machine, there is provided a locating station which comprises locating mechanism generally indicated at P for the assistance of the operator in locating and clamping successive uppers on the work holders. At the remaining stations, proceeding in a counterclockwise direction around the turret, there are provided an eyeleting mechanism generally indicated at I, a lacing mechanism generally indicated at L, and a fourth station at the left in the vicinity of which the work holding clamps are released.

The indexing turret 54, as best shown in Figs. 10, 11, 12 and 17, takes the form of a disk which is secured to the flanged upper end of a vertically disposed hollow shaft 60 which extends downwardly through the turret casing 52 and bed plate 62 for the same. The shaft 60 is supported to turn within a bearing sleeve member 64, a flanged lower end of which is rigidly secured to the bed plate 62. The turret 54 and hollow shaft 60 are supported vertically in position by means of an end thrust bearing 66 interposed between the lower end of the shaft 60 and a hollow bearing block 68 secured to the machine frame.

Figure 4:
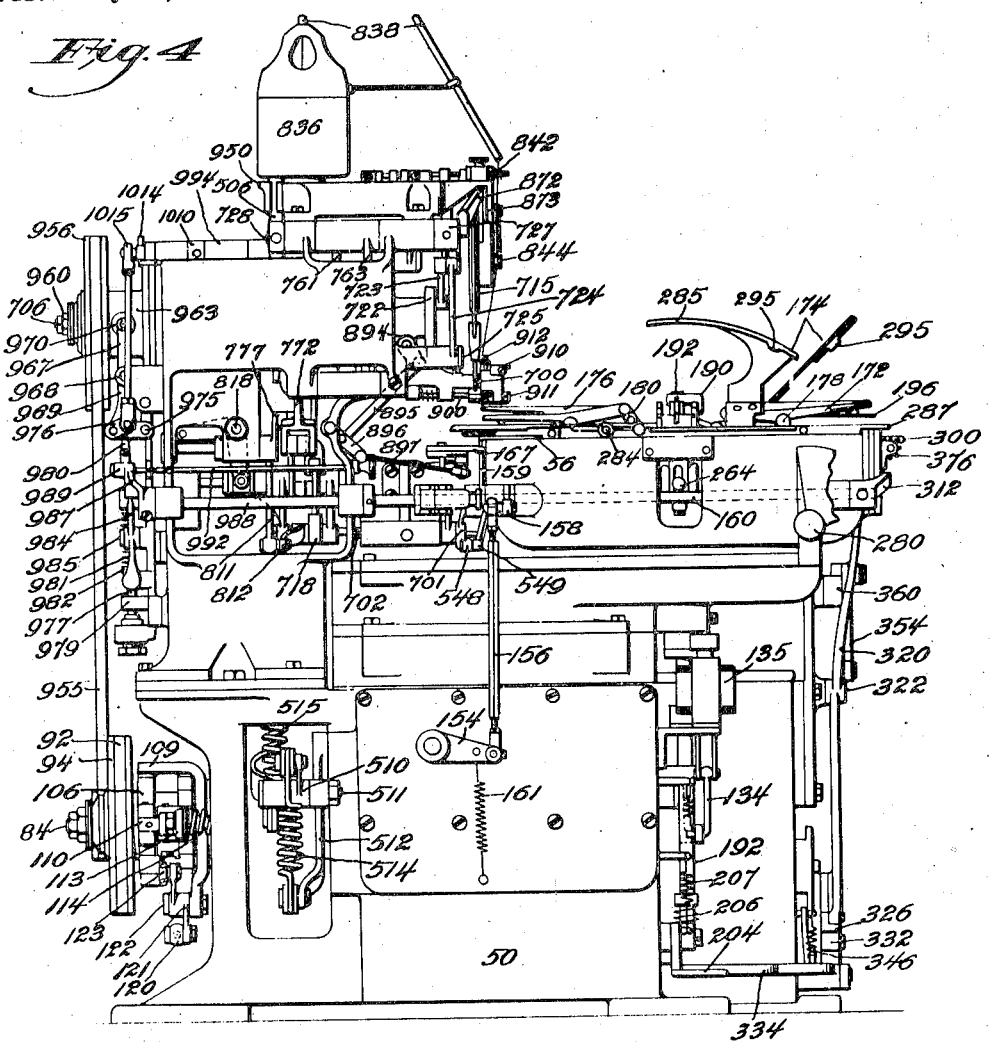
Fig. 4 is a left side elevation of the machine.
Figure 5:
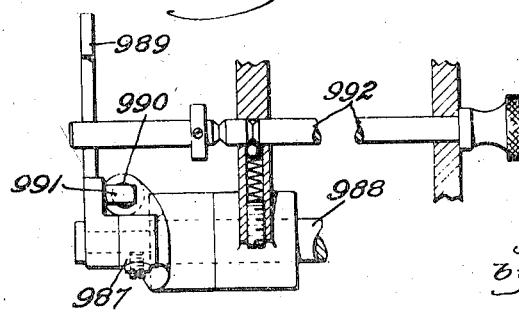
Fig. 5 is a detail plan view, partly in section, showing the control knob and connections therefrom for disabling the automatic starting control for the lacing machine.

The turret 54 is arranged to be driven through successive quarter turns from a continuously driven motor at the rear of the machine through connections which include a Geneva mechanism and a clutch which is arranged to be automatically disconnected when the turret has been turned through one index. The driving connections comprise specifically a star wheel 70 secured to the hollow shaft 60 beneath the bed plate 62 and having formed thereon four radially disposed slots 72 which are engaged in turn by a roll 74 mounted on a Geneva driving arm 76 on a vertically disposed drive shaft 78. A worm wheel 80 secured to the lower end of the drive shaft 78 meshes with a worm 82 (see Figs. 7, 8, 10 and 15) on the forward end of a drive shaft 84 which extends rearwardly through the base of the machine. The shaft 84 is driven from an electric motor 86 (see Figs. 1, 4 and 6) through connections which include a driving pulley 88 on the armature shaft 90 of the motor, a driving belt 92 and a driving pulley 94 concentric with the drive shaft 84. An intermittent driving impulse is imparted to the shaft 84 from the pulley 94 through a clutching and braking mechanism which (as indicated in Figs. 8 and 9), comprises a friction clutch disk 96 secured to one face of the pulley 94, a stationary friction braking surface 97, and a cooperating sleeve clutch member 98 which is keyed to rotate with the drive shaft 84 and is shiftable axially thereon between driving and braking positions. The clutch member 98 is arranged to slide on a sleeve support 100 rigidly secured to the shaft 84, and is keyed to turn therewith by means of pins 102 seated in recesses formed respectively in abutting faces of the sleeve support 100 and clutch member 98. Alternating with the pins are a number of coiled compression springs 104 which are similarly seated in recesses in the sleeve support 100 and clutch member 98 and which tend normally to maintain the clutch member 98 in engagement with the driving friction clutch disk 96.

The mechanism for shifting the clutch comprises a forked clutch lever 106 which carries rolls 107 arranged to engage against concentric bearing rings 108 formed on the flanged forward end of the clutch member 98. The clutch lever 106 is pivotally supported intermediate its length on a bracket 109, and is arranged to be acted upon at its rear end by a toggle connection comprising links 110, 112, the latter of which is pivotally supported on a spring-seated lever arm 113 connected at one end of the bracket 109. A compression spring 114 coiled about a stud 115 which extends through an aperture in the lever arm 113 acts to engage the arm yieldingly against a stop nut 116 threaded to the outer end of the stud.

The toggle connection 110, 112 for actuating the main clutch is moved to a straightened position to shift the clutch member 98 to its disengaged position and is broken to permit the shifting of the clutch member 98 to its engaged position by connections including a control rock shaft 118 extending through the base from the rear to the front of the machine (see Figs. 6, 7 and 8). A lever arm 119 secured to the rear end of the rock shaft is connected by a link 120 with one arm of a lever 121 arranged to turn on a pivot 122 fixed to the machine base (see Fig. 6). The other arm of the lever 121 is connected by a link 123 with an arm 124 secured to turn as a unit with the toggle link 110. The control rock shaft 118 is rocked from one to the other of alternate positions to straighten and to break the toggle connection by means of a latch mechanism including an upwardly extending latch 125 (see Figs. 2, 7 and 8) fixedly secured to the forward end of the rock shaft 118, and arranged for engagement with an abutment formed on a horizontally extending detent rod 126. A tension spring 127 connected between the latch lever 125 and a pin on the machine frame, tends to rock the latch 125 and rock shaft 118 in a counterclockwise direction to break the toggle connection 110, 112 and thereby to start the machine. In the stop position of the machine illustrated, for example, in Fig. 7, the latch is engaged against the detent rod 126 so that the toggle connection is held in its straightened position.

The detent rod 126 is supported intermediate its length on a downwardly extending arm 128 fast on a short rock shaft 129 pivoted on the frame, which at its rear end carries a laterally extending cam lever 130 and cam roll 131 for engagement with a ring face cam 132 formed on a cam disk 133 on the drive shaft 78 of the Geneva motion (Figs. 7 and 11). At its left hand end, the detent rod 126 is connected by a link 134 with the armature shaft 138 of a solenoid generally indicated at 135. A tension spring 136 connected to the detent rod 126 tends to rock the same in a clockwise direction in order to maintain the shouldered portion in engagement with the latch 125 and to move the armature shaft upwardly to a retracted position within the solenoid 135. A tension spring 137 connected to the downwardly extending lever arm 128 tends to rock the lever arm 128, rock shaft 129 and cam lever 130 in a clockwise direction to maintain the follower roll 131 in engagement with the cam 132. The solenoid 135 forms part of an electrical starting circuit for the machine indicated in diagrammatic form in Fig. 3, and hereinafter to be fully described. Briefly, the connections referred to include a manually operable starting switch 289 which acts, assuming switches 211, 473 and 521 are closed, to energize coil 297 and to close switch 298 which in turn energizes the machine starting solenoid 135.

The operation of the mechanical controls for engaging the main clutch of the machine when rendered operative by the energizing of solenoid 135, will be reviewed briefly as follows: The armature shaft 138 is depressed with link 134 by solenoid 135 to the lower limit of its movement determined by engagement of the enlarged upper end of shaft 138 with the frame of the solenoid, causing the detent rod 126 to be rocked in a counterclockwise direction to release the latch 125, so that the rock shaft 118 is permitted to turn in a counterclockwise direction, as seen in Fig. 7, under the influence of spring 127 to actuate lever 119 at the rear of the machine (Fig. 6) and thus to break the toggle connection 110, 112 (Figs. 8 and 9) and engage the main machine clutch. As previously pointed out, the engagement of the clutch causes a rotational movement to be imparted to the drive shaft 78 of the Geneva motion. At the completion of one operating cycle of the main operating mechanism in which the turret is indexed, the several work supports are conditioned for operation at the next succeeding station, and the eyeleting and lacing mechanisms are started in operation, the main operating mechanism is again rendered inoperative. When the drive shaft 78 has turned through substantially one revolution, the follower roll 131 will move into the cut-away portion of cam 132, causing the rock shaft 129 and lever arm 128 to be rocked in a clockwise direction, so that the detent rod 126 is moved to the left. Inasmuch as the solenoid 135 will by this time have been de-energized by the breaking of one or more of switches 211, 473 and 521 (Fig. 3) as hereinafter set forth, the action of spring 136 tending to depress the right-hand end of the detent rod 126 will cause the shouldered portion thereof to drop into engagement with the latch 125 which is at this time held in its limiting position to the left in engagement with a stop pin 139. Continued rotation of the cam disk 133 now causes the roller 131 to ride out of the cut-away portion of the cam 132 to the position illustrated in Fig. 7, so that the detent rod 126 and latch 125 are again moved to the right to straighten the toggle connection 110, 112 and to disengage the clutch.

*Turret operated controls*

Mechanism is provided actuated from a face cam 146 on the cam disk 133 rotating with drive shaft 78 which is rendered operative as the drive shaft 78 approaches its stop position to lock the turret 54 in the indexed position, to move the locating device upwardly to its usable or operating position, and to start in operation each of the eyeleting and lacing mechanisms. These operating connections are particularly illustrated in Fig. 16, and are as follows:

For locking the turret 54 in each of its four indexed positions, a vertically disposed locking plunger 140 is provided slidably mounted in a bracket 141 (Figs. 11 and 58) bolted to the casing 52 and arranged for engagement successively with each of four recesses 142 formed in the turret 54

(see Figs. 10, 12 and 16). A compression spring 144 seated against the bottom end of the locking plunger 140 tends to maintain the same in its raised locking position. The connections by which movement of the plunger 140 is controlled from the face cam 146 include a cam follower lever 148 secured to a short laterally extending rock shaft 152 which also has secured thereto a lever arm 154. A link 156 connects the lever arm 154 with an actuating lever 158 which is secured intermediate its length to a forwardly extending rock shaft 160, and at its other end carries a roll 162 engaging in a transverse slot 163 formed in the locking plunger 140. Starting from the stop position shown in Fig. 16, the rotational movement of the shaft 78 and cam 146 will immediately rock the shaft 160 to withdraw the locking plunger 140. At the completion of the indexing movement of the turret, shaft 160 is rocked again in a counterclockwise direction to the position of Fig. 16, to return the plunger 140 to locking position by means of a spring 161 acting on the lever arm 154.

As shown in Fig. 16, the rocking movement of shaft 160 acts at the beginning of the indexing movement of the turret to depress lever 312 and slide 308 to move the device for locating a shoe upper on the support at the loading station of the machine downwardly to an inoperative position, and at the completion of the indexing movement of the turret to raise lever 312 and slide 308 to raise the locating device to its useable or operative position. The locating device and its operating connections are hereinafter described in detail.

The rocking and return movement of the shaft 160 is utilized also to start operation of the eyeleting mechanism and lacing mechanism of the machine. The parts for starting the eyeleting mechanism comprise a downwardly extending arm 549 on shaft 160, link 548, a bell-crank 547, a rod 546, and a detent 545 by which a spring-biased lever 544 is initially caught and held under restraint. When the shaft 160 is rocked in a clockwise direction at the beginning of the indexing movement of the turret, the rod 546 is raised to engage the detent 545 with the lower notch of the cooperating trip member on rod 546, thus setting the trip mechanism. At the conclusion of the turret operation, the rod 546 is pulled down by the spring 161, and this motion disengages the detent from the lever, whereupon the latter initiates the operation of the eyeleting mechanism, and at the same time casts off the rod 546 from the tip of the detent. The clutch controlled by the lever 544 is hereinafter described.

The parts for starting the lacing mechanism including a rearward extension 988 of rock shaft 160, upwardly extending arm 987 secured thereto, and a tripping member 989, the function of which is analogous to that of the rod 546. The details of this mechanism and of the clutch controlled thereby are hereinafter described.

The rocking and return movement of shaft 160 is used also to move a work supporting member to and from an operating position in which it supports the edges of the eyelet flaps with relation to the movement of the lacing mechanism of the machine. These parts include a laterally extending arm 157, secured to the rock shaft 160, terminate in a work support 159 (Figs. 10, 16 and 61) in the form of a vertically arranged plate, the upper edge of which engages the under side of the eyelet flaps across the width of the operating area of the work support immediately in front of the vertical plane of operation of the lacing needle. During the indexing movement of the turret, the work support 159 is moved downwardly where it will not interfere with the transverse movement of the supported shoe uppers to and from the lacing station. The rocking movement of the shaft 160 in a clockwise direction prior to the start of the indexing movement of the turret, causes the work support 159 to be moved downwardly. The rocking movement of the shaft 160 in a counterclockwise direction at the completion of the indexing movement of the turret, causes the work support 159 to be moved upwardly again to its operative position engaging beneath the edges of the eyelet flaps.

*Work holders*

The work supports 56 are constructed and arranged to be held on their guideways 58 in a normally retracted position at the limit of their travel toward the axis of rotation of the turret 54, and to be moved outwardly from that position only when positioned at either of the eyeleting or lacing stations of the machine. In order to maintain the work supports 56 in their normally retracted position, there is provided on the under side of each work support a laterally extending notch 164 (see Figs. 17 and 18) which is arranged for engagement with retaining ring cam 165 formed by the upper edge portion of the turret casing 52. The retaining ring 165 controlling the position of the work supports 56 is unbroken except for cut-outs provided at each of the eyeleting and lacing stations to receive bifurcated hooks 166 and 167 associated respectively with the eyeleting and lacing mechanisms (see Fig. 12), which serve to connect the work supports with the eyeleting machine and lacing machine feed mechanisms.

The bifurcated hook 166 has formed thereon two upwardly extending pins 169 which serve to support overlying portions of the vamp particularly during the insertion of the first pair of eyelets, when the hook 166, work holder and supported upper are positioned to cause the eyelet inserting mechanism to operate outwardly of the work holder between the legs of the bifurcated hook 166.

Each of the work supports 56 is formed at its outer end with a U-shaped cut-out 168 along the edges of which are provided parallel supporting surfaces for the upper clamped thereon. The U-shaped cut-out 168 of each work support is arranged to register with a corresponding U-shaped cut-out 170 formed in the turret 54. These cut-outs and the cut-outs formed in the work supports are provided in order to permit the insertion of the shoe upper locating device hereinafter described, and also to provide adequate space for the operation of the several operating mechanisms for eyeleting and lacing, as hereinafter described.

The parallel shoe upper supporting surfaces above referred to take the form of two series of spring-pressed plungers 171 (see Figs. 12, 17 and 18) which cooperate with the clamping devices hereinafter described, to support the upper firmly and accurately in position. The plungers 171 are in the form of flat straps bent to the shape of an inverted U, and with the ends thereof flanged outwardly. The plungers 171 are mounted in slots formed in two plates 173 carried on opposite sides of the work support 56, and are held in a raised position by means of compression springs 175.

Work clamp

Each work support 56, as best shown in Figs. 7, 10, 11 and 17, has mounted thereon a work clamp 172, a vamp spreader 174 and a lace measuring or allotting bar 176. The work clamp 172 takes the form of a pair of lever arms pivotally supported intermediate their length on a pivot 178 on the support 56, and connected at their rear ends to identical toggle links 180 which are pivotally connected to toggle arms 184 rotatably supported on a laterally extending pivot pin 186 at the rear end of the work support 56. The toggle arms 184 are connected to turn as a single unit by a strap 188 arranged to be engaged by an actuating lug 190 secured to the upper end of an axially movable control shaft 192. Downward movement of the control shaft 192 and actuating lug 190 acts upon the strap 188 to straighten the toggle links 180, 184, and thereby to effect a simultaneous movement of the clamping levers to clamping position. A small tension spring 194 connected between one of the clamping levers and a point on the work support tends normally to maintain the clamp in its open or disengaged position. Each of the clamping levers is provided near its forward end with a clamping pad 196 pivotally secured at 198 to the cooperating clamping lever arm, and arranged to engage with and clamp the upper against the U-shaped supporting surfaces of the work support 56 above described. Each of the clamping levers 172 is provided with a horizontal extension 199 which projects outwardly from the lacing slit and is particularly intended to engage with and support the tongue portion in a folded-over, out-of-the-way position (see Fig. 10).

The mechanism including the shaft 192 and lug 190 for straightening the toggle connection to clamp the work is under the control of the operator, and is arranged to be operated by means of a foot treadle. As best shown in Figs. 7, 11, 15 and 17, the control shaft 192 extends downwardly through the axial bore in the hollow supporting shaft 60 for the turret 54, being freely movable therein, and is screw-threaded at its lower end to turn in a threaded socket formed in a swivel block 202 secured to a treadle lever 204. A torsion spring 206 connected at its lower end to the block and at its upper end to a collar on the control shaft 192 tends to rotate the control shaft 192 and lug 190 in a clockwise direction to its normal operative position as determined by the engagement of cooperating abutments on the rod 192 and on the machine frame. With the parts in the positions shown in Figs. 7, 10 and 11, it will readily be seen that depression of the foot treadle will cause the shaft 192 and lug 190 to be moved downwardly to engage with and depress the strap 188 to straighten the toggle connection 180, 184 to clamp the work. When the foot pressure is removed upon starting the machine, these parts will return to their normal raised position under the influence of a tension spring 207 connected to the treadle lever 204.

The provision made for rotational movement of the lug 190 and control shaft 192 is in the nature of a safety device to avoid interference or breakage of parts. In the event that the operator fails to release the foot treadle during the indexing movement of the turret 54, the lug 190 remaining in its depressed position will be situated in the path of movement of the strap 188 of the toggle clamping device associated with the work support which is being shifted to the loading station. With the yieldable construction described, the lug 190 and control shaft 192 are permitted to rotate against the pressure of spring 206 away from the normal operating position to break the switch 211, as soon to be described. To avoid the further possibility of faulty operation of the machine which would result were the operator to move the upper guard 174 downwardly to operating position for the purpose of starting the machine under the impression that the pressure inadvertently and continuously maintained on the foot treadle had been effective to engage the clamp, a safety device, as described below is provided which is effective in this situation to prevent the starting of the machine. As hereinafter more fully to be described, the control devices for starting the machine comprise an electrical circuit including a starting switch 289 which is arranged to be closed by the movement of the upper guard downwardly to operating position, and also including a safety switch 211 which is arranged to be closed only upon actuation of the foot treadle 204 to clamp a new shoe upper on the work support. The safety switch operating connection, as best shown in Figs. 7 and 11, comprises an arm 208 which carries an adjustable contact screw 209, and is secured to the control shaft 192 in such relation to the actuating plunger 210 of the safety switch 211, that the downward clamp closing movement of the rod 192 is normally effective to close the switch. With the construction illustrated in the drawings, however, rotational movement of the lug 190, shaft 192 and arm 208 therewith, resulting from failure of the operator to release the pressure on the foot treadle, serves to move the contact screw 209 out of line with the plunger 210, so that the safety switch 211 is not closed as it otherwise would have been by the downward movement of the foot treadle in starting, and therefore remains open. Under these circumstances, in which the moving of the foot treadle to its depressed position has not been effective to clamp the work, the switch 211 does operate as a safety device to prevent the starting of the machine.

In the preferred embodiment of the invention illustrated herein, mechanism is provided for automatically releasing the work clamp 172 prior to the final indexing movement which transfers the work support with the eyeleted and laced upper held thereon back to the loading station. This clamp release mechanism acts during the third indexing movement of the work support, that is, during the indexing movement which serves to transfer the work support away from the lacing mechanism to a position at the left side of the machine. For releasing the work clamps, pin plungers 212 are provided (see Figs. 10, 11 and 17), one for each work support, journaled in vertical drills in the turret 54 beneath the straps 188 of the clamp toggle connections, so that upward movement of any one of the pin plungers will be effective to engage with and move the cooperating strap 188 upwardly to break the toggle connection and thereby to release the work clamp. The pin plungers 212 at their lower ends are arranged to ride in an annular groove 214 formed in the upper end of a vertically adjustable, non-rotatable cam sleeve 216 keyed to the sleeve support 64, as hereinafter to be more fully described. Substantially at the completion of each indexing movement of the turret 54, the pin plunger 212 associated with the work support which has been moved to the position at the left of the loading station, is moved upwardly into engagement with the strap 188 to break the clamp toggle 180, 184 by the action of a slide 218 (see Figs. 11, 15, 17 and 19), supported for vertical movement in a relatively stationary guideway formed in the cam sleeve member 216. The connections for raising the slide 218 and the pin plunger therewith comprises a face cam 220 formed on the cam plate 133 on the drive shaft 78 of the Geneva motion, and a cam follower lever 222 secured to a rock shaft 224 and having mounted thereon a cam follower roll 226. Another arm 228 secured to the rock shaft 224 is connected by a link 229 with a lever arm 230 secured to a rock shaft 231, to which is also secured an actuating arm 232 having a roll 233 for engagement with a traverse slot 234 in the slide 218.

Lace measuring bar

The lace measuring bar 176 associated with each of the work supports 56, as shown in Figs. 10, 11, 17 and 19, is supported in a substantially horizontal position directly above the line of the adjoining edges of the lacing slit of the upper mounted on the work support. The bar 176 is supported for heightwise and for tilting adjustment to permit a corresponding adjustment in the length of the individual lacings formed and the length of these lacings relative to one another. The mechanism for adjusting and for supporting the measuring bar 176 in its adjusted position (see Figs. 15, 17 and 19) comprises posts 236 and 238 which are vertically slidable in bearing sockets 240, 242 in the work support 56, and which have pivotal connections at their upper ends with the inner or base end of the rod 176. The posts 236, 238 are normally locked in a position of adjustment by means of a rotatable wedge cam 244 carried on a short rock shaft 246, and arranged for wedging engagement between the flattened lower ends of the posts 236, 238. A downwardly extending control arm 248 on the rock shaft 246 provides means for rocking the rock shaft and cam 244 between the wedged locking position and the release position. A spring 250 tends to rock the control arm 248 inwardly toward the axis of the turret to locking position. As any one of the work supports approaches the loading station, the control arm 248 is engaged by a release cam 252 which rocks the control arm outwardly against the pressure of its spring 250 to release the measuring rod 176. The measuring rod is held in this released position during approximately the final 90° movement of the work support to the loading station, and is again locked only as the work support leaves the loading station.

The mechanism under the control of the operator for adjusting the position of the measuring rod 176 associated with each work support in turn comprises a wing cam 254 (Figs. 15 and 19) which is formed on the cam supporting sleeve 216 and is arranged for engagement with a roll 256 mounted on the lower end of the post 238, and a wing cam 258 which is formed on a bracket 260 vertically adjustable on guide rods 262 and is arranged for engagement with a roller 264 carried on the lower end of the supporting post 236. The position of vertical adjustment of the cam supporting sleeve 216 and converging cam track 254 is determined manually through connections comprising a pinion 268 which is secured to a rotatable shaft 270 and meshes with rack 266 in the periphery of the cam supporting sleeve 216. A knurled head 272 secured to the outer end of the shaft 270 provides convenient means for the operator to make the desired adjustment. The position of vertical adjustment of the wing cam 258 and bracket 260 is determined by means of connections comprising a pair of racks 274 on the support 260 which are meshed with pinions 276 secured to a rotatable shaft 278. A knurled head 280 on the outer end of the shaft 278 provides convenient means for the use of the operator in making this adjustment. As previously pointed out, the supporting posts 236, 238 for the measuring rod 176 are unlocked substantially before the work support reaches the loading station, and are then re-positioned by the engagement of the rollers 256, 264 with their respective wing cams 254 and 258 to determine the height and slope of the measuring rod 176. Such adjustment of the position of the measuring rod 176 as may be required is made while the work support remains at the loading station and before the machine is started.

Vamp spreader

The vamp spreader 174 associated with each work support 56 (see Figs. 4, 7, 10 and 19) comprises an arm formed from a flat plate which is arranged to swing about a horizontal pivot 284 on the work support, and is provided on its outer end with a relatively slender curved lateral extension 285 which for the engaging position of the vamp spreader passes across the vamp portion of the upper immediately below the end of the lacing slit. A small laterally extending tongue or nib 298 formed on the vamp spreader 174 is arranged to extend somewhat within the upper and serves to prevent the portions of the upper adjacent the heel from falling inwardly into the field of operation of the eyeleting and lacing mechanisms. The vamp spreader and more particularly the lateral extension 285 is arranged to press the engaged portions of the vamp and vamp lining downwardly against a rest 287 which is carried by the work support. The rest 287 is arcuate in shape following the curvature of the turret casing 52, and when the work support 56 is fully retracted, is located adjacent the outer wall of the turret casing 52. A torsion spring 286 coiled about the pivot 284 tends to hold the vamp spreader 174 yieldingly in a raised inoperative position. In starting the machine, the operator moves the vamp spreader downwardly to work engaging position where it is held by means of a latch 288 which is supported to turn on a vertical pivot 290, and is provided at one end with an offset portion arranged for engagement above an abutment 292 on the vamp spreader 174. A tension spring 294 holds the latch yieldingly in its latching position.

The vamp spreader 174 is arranged to be released automatically at the same time that the work is unclamped by means of a connection rendered operative by the breaking of the work clamp toggle 180, 184. This connection consists of a lug 296 formed on the middle or connecting pivot for the toggle links 180, 184. The forward movement of this pivot when the toggle is broken causes the lug 296 to engage the tail of the latch 288 to swing the same in a clockwise direction to release the vamp spreader 174. The manner in which this mechanism operates to release the vamp spreader 173 is best indicated in Fig. 10, in which the vamp spreaders associated with the work supporting units at the eyeleting and lacing stations are latched in their clamping position, the other two vamp spreaders being shown in their raised or released position.

Figure 1:
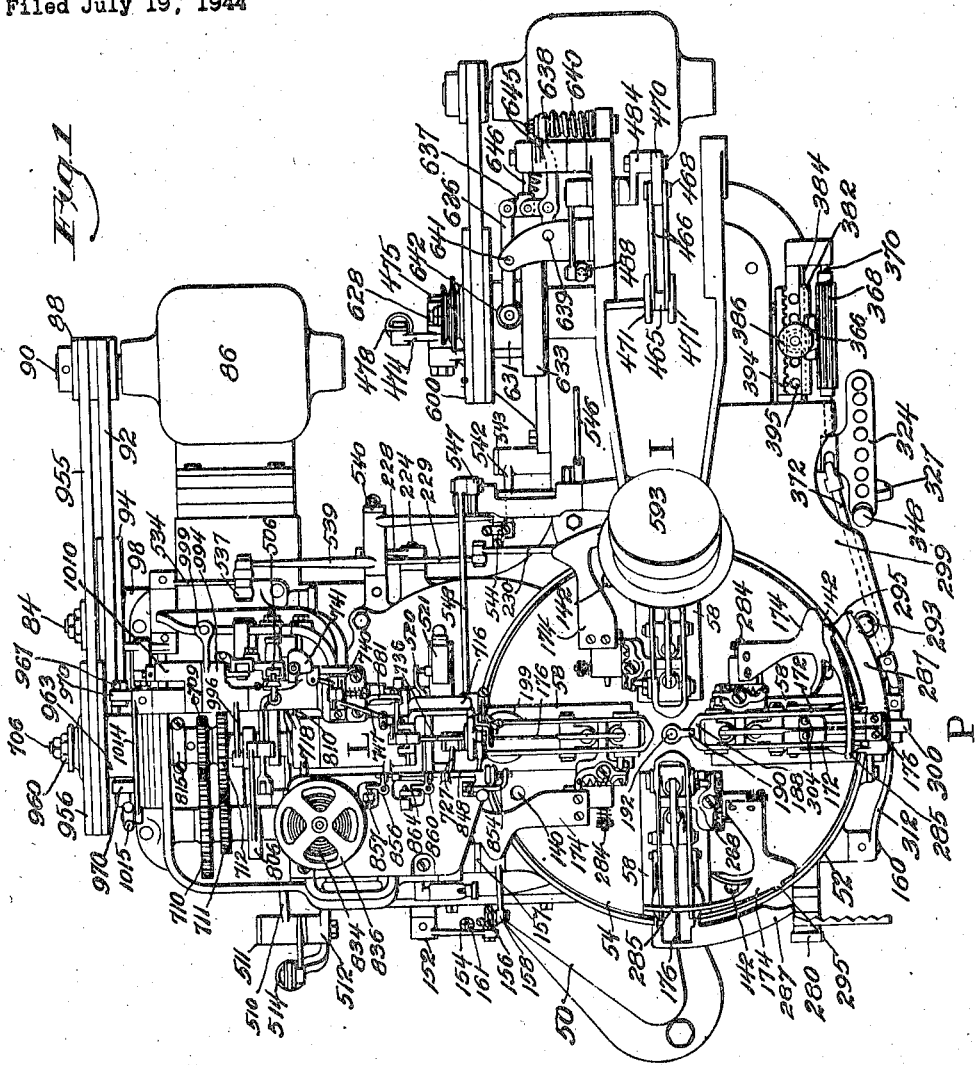

It is a principal function of the vamp spreader to support the loose portions of the upper including the vamp and lining, so that they will be guided accurately between the upper and lower setting tools of the eyeleting unit, and subsequently between the loop spreader and retracted needle of the lacing mechanism when the turret is indexed. The vamp spreader acts also to prevent the loose portions of the upper from being inadvertently drawn into the field of operation of the eyeleting and lacing mechanisms. The movement of the vamp spreader downwardly to its operating position is utilized also to close a starting switch 289. As best shown in Figs. 1, 2, 7 and 10, the starting switch 289 is carried on a bracket 291 secured to the turret casing 52. An upwardly extending pin plunger 293 associated with the switch is arranged to be engaged and depressed to close the switch by means of a lug 295 on the outer edge or lip of the vamp spreader when moved downwardly to the work engaging position. As hereinafter more fully set forth, in connection with Fig. 3 of the drawings, the closing of the switch 289 will normally complete an electrical circuit to energize relay 297 of the control switch 303 for the main clutch starting solenoid 135, which in turn causes solenoid 135 to be energized to pull the armature and link 134 downwardly in Fig. 7 against the action of spring 136 to release trigger 125 as above stated, to trip the main turret driving clutch into its running position. A guard plate or shield 299 covering portions of the actuating and control mechanisms in the base as best shown in Fig. 1, provides additional protection and support for the supported upper during the indexing movement from the loading to the eyeleting station of the machine.

Locating mechanism

The locating mechanism P (Figs. 7, 10, 16 and 23) provided for the assistance of the operator in properly locating the upper on the work support at the loading station comprises a support 300 with fins 301 and 302 which extend radially of the axis of rotation of the turret 54, and form a positioning surface against which the edges of the eyelet flaps are positioned in abutting relation. A pair of positioning pins 304 are carried on the support 300 for engagement against the upper ends of the eyelet flaps for positioning the upper on the support lengthwise, that is, in a direction radial to the axis of rotation of the turret 54. The support 300 is mounted for movement radially toward and away from the axis of rotation of the turret 54 on ways 306 formed on a secondary support 308 which is in turn vertically adjustable on ways 310 (see Fig. 15) formed on the casing 52 within which the turret is mounted. The fin 302 is formed on the support 300. The fin 301 is carried on the secondary support 308 being mounted in a slot formed in a cover plate 309 forming part of the guideway for the slidable support 300. The locating device including supports 308 and 300 with their positioning fins 301 and 302 and positioning pins 304 occupies a raised position when the machine is at rest for the guidance of the operator in locating an upper on the work support at the loading station. At the start of the indexing movement, the support 300 is moved downwardly to a depressed position beneath the level of the turret 54, and is then raised through the cut-out portion 170 of the turret 54 and work support 56 only after the indexing movement of the turret has been completed to bring a new work support to the loading station.

The raising and lowering of the upper locating device is effected automatically in timed relation with the operation of the connections previously described for controlling the operation of the lock bolt 140 which include the cam 146, cam follower 148 and rock shaft 160. The rocking movement imparted to the shaft 160 is effective also to raise and lower the slide support 308 by means of a lever arm 312 which is secured to the forward end of the rock shaft 160 and at its outer end carries a block 314 for engagement in a slot 316 formed in the secondary support 308 (see Figs. 15 and 16).

Shoe size adjustment control mechanism

In accordance with the invention, the illustrated machine is provided with a size adjustment control mechanism adapted for effecting adjustment of each of the several cooperating mechanisms for locating, supporting and operating upon shoe uppers in accordance with the spacing of the pairs of eyelets to be punched in the shoe upper being operated upon. As may be noted, for example, in Fig. 10, the upper is located on the work support with the toe portion extending radially outwardly and with the upper ends of the eyelet flaps and heel portion of the shoe extending inwardly toward the axis of rotation of the turret, so that the initial pair of eyelets and the initial lacing of the series are inserted in that portion of the eyelet flaps adjacent the vamp, the operation in each instance proceeding along the eyelet flaps away from the vamp as the work support is stepped outwardly from the turret by the associated feed mechanism. In order that the eyelets may be properly placed in the upper, and in order that the lacing needle may thereafter be properly registered with the eyelet holes for the lacing of the eyeleted upper, the shoe upper is located and is clamped on its work support in a position which is predetermined with the greatest possible degree of precision having regard to variations of size and style of shoe upper being operated upon, and the work support is then presented to and operatively connected with each of the eyeleting and lacing mechanisms so that the work support becomes an integral part of each of these machines in turn for the performance of the respective eyeleting and lacing operations on the supported shoe upper.

It will be evident that before automatic operation of the machine upon different sizes of shoe upper is possible, corrections must be made in the position of the shoe upper on its work support, and that corresponding adjustments must be made in the operation of the eyeleting and lacing mechanisms for the spacing of one eyelet pair from another, the number of eyelets to be inserted, and in the widthwise spacing of the eyelets of each individual pair. The shoe size adjustment control mechanism of the machine includes means for adjusting the locating device in accordance with the size of the shoe upper to be mounted on the work support, devices for variably determining the length of the stepped feeding movement of the feed mechanisms associated with each of the eyeleting and lacing mechanisms, and a control element which may be set by the operator to adjust the locating device and means for automatically transferring the size adjustment represented by the setting of the control element to each of the eyeleting and lacing mechanisms in turn to effect an adjustment of the spacing of the stepped feeding movements of the feed mechanisms.

The shoe size adjustment control mechanism of the machine (see Figs. 2, 7, 8, 10, and 20 to 28 inclusive) comprises a manually operable size adjustment lever 320 carried on a pivot shaft 322 at the front side of the machine to the right of the loading station P. The lever 320 comprises an upwardly extending arm arranged for movement with relation to an arcuate plate 324 having a size indicating scale, and a downwardly extending arm terminating in a toothed segment 326 which forms part of a treadle actuated device for shifting the size adjustment lever. A handle 327 formed on the lever 320 is provided for manual operation of the sizing device. A tension spring 328 connected to a lateral extension 329 of the control lever 320 tends to move the lever in a counterclockwise direction. The control lever 320 is normally supported in a position of desired adjustment against the pressure of the spring 328 by means of a spring-pressed stop pawl 330 mounted on a stationary pivot for engagement with the toothed segment 326. A racking pawl 332 (see Fig. 7,) spring-pressed into engagement with the toothed segment 326 and pivoted on an upwardly extending arm of a racking foot treadle 334 mounted to turn on a pivot 336, provides a convenient treadle operated means for adjusting the control lever in a clockwise direction against the pressure of the spring 328. The racking foot treadle 334 is supported against a stop 338 by means of a tension spring 340. Further to limit movement of the treadle lever 334 in either direction the lever is formed with an upwardly extending arm 341 having a cut-out therein which embraces the stop pin 343 on the machine frame. A release foot treadle 342 pivotally supported on a pivot pin 344 fixed to the machine base and having a tail portion thereof underlying the tails of pawls 330, 332 provides a convenient means to release the control lever 320 for movement in a counterclockwise direction under the influence of its spring 328, and for manual manipulation. A spring 346 attached between the treadle 342 and pin 343 acts to move the release treadle in a clockwise direction away from the pawls 330, 332.

A quick adjustment of the position of the control lever 320 may be obtained by means of a stop pin 348 which may be fitted into any of a number of holes in the arcuate plate 324 to engage and arrest movement of the control lever 320 in a counterclockwise direction against the pressure of its spring 328. The pin 348 is fitted into the desired hole, and the control lever is moved against it. The holes are so located as to permit a rapid and accurate adjustment of the control lever 320 by this means to any desired shoe size of upper.

Adjustment of the size adjustment control lever 320 operates through appropriate connections to effect a corresponding adjustment in the position of the locating device at the loading station. These connections (see Fig. 21) comprise a link 354 which is connected at one end to the lateral extension 329 of the control lever 320, and is provided at its other end with a horizontally extending slot 355 engaged by a pin 357 on a lever arm 356 supported at its other end to turn about a fixed pivot 358. A radius arm 360 pivoted at 362 on the machine frame and pivotally connected to the link 354 serves to guide the upper end of the link in a predetermined path. The lever arm 356 is slidably engaged intermediate its length by a shoe 364 pivotally connected to the lower end of a vertically arranged rack 366 which meshes with a pinion 368 mounted on a shaft 370 rotatably supported on the machine base. The shaft 370 is connected through a rotary shaft 372 and universal joints with a shaft 374 rotatably supported on the secondary support 308 of the locating device. A pinion 376 on the shaft 374 meshes with a rack 378 formed on the under side of the locating support 300. From an inspection of Figs. 2 and 21, it will be evident that movement of the control lever 320 to the clockwise as, for example, by the operation of the foot treadle 334, will act through the link 354 to lower the lever arm 356 and rack 366, thus rotating the pinions 368 and 376 in a direction to push the locating support 300 inwardly toward the axis of rotation of the turret 54. Operation of the release treadle 342 will cause the control lever 320 and support 300 to shift in the opposite direction.

Since each of the eyeleting and lacing operations begins at the end of the eyelet flaps adjacent the vamp, and always at the same point with relation to the work support on which the upper is mounted, it is the function of the size adjustment of the locating device to insure that the upper is so located on the work support that the portion of the eyelet flaps adjacent the vamp will always occupy the same position on the work support for any shoe size of upper being operated upon. This position of the shoe upper is obtained by locating the positioning pins 304 of the locating device longitudinally of the work support from the point at which the operation on the upper will start by the length of the eyelet flaps. It will be readily appreciated that for a small size of shoe upper having relatively short eyelet flaps, the positioning pins will be located toward the outer end of the work support, and for larger shoe sizes of upper, will be moved inwardly toward the axis of rotation of the turret in amounts roughly proportional to the increase of shoe size.

The mechanism above described for adjusting the position of the locating device has provision for a supplemental adjustment of this mechanism to vary the amount by which the positioning pins 304 are shifted along the work support for any given shift of the size adjustment control lever 320 from one position to another, and the same mechanism is useable also as a supplemental adjustment to vary the location of the positioning pins 304 for a particular setting of the control lever 320. The former supplemental adjustment is made in a very simple manner by shifting the rack 366 and shoe 364 lengthwise of the pinion 368 and lever arm 356 so that movement of the lever arm 356 about its pivot 358 will thereafter serve to impart movement of greater or less extent to the rack 366 and support 300 with the positioning pins 304. As best shown in Figs. 20 to 22, the rack 366 is mounted in a guideway 380 formed on a slide 382 which is shiftable laterally on a guideway 384 secured to the machine frame. The slide 382 is moved laterally on its guideway by means of connections which include a knurled knob 386 secured to the upper end of a shaft 388 which is mounted for axial and rotational movements within a vertical post 390 formed in the rear side of the slide 382. Adjacent its lower end the shaft or pin 388 has keyed thereto a pinion 392 which meshes with a stationary rack 394. From an inspection of Figs. 20 and 22, it will be seen that the shaft 388 is arranged to extend downwardly into engagement with any one of a series of drills 395 to lock the parts in the position of desired adjustment. In order to adjust the position of the rack 366 and shoe 364 with respect to the lever arm 356, the operator first moves the knurled head 386 axially upwardly to disengage the pin 388 from a drill 395, and then rotates the knurled head to shift the slide 382 to the desired position where the parts are again locked by the downward movement of the knurled head and pin 388 into engagement with another of said holes or drills 395.

The supplemental adjustment described is useful to make corrections for different styles of lasts, and is useful particularly in conjunction with the adjustment provided by the control lever 320 to correct the location of the positioning pins 304 for extremely large sizes of shoe upper in which an additional pair of eyelets and reduced spacing between the pairs of eyelets may be necessary. It may be assumed, for example, that for small sizes of shoes, the slide 382 will be moved leftwardly from the position shown in Fig. 21, causing the rack 366 and slide block 364 engaging the lever arm 356 to be shifted upwardly so that the positioning pins 304 will be located outwardly with relation to the work support. For increases in size of shoe upper up to perhaps size 12, the manual lever 320 will be shifted from the leftward position shown in Fig. 21 by steps to the right, causing the positioning pins 304 to be moved progressively inwardly toward the axis of rotation of the turret. By way of example, it may be assumed that when size 12 is reached, the requirements of the styling for the shoe make undesirable any further increase in the spacing of the eyelets. In this situation, it is customary to add another pair of eyelets and to correspondingly reduce the spacing between the pairs of eyelets. In order to effect this adjustment, the hand lever 320 is moved again leftwardly as shown in Fig. 21, to the correct position to provide the required spacing of the eyelets, and the slide 382 is moved to the right, causing the rack 366 and slide block 364 engaging the inclined arm 356 to be shifted downwardly so that the positioning pins 304 are moved inwardly toward the axis of rotation of the turret to an extent which will correctly locate these pins to receive a shoe upper of the designated size, as, for example, size 12.

The setting of the size adjustment control lever 320 in accordance with the size of shoe upper mounted on the work support at the loading station, is transferred in timed relation with the indexing movement of the turret to each of the eyeleting and lacing stations in turn to condition the associated feed mechanisms in accordance with the shoe size of the upper on the work support. It is the function of this transfer mechanism to control the length of the stepped feeding movements of the feed mechanisms, so that the eyeleting mechanism will be conditioned for the insertion of successive pairs of eyelets spaced from one another in accordance with the size of shoe upper being operated upon, and the lacing mechanism will be correspondingly conditioned for the insertion of lacings through the eyelet holes.

The mechanism for transferring the size adjustment determined by the setting of the control lever 320 to the eyeleting and lacing stations (see Figs. 8, 15, and 24 to 28 inclusive), comprises a cam drum 400 which is rotated in synchronism with the turret and carries thereon four axially shiftable wing cams 398, one on each quadrant of the drum, to cooperate with the work supports 56 on the turret 54 at the eyeleting and lacing stations. The drum 400 is supported fixedly on a transversely extending shaft 402 which is connected through bevel gears 408, 410 with a vertical shaft 412 having at its upper end a gear 414 which meshes with a gear 416 formed on the lower end of the hollow shaft 60 for the turret 54. The ratios of the gears in the driving train for the cam drum 400 are such that the drum 400 is rotated through a quarter turn for each quarter turn imparted to the turret 54.

The wing cams 398 are presented in succession by the rotation of the drum 400 to each of four stations which correspond respectively to the loading, eyeleting and lacing stations and to a fourth inactive station at which the work supports are presented by the rotation of the turret 54. At the first of these stations, each wing cam 398 each time it passes through said station is positioned axially of the drum 400 by means of a cam engaging lever controlled by the size adjustment lever 320. During the next indexing movement of the turret 54 and drum 400 therewith, the wing cam is locked in its adjusted position, and is brought into engagement with the feed control follower element 444 to be described associated with the eyeleting mechanism, and thereafter during another indexing movement of the turret 54 and drum 400, is brought into engagement with the feed control follower element 448 to be described associated with the lacing mechanism to transfer the adjustment for size in accordance with the setting of the hand lever 320 first to the eyeleting station and then to the lacing station in synchronism with the transfer of the associated work support and upper mounted thereon. With each of the wing cams 398 there is provided a locking device which is rendered operative as the cam leaves the size setting station to lock the cam in the adjusted position, and after the completion of the eyeleting and lacing operations to again release the cam. It will be appreciated that each of the four wing cams 398 is independently controlled and that the setting of each cam in turn depends upon the setting of the control lever 320 for the shoe size of upper being loaded upon the work support at the loading station.

In the illustrated construction, each of the wing cams 398 is formed on a slide 420 mounted for movement axially of the drum 400 on guideways 422 set at 90° angles from one another. The mechanism for locking each of the several wing cams in their adjusted positions on the guideways 422 comprises for each wing cam an eccentric locking roll 424 extending lengthwise of the guideway 422 beneath the slide 420 and having formed at each end thereof bearing pins 427 which are engaged in bearings 428. The locking roll 424 is supported in the bearings 428 to turn freely within a groove 426 formed in the guideway 422, and for one angular position of the roll 424 to engage against the underside of the slide 420 to lock the slide 420, and thereafter the wing cam 398, against movement on the guideway. At the left hand end of each locking roll 424 is fixedly secured an actuating dog 430 having a split hub for clamping engagement with one of the bearing pins 427 and an offset portion 434 which is engaged by a compression spring 436 seated in the sleeve hub of the cam drum 400. The spring 436 urges the locking roll 424 in a clockwise direction into wedging engagement with the underside of the slide 420 to lock the wing cam 398 against axial movement in either direction. At the time that any particular work support 56 approaches the loading station P of the machine, a corresponding wing cam 398 is moved with the cam drum 400 to a size setting station which is at the front side of the drum 400. In this position, the wing cam 398 is released to permit freedom of adjustment thereof in accordance with the setting of the hand lever 320 by the engagement of the contact arm of the dog 430 with a stationary release cam 437 which acts to rock the dog 430 and locking roll 424 in a counterclockwise direction against the pressure of spring 436. During the next succeeding indexing movement of the drum 400, the dog 430 rides out from under the release cam 437 so that the dog and locking roll are turned by spring 436 in a clockwise direction to locking position.

Adjustment of the wing cam 398 in accordance with the size adjustment of the control lever 320 is effected by means of a downwardly extending arm 438, secured to the rear end of the rock shaft 322 on which the control lever 320 is mounted, and provided at its free end with a cam roll 440 arranged in the path of movement of the wing cams 398 for engagement therewith. Each wing cam 398 in turn is released as it approaches the cam setting station to permit adjustment of the same by means of the cam roll 440, and is then locked in its adjusted position as the dog 430 rides out of engagement with the cam 437 at the start of the next indexing movement of the turret 54 and drum 400.

Movement of the cam drum 400 and wing cam 398 through the first 90° from the adjusting station, the station in which the position of the wing cam is determined, causes the wing cam to be brought into engagement with, and to shift if necessary, a cam follower roll 444 supported on a lever 446 for adjusting the feed mechanism associated with the eyeleting machine in accordance with the shoe size of the upper on the work support which has been transferred simultaneously to the eyeleting station. Continued movement of the drum 400 and wing cam 398 through another 90° will cause the wing cam 398 to be brought into engagement with, and to shift if necessary, a follower roll 448 on a cam lever 450 for adjusting the feed mechanism associated with the lacing machine in accordance with the shoe size of the upper which will have been transferred concurrently with the movement of the drum 400 to the lacing station.

*Feed mechanisms—eyeleting and lacing*

The feed mechanisms for the eyeleting and lacing units of the machine are similar in construction and in operation, having as their function to move the work support and the upper mounted thereon outwardly from the turret by steps which are adjustable and are determined by the setting of the size adjustment control lever 320 above described. Each of the feed mechanisms takes the form of a feed slide movable in a radial path away from the rotational axis of the turret, and having a work support engaging hook arranged for the fully extended position of the slide to be operatively connected with the work support at the associated station. A stepped movement outwardly and a quick single return movement is imparted to the feed slide in each instance by means of a vertically arranged feed bar which is moved downwardly step-by-step against the pressure of a return spring by means of actuating devices acting in timed relation with the eyeleting and lacing mechanisms, respectively, and a cam link and follower connection which transmits the movement of the vertically movable bar to the feed slide, and is adjustable to vary the length of the successive stepped feeding movements imparted to the feed slide by the feed bar.

The feed mechanism associated with the eyeleting mechanism of the machine, comprises a feed slide (see Figs. 12, 13, 14 and 29) which consists of a block 460 supported to slide in a direction radial to the axis of rotation of the turret on a fixed guideway 461 located directly beneath the eyeleting mechanism. The hook 166 previously referred to, is secured to the block 460, so that for the fully extended position of the feed slide, the hook 166 will be registered with the cut-out formed in the retaining ring 165 to permit movement of the work supports into operative relation thereto. The block 460 is connected by parallel links 462 to move as a unit with a second slide block 463 supported for sliding movement in a guideway 464. This latter slide block 463 is connected to be operated by means of a vertically movable feed bar 465 through a cam link and follower connection which is adjustable to vary the length of the successive stepped movements imparted to the feed slide for each stepped movement of the feed bar 465. The feed bar 465, as will be hereinafter fully set forth, has imparted thereto a series of stepped downward feeding movements each of fixed extent and is then returned in a single rapid movement to its starting position. The cam link and follower connection referred to takes the form of a pair of parallel links 466 (see Figs. 2, 29 and 39) which are connected at one end by a pivot pin 467 to the feed bar 465, and at their other ends by a pin 468 to a follower roll arranged to ride in a vertically disposed slot 469 in an adjustable guide member 470. The slide block 463 is connected with the cam links 466 by means of a U-shaped follower element 471 which is pivotally supported in a recessed portion of the block 463 for sliding engagement relative to the cam links 466. As best shown in Fig. 29, a rearwardly extending bracket 472 secured to the slide block 463 is provided at its rear end with a bent-over portion for engagement with a micro-safety switch 473 which is closed when the feed slide is in its fully advanced operating position.

The feed bar 465 is normally supported in a predetermined raised starting position by spring actuated devices which, as best shown in Figs. 29 and 55, comprise a lever arm 474 supported to turn on a pivot pin 475 on a fixed supporting bracket 476. The lever 474 is connected at its outer end by an adjustable link 477 with the lower end of the feed bar 465. A tension spring 478 is connected between a tail of the lever 474 and an arm of the fixed supporting bracket 476. The lever 474 is acted upon also by a tension spring 479 connected between an arm 480 of the lever 474 and an arm of the fixed bracket 476. The springs 478 and 479 are arranged to act upon the lever 474 at opposite sides of its pivot 475 and in opposite directions, and serve to provide an evenly distributed spring pressure upwardly against the feed bar 465 throughout the full extent of the vertical movement of the lever. At the completion of the eyeleting operation, the bar 465 is disconnected from the mechanism for imparting the stepped downward feeding movement thereto, and is permitted to return rapidly to its raised starting position under the influence of the springs 478, 479. In order to control the rate of return movement of the feed bar 465, a snubber device is provided, which in the present instance comprises a double-walled fluid containing cylinder 481 which is pivotally connected by a pin 482 with the lever 474, and a cooperating plunger 483 pivoted on a fixed portion of the machine, and arranged to extend within the double-walled cylinder 481. A series of perforations in the inner wall of the double-walled cylinder 481 permits a limited flow of oil into and out of the central portion thereof as the plunger is moved relatively inwardly or outwardly with relation to the cylinder 481. The feed bar 465 continues its upward movement until the plunger 483 is seated against the end of the cylinder 481.

The mechanism for imparting a stepped feeding movement to the feed bar 465 in timed relation with the operation of the eyeleting mechanism will be described in detail in connection with the description of the eyeleting mechanism. It may be noted, however, that stepped feeding movements of fixed extent are imparted to the feed bar 465. Adjustment of the length of the stepped feeding movements imparted to the feed slide and work support from the feed bar 465 through the cam links 466 and follower element 471 is made by shifting the guide bracket 470 laterally to vary the angle of slope of the cam links 466. In order that the feed slide and hook 166 may be returned always to the same extended position which corresponds with the elevated starting position of the feed bar 465 independently of any adjustment of the angle of slope of the parallel cam links 466, the follower element 471 for said starting position is positioned directly over the pivotal connection of the links 466 with the feed bar 465.

The devices for supporting and for positioning the guide bracket 470 are controlled by the wing cams 398 on the drum 400 previously described. The guide bracket 470 is mounted on the upwardly extending arms of two bell-crank levers 484 and 485 supported in parallel relation on pivots 486 and 487 on the machine frame. The bell-crank levers 484, 485 are connected for movement as a unit by a link 488. The bell-crank 485 is also connected by a link 489 with one arm of a bell-crank 490 (Figs. 24, 25 and 29), the other arm of which is connected by a link 491 with the eyelet feed adjustment cam follower lever 446 carrying the roll 444 located as above described in accordance with the shoe size of upper being operated upon by engagement with the associated wing cam 398. The cam follower lever 446 is supported to turn on a stationary pivot provided by a pivot stud 492 secured to a fixed support 493 forming part of the machine base 50 (see Figs. 24 and 27).

The feed mechanism associated with the lacing mechanism of the machine, as best shown in Figs. 6, 12, 15, 56, 57, 62 and 63, comprises a feed slide in the form of a bracket 500 supported on a rearwardly extending slide rod 501 which is axially shiftable in bearings 502, 503 of the machine frame (see Figs. 12 and 57). The bracket 500 provides support for the bifurcated work support engaging hook 167 which is arranged for the inactive extended position of the feed slide, to be registered with the cut-outs formed in the retaining ring 165 to permit movement of the work supports into and out of operative relation thereto with each indexing movement of the turret. Toward its rear end, the slide rod 501 has rigidly secured thereto a laterally extending bracket 504 which is further supported in a guideway 505 on the machine frame. The feed slide bracket 500 carries a laterally extending arm 520 which is arranged when the feed slide is in its fully extended position to engage with the operating plunger of a microsafety switch 521 to maintain the same in closed position.

The lacing feed slide including the hook 167, bracket 500, slide rod 501 and bracket 504 is arranged to be operated through connections which are substantially similar to and operate in a similar manner as those previously described for operating the feed slide for the eyeleting mechanism. These operating connections include a vertical feed bar 506 which is normally supported in a raised starting position, and to which is imparted a stepped downward feed movement of fixed extent. The feed bar 506 is arranged to be forced yieldingly upwardly against the step feeding and retaining devices hereinafter described, and to be moved rapidly to the raised starting position at the completion of a lacing operation by spring actuated connections which are substantially identical in construction and mode of operation with those previously described, for controlling the operation of the feed bar 465 associated with the eyeleting mechanism. These connections include a lever 510 (see Figs. 6, 15, 57 and 65) pivotally supported at 511 on a fixed bracket 512, and at its outer end connected by a link 513 with the lower end of the feed bar 506. The lever 510 is rocked in a direction to move the feed bar upwardly by a tension spring 514 connected between a tail of the lever 510 and an arm of the bracket 512, and a spring 515 connected between an arm 516 of the lever 510 and a fixed point on the machine. A snubber device comprising a reciprocable cylinder 517 connected by a pin 518 with the lever 510, and a plunger 519 pivotally connected with a lug on the machine frame, acts to control and to determine the extent of the return upward movement of the lever 510 and feed bar 506 under the influence of the springs 514, 515.

An adjustable cam link and follower connection is provided between the lacing feed slide and vertically movable feed bar 506 which comprises a pair of parallel cam links 527 connected at one end by a pivot pin 528 with the feed bar 506, and connected at their other end to a guide pin 529 having thereon a follower roll which rides in a vertically disposed slot 530 in an adjustable guide bracket 531. The cam links 527 are engaged by a follower element in the form of U-shaped members 532 provided with trunnions 533 journalled in bearings formed in the laterally extending bracket 504. For the starting position of the lacing mechanism, as shown in Figs. 12 and 56, the lacing feed slide is in its fully extended position in which the hook is registered with the cut-outs in the work support guard ring 165, the feed bar 506 is fully raised and the U-shaped cam follower element 532 is located in line with the pivotal connection 528 of the cam links 527 with the feed bar 506.

Adjustment of the length of the stepped feeding movements imparted to the lacing feed slide and work support connected thereto, is made by shifting the guide bracket 531 laterally to vary the angle of slope of the cam links 527. The mechanism provided for supporting and positioning the bracket 531 comprises two bell-crank levers 534 and 535 having upwardly extending arms to which the bracket 531 is pivotally secured, and horizontally extending arms connected by a link 537 (see Figs. 1, 6, 8, 15, 27 and 56). The bell-crank 535 is connected by a link 538 with one arm of a lever 539 supported intermediate its length on a stationary pivot pin 540. A link 541 connects the forward end of the lever 539 with a laterally extending arm 542 on a pivot shaft 543 on which is mounted also the cam follower lever 450 and follower roll 448 controlled by engagement with the feed adjustment transfer wing cams 398.

*Electrical control system*

A feature of the present invention consists in the electrical control system of which the several component parts have previously been mentioned, which is so constructed and arranged as to permit the machine to be re-started each time an upper is placed in the loading station only when all of the operating mechanisms are properly located, so that there is no possibility of interference and consequent damage to the machine or to shoe uppers mounted on the several work supports. Fig. 3 of the drawings, is an electrical diagram of these electrical connections which include a primary circuit having the starting switch and three safety switches mounted thereon in a series relation, and a solenoid actuated switch 303 which is rendered operative when all of the switches of the main circuit are closed to energize the main clutch actuating solenoid 135. The several switches in the circuit comprise the starting switch 289 which is arranged to be closed by the movement of the vamp spreader 174 to its depressed shoe upper engaging position, the safety switch 211 which is closed by the actuation of the foot treadle 204 to clamp the shoe upper on the work support, the safety switch 473 associated with the eyelet feed mechanism, and the safety switch 521 associated with the lacing feed mechanism. The two last mentioned switches are closed only when the respective feed slides and work supports associated therewith have returned to their fully retracted position on the turret support. The construction and arrangement of the several switches of the main circuit is such as to prevent the operator from inadvertently starting the machine until all of the several operations which he has to perform have been completed. For example, the machine cannot be started until both the eyeleting and lacing mechanisms have completed their operations, and have returned their respective work supports to their transfer positions on the turret. The foot treadle must have been depressed to clamp the upper properly in position on the work support, and finally the vamp spreader must have been moved downwardly to its latched shoe upper engaging position. Assuming that these operations have been performed in the correct manner, the energizing of the circuit including the several switches above noted, will cause the relay actuated switch to close so that the starting clutch control solenoid 135 will be energized to start an indexing movement of the turret which, in turn, at the completion thereof, will put the eyeleting and lacing machines in operation.

*Eyeleting machine*

The eyeleting machine to which the work support and upper are transferred from the loading station by the rotational movement of the turret 54, is of the so-called duplex type which comprises duplicate eyelet inserting units comprising identical punch and set mechanisms and duplicate eyelet feeding devices associated therewith. The two eyelet inserting units are constructed and arranged for the insertion of one pair of eyelets at a time, this operation being synchronized with relation to the feed mechanism which imparts a stepped advancing movement to the associated work holder and upper.

As each work holder is brought to the eyeleting station I by the turret 54 the latter is indexed and locked as hereinbefore explained, and at the same time the eyeleting unit is tripped into operation. Fig. 31 illustrates the duplex organization of the eyeleting unit in elevation viewed in a direction away from the axis of the turret and from left to right of Fig. 29. Two hollow punches 550 are arranged side by side, and affixed to hollow plungers 551 through which chips may fall to be discharged. Each punch is provided with an upsetting shoulder 552 and an abutment 553 of the type commonly used for invisible eyeleting. The plungers extend through individual bearing members 554 and their lower ends surround a pin 555 that connects a pair of toggle members 556. The bearing members 554 lie in contact with each other in Fig. 31, but they may be separated to increase the distance between the punches if the work so requires. For this purpose they are mounted on two fixed horizontal supporting pins 557 which afford a range of sidewise adjustment.

The lower pair of toggle members is mounted on an eccentric portion of an anchoring pivot 558 journaled in fixed bearings and provided with a pinion 559 by which it may be turned to effect a slight upward movement of the punches after they have done the punching. The knee pivot 561 of the toggle provides a connection with an operating link 562 which, instead of being engaged directly with the crank 560, is pivotally connected to a link 563 by which the crank and a lever 564 are connected.

Two pendular bearing members 565 are arranged side by side and suspended from a supporting pivot 566. Punch beds 567 affixed to these bearing members are arranged to cooperate with the punches (Fig. 48), after which eyelet inserting tools 568 are brought into alignment with the punches (Fig. 49) by swinging the bearing members about their pivot 566. The bearing members 565 are adjustable toward and from each other to maintain the distance between the tools 568 equal to that between the punches.

To insure simultaneous and equalized adjustments, two vertical rock shafts 569 are journaled in fixed bearings (Figs. 29, 39 and 43), and each carries three arms 570, 571 and 572. The arms 570 are normally drawn toward each other by a spring 573, but may be forced apart by a pair of equalizing spreaders 574 mounted on pivots 575 and having interengaged gear teeth. An adjusting screw 576 engaging a portion of the frame is provided with a knurled knob 577 for manipulation. Its axial movement is communicated to the spreaders by a rack bar 578, a gear segment 579 and a link 580. Lugs 581 carried by the free ends of the arms 570 and 571 are interengaged with the bearing members 565 in which grooves 582 are formed to receive them. Likewise, similar lugs carried by the arms 572 are interengaged with the bearing members 554 in which grooves 583 are formed. Thus each member 554 is controlled by one of the two arms 572 while each member 565 is controlled by one of the arms 570 and one of the arms 571.

The eyelet-inserting tools 568 (Figs. 29, 39 and 49) are carried by plungers 584 each arranged in a bore of one of the members 565, and both operated by the lever 564. This lever has two arms side by side and constituting a fork. The upper ends of the plungers lie between these arms and are connected to them by a transverse pin 585. Each tool 568 is provided with a spindle 586 for picking eyelet from a raceway. Two raceways 587 are provided (Fig. 46), but they are omitted from Fig. 29 to favor the showing of other elements. The upper end of each spindle 586 (Fig. 49) is provided with a friction member 588 arranged to slide in a bore in the plunger 584 when forced but to cling to the plunger when not forced. A stop 589 screwed into the member 565 projects through a slot 590 in the plunger to project the spindle when the plunger is raised after each eyelet-inserting stroke.

The delivery ends of the raceways 587 (Figs. 45 and 46) are adjustable toward and from each other in accordance with the sidewise adjusting of the bearing members 565. The upper ends of the raceways are mounted on pivots 591 carried by a base 592 which also carries a hopper 593 and tracks 594 for supplying eyelets 602. The base is supported by a fixed pivot 683 and is retained thereon by spring-pressed pins 596 that permit a slight rocking motion of the raceway assemblage. The widthwise register of the delivery ends of the raceways with the spindles 586 is maintained by pins 597 each affixed to one of the bearing members 565. The tips of these pins engage the raceways in grooves 598 (Figs. 47, 48 and 49). Shoulders 599 initially abut the pins to locate the leading eyelets in alignment with the spindles, but when the tools 568 are moved into line with the punches the raceways are arrested by a stop 603 (Fig. 49) with the result that the spindles remove the leading eyelets from the raceways. Spring detents 604 carried by the raceways normally arrest the eyelets until they are picked by the spindles.

The bearing members 565 are initially retracted to the right as shown in Fig. 29. The punch beds 567 are thereby held out of line with the punches 550 to clear the tips of the measuring sticks 176 while the turret is turning. Once the eyeleting unit has been tripped into operation, the punch beds are shifted into alignment with the punches by one mechanism which remains stationary while another mechanism operates to shift the tools 568 and the punch beds alternately into alignment with the punches. Finally, after the last pair of eyelets have been inserted into an upper, the first mechanism above mentioned returns the bearing members 565 to the position shown in Fig. 29.

The primary motion of the bearing members 565 is derived from a cam 605 (Figs. 29, 37 and 38) affixed to a rock shaft 606. The connections include a cam roll 607, a radius arm 608, a link 609, levers 610 and 611 connected by a rock shaft 612, a pivot pin 613, a pair of links 614 and a pivot pin 615. The pin 613 forms the knee of a toggle comprising the links 614 and a link 616. One end of the latter is carried by an eccentric 618 from which the secondary motion of the members 565 is derived. A square block 619 mounted on the knee pin 613 is straddled and engaged by a forked portion of the lever 611 which, when turned counterclockwise (Fig. 37) by the cam 605, straightens the toggle 614, 616, after which the knee pin is guided to and fro in a straight path by the lever 611. The secondary motion of the toggle is produced by oscillating the eccentric 618. For this purpose a cam groove 621 is formed in one face of a gear 622 secured to the crank shaft 620 (Figs. 29 and 54). The operating connections include a bell crank 623 having a gear segment 624, and a pinion 625 secured to the shaft portion 626 of the eccentric.

The gear 622 receives rotation from a pinion 627 (Fig. 35) carried by a shaft 628 on which a sleeve 629 is affixed. One portion of this sleeve provides a bearing for the driving member 600 of a friction clutch faced with a ring 630 of friction material. The driven member 631 is provided with a conical portion 632 arranged to engage a fixed brake drum 633 when the clutching faces are separated. The driven member and the sleeve 629 are connected by keys 634 that permit relative axial movement. A group of compression springs 635 interposed between the sleeve 629 and the driven member supply the clutching force when the brake lever 636 is let off.

The braking force is applied to the driven member 631 by a train of parts that includes a toggle 637 connecting the lever 636 and an arm 638 mounted on an anchoring pivot 639 and braced by a cushioning spring 640. The brake lever 636 is mounted on a fulcrum pin 641 and carries two rolls 642 arranged to coact simultaneously with a pair of cams 643 carried by the driven member 631. The effect of these cams is to disengage the member 631 from the driving member and force the cone member 632 against the brake drum 633 when the toggle 637 is nearly straight as shown in Fig. 35. The knee of the toggle is normally pulled to the right by a spring 644, but its movement to the left is derived from a lever 645 with which it is connected by a strut 646. These elements are shown in rear elevation in Fig. 34.

The source of motion for straightening the toggle 637 is a cam 647 carried by the crank shaft 620. This cam oscillates a bell crank 648 pulled in one direction by a spring 649. A rod 650 normally rests on a roll 651 carried by the bell crank and is provided with a notch adapted to receive the roll to form an operating connection. One end of the rod and a cam 652 are connected by a pivot 653 that enables the rod to be moved up and down. The cam 652 is affixed to the rock shaft 606 and its cam surface actuates the lever 645.

Fig. 34 shows the elements in their stop positions the starting and stopping lever 544 being caught and held by the latch 545. This lever is affixed to a rock shaft 654 biased by a torsion spring 655 (Fig. 39) to turn counterclockwise when tripped. When the starting rod 546 is raised a shoulder formed thereon drops over the latch where it dwells while the turret advances one step, but the connections for indexing and locking the turret (Fig. 16) also pull down the rod 546 to retract the latch. Here, the lever 544 is turned counterclockwise to raise the rod 650 with which it is connected by a link 656. The rod 650 is thus disengaged from the roll 651, whereupon the cam 652 is turned counterclockwise by a torsion spring 657 (Fig. 39). The toggle lever 645 is thus let off, the spring 644 retracts the knee of the toggle 637, the rolls 642 release the driven member 631 of the clutch, and the springs 635 shift the driven member from the brake drum to the driving member 600.

At a later stage the description explains how the lever 544 is turned clockwise after the crank shaft 620 has executed a predetermined number of revolutions. Such turning not only restores this lever to the control of the latch 545, but also permits the rod 650 to fall upon the roll 651 while the latter is moving to and fro. The low part of the cam 647 shifts the roll 651 into register with the notch in the rod 650, whereupon the rod drops lower and becomes operatively connected with the bell crank 648. The high part of the cam 647 then shifts the rod 650 to the left, the cam 652 straightens the toggle 637, the rolls 642 are shifted to their operative positions, and finally the two cams 643 coact with the rolls to shift the driven member 631 against the brake drum.

The feed mechanism associated with the eyeleting mechanism of the machine as previously pointed out, comprises the vertically movable feed bar 465 which acts through associated connections to impart a series of stepped feeding movements outwardly to the associated work support and upper mounted thereon, and thereafter a quick return movement inwardly to cause the work support to be again located on the turret in position to be transferred to the lacing station. In accordance with the invention, mechanism is provided which is connected to be driven from and in timed relation to the eyeleting mechanism for imparting to the feed bar 465 a series of stepped movements downwardly each of fixed amount, and upon the completion of the last eyelet inserting operation, is disconnected to permit the return of the feed bar in a single rapid movement to its initial position. The driving connections for the feed mechanism comprises a Geneva mechanism for imparting a series of stepped movements to the feed bar with dwell periods interposed between successive steps, and a feed clutch which is operable to couple the Geneva motion to drive the feed bar, and thereafter to uncouple the Geneva motion to permit the rapid return of the feed bar 465 to its initial starting position.

The crank shaft 620 (Figs. 35 and 38) carries the operating arm 658 of a Geneva motion. The wheel member 659 operated thereby is mounted on a shaft 660. The hub of the wheel carries the driving member 661 of a jaw clutch. The driven member of the clutch is a pinion 662 which meshes at all times with teeth formed in the feed bar 465 (see Figs. 29 and 35) and has lugs adapted to be interengaged with the driving member but initially disengaged therefrom. The driven member is axially movable on the shaft 660 and is engaged by a shipper 663 in the form of a bellcrank. A gear segment 664 (Fig. 29) formed on one arm of the shipper engages a gear segment 665 formed on a bell-crank 666 (Figs. 2, 37 and 43). The latter engages a cam 667 the effect of which is to declutch the pinion 662 against the stress of a spring 668 attached to the shipper. The cams 667 and 605 are both formed on one member affixed to the rock shaft 606 and biased by the torsion spring 657. The parts are so organized that both clutches of the eyeleting unit are tripped into operation simultaneously with the motion that shifts the punch beds 567 into line with the punches for the first punching operation. Thereafter, when the cam 652 is actuated to stop the eyeleting unit it also turns the rock shaft 606 in the direction to declutch the pinion 662 and return the punch beds to their initial positions (Figs. 34, 35 and 37). The effect of declutching the pinion is to permit reverse rotation thereof under the influence of a spring by which the work holder at station I is returned to its initial position on the turret. The gear teeth of the pinion 662 remain constantly in mesh with the teeth of the vertically movable feed bar 465 (Figs. 29 and 35). As previously pointed out, the feed bar 465 is urged upwardly to the starting position by means of connections (see Fig. 55) including link 477, lever 474 and springs 478 and 479.

The eyeleting unit has provisions for inserting not fewer than two nor more than seven eyelets in each row. The desired number is predetermined by inserting a knock-off pin 669 into any one of a series of holes 670 in the feed bar 465 (Fig. 29). The spacing of these holes is equal to the length of the feeding steps imparted to the bar. In this view the pin is located to stop the operation of the eyeleting unit at the conclusion of the fifth eyeleting cycle. During the feeding stage of that cycle the pin will engage and depress an arm 671 affixed to the rock shaft 654 and thereby restore the lever 544 to its stopping position (Fig. 34).

The feed bar also carries two screws 672 for holding a detachable member 673 provided with a cam portion 674. This member need not be used, but if used it will produce an effect commonly termed "eyelet spread." When the feed bar 465 stands in its initial position the cam portion 674 will engage a roll 675 carried by the horizontal rack bar 578 (Figs. 30 and 39) and thereby increase the distance between the two punches 550 and between the two tools 568. This will determine the distance between the two eyelets of the first pair, but if the cam portion is designed for a "one-eyelet spread" it will be carried below the roll 675 by the first feeding step of the bar 465. The spring 573 (Fig. 39) will then move the arms 570 toward each other and thereby locate the subsequent eyelets nearer the lacing edges of the work. If a "two-eyelet spread" is desired the member 673 may be replaced by one having a longer cam portion.

Referring to Fig. 37, the cams 605 and 667 will be turned clockwise by the spring 657 incidentally to tripping the primary clutch of the eyeleting unit. The punch beds 567 will be shifted to their primary punching position (Fig. 48) by the cam 605 and the work-feeding pinion 662 will be shifted from the inoperative position of Fig. 35 into engagement with its driving member by the cam 667 (Figs. 34 and 37). The crank shaft 620 (Fig. 29), now in rotation, will raise the punches 550. At the same time the punch beds will be depressed to meet the punches at the work level. This latter motion is derived from a cam 676 (Fig. 38) carried by the crank shaft. The operating connections include an arm 677 biased by a spring 678, a link 679, a bell crank 680, a link 681, a pair of toggle members 682 (Figs. 31, 32 and 34) rigidly connected by a rock shaft 683 in fixed bearings, and a pair of toggle members 684 rigidly connected by the pivot pin 566. This pin has bearings in square blocks 685 movable up and down in guiding slots 686 in the frame. The punch beds are carried up and down by the pin 566.

When the first pair of holes has been punched (Fig. 48) the punch beds 567 will be raised slightly to clear the punches and the bearing members 565 will be swung to place the eyelet-inserting tools 568 in line with the punches (Fig. 49). The first of these motions is produced by the cam 676 and the spring 678 (Fig. 38), the second by the eccentric 618 (Figs. 29 and 43). Now, while the tools 568 approach the punches 550, the latter will be moved upwardly a second time and to a slightly higher level to place their upsetting shoulders 552 at their operating level. This movement of the punches is effected by movement of the crank shaft 620 acting in co-operation with the eccentric 558. It will be noted that the knee 561 of the punching toggle (see Fig. 29) travels across and beyond its dead center line before returning. Between the first and second crossing the eccentric 558 is turned in a direction to raise the punches a distance about equal to the thickness of the eyeleted layers of the eyelet rows. Consequently, the upsetting shoulders 552 reach a slightly higher level during the return crossing when they are utilized than during the first crossing when they are not utilized. This turning of the eccentric is derived from a cam 687 and a lever 688 having a gear segment 689 engaging the pinion 559. The tools 568 reach their lowest level and the punches reach their highest level at about the same instant. The eccentric 558 is reversely turned before the next punching operation.

When the first two eyelets have been clenched (Figs. 51 and 52) the crank 560 raises the tools 568 and depresses the punches. Meanwhile, the cam 676 (Fig. 38), after operating the arm 677, operates an arm 690 loosely mounted on the shaft 660. A link 691 connects the arm 690 and an arm 692 by which the Geneva wheel 659 is locked during the punching and eyeleting stages. A locking roll 693 carried by the arm 692 is normally drawn into a slot of the wheel by a spring 694 as each step of the wheel is terminated, and is forced out of the slot as the operating roll on the arm 658 enters another slot.

One-fourth revolution of the wheel 659 produces one feeding step of the work after each two eyelets have been clenched. The first feeding step opens the microswitch 473 forming part of the electrical control system of the machine hereinafter to be described. This switch is operated by an arm 472 (Fig. 29) affixed to the slide block 463, and will remain open until the carriage 56 returns to its initial position. While the work is being fed the punch beds 567 are shifted into line with the punches by the eccentric 618, and a cycle of the eyeleting unit is completed at the termination of the feeding step.

During the last feeding step of a run completing the eyeleting operation upon an upper, the knock-off pin 669 carried by the vertical bar 465 depresses the arm 671 with three results, first, disengagement of the feed clutch (Fig. 35), second, retraction of the bearing members 565 to their initial positions (Fig. 29), and, third, stopping rotation of the crank shaft 620. Disengagement of the feed clutch permits the work holder to return to its initial position on the turret under the influence of the springs 478, 479 (Fig. 55). The micro-switch 473 is thereby closed.

*Lacing machine*

The lacing machine here disclosed as embodying in a preferred form certain features of the invention, is adapted to form lacings of the chain stitch type, four enchained loops being inserted to form a lacing in each successive pair of eyelets in the upper which is supported for this operation with the eyeleting lacing margins thereof in an opened out edge to edge relation. The machine is provided with an eye lacing needle to which is imparted longitudinal reciprocatory and lateral vibratory movement, and a double looper and loop spreader mechanism which cooperates therewith. Each successive chain stitch is pulled in tightly by the looper against a tensioned thread, so that each group of enchained loops forming the individual lacings will be held firmly in position. Applicant's improved machine is provided also with a novel cutter and clamping device for severing and for clamping the severed end of the lacing cord, automatic means, available when desired, for disconnecting the needle during the first lace forming cycle so that the lace is omitted from the first pair of eyelets, and means operating during the first needle reciprocation in lacing a shoe upper to increase the clamping pressure upon the held end of the lacing cord, and also to extend the time during which the thread tension is released.

In the operation of the lacing machine it will be understood that the indexing movement of the turret causes the work holder and shoe upper thereon to be located with the first pair of eyelets at the throat of the lacing slit in position with relation to the needle for the formation of a lacing through said first pair of eyelets. Upon completion of each lacing comprising a group of four enchained loops, a stepped feeding movement is imparted to the work holder to move the next succeeding pair of eyelets into register with the lacing needle. Upon the completion of the last group of four stitches, the machine stop motion is rendered operative to stop the lacing mechanism with the needle withdrawn from the work, and to cause the work holder to be returned to initial position. In the preferred form of the invention the clamping device functions with relation to the lacing mechanism to hold the end of the lacing cord tightly during the formation of the first lacing, and then to permit the cord to be gradually withdrawn from the clamp as the work holder and upper mounted thereon are advanced beneath the lacing mechanism, so that the loose end is laid along the eyelet slit beneath the lacings in such a manner as to prevent any possibility that the loose end will interfere with the subsequent operations upon the upper. At the end of the lacing operation, the thread forming the middle portion of the last lacing loop is severed to form a thread lock of conventional type in order to tie off the last formed lacing of the series.

Referring to the drawings, the operating instrumentalities of the illustrated mechanism for lacing shoe uppers comprise an eye lacing needle 700 which is reciprocated vertically and is oscillated laterally to cause the needle to pass loops of the lacing cord alternatively through the eyelets of a pair, a double looper 701 secured to a looper carrier bar 702 to be moved bodily laterally with the needle and for rocking movement to enchain the lacing loops inserted alternately through the eyelets of the pair, and a double loop spreader 703 having the same general shape as the looper and supported on a transverse pivot 704 on the looper 701 for movement between open and closed positions with relation thereto.

The several operating parts of the lacing machine are driven from cranks and cams mounted on a main cam shaft 706 (see Figs. 60 and 63), a secondary cam shaft 707 parallel with and connected to turn at one-half the speed of the main cam shaft, and a driving sleeve 708 consisting of a series of sleeved segments keyed to one another to turn as a unit on the main cam shaft and arranged to be driven at one quarter the speed of the main cam shaft. The cam shaft 706 is driven from the main driving motor 86 of the machine (see Fig. 56) through a driving and stopping mechanism hereinafter to be more fully described, which includes a clutching device rendered operative in starting the machine to connect the cam shaft 706 to be driven from the motor, and actuated automatically at the completion of the lacing operation to disconnect the cam shaft. The secondary drive shaft 707 is driven from the main cam shaft 706 at one-half speed by means of a gear 709 (see Figs. 59 and 60) on the cam shaft 706 and gear 710 on the shaft 707. The sleeve 708 is in turn driven from the secondary shaft 707 at one-fourth the speed of the main shaft 706 by means of a gear 711 on the shaft 707 and a gear 712 meshing therewith, the sleeve hub of which forms one of the segments of the segmental driving sleeve 708.

With the present construction, the main cam shaft which is driven at a relatively high speed, is employed to impart a reciprocatory loop drawing movement to the needle, to operate the loop spreader, and to control the thread tension during the formation of each succesive chainstitch of the lacing. The main cam shaft is employed also to operate the cutter and clamp to sever and to grip the severed end of the lacing cord in timed relation to the retacting movement of the needle at the completion of the lacing operation. The secondary or half speed cam shaft is provided with an eccentric from which is taken the rocking movement of the double looper to engage the needle loop. A crank secured to the end of the secondary cam shaft is connected to impart lateral swinging movements to the needle, and also a reciprocatory feeding movement to the feed pawl, which acts when rendered operative to advance the feed bar at a relatively rapid rate. The quarter speed cam sleeve 708 is employed to control the operation of the feed pawl and the feed bar retaining pawl for imparting a stepped advance to the feed bar at the completion of each four operations of the needle in forming a complete lacing. The cam sleeve is rendered operative also to operate the stop motion lock bolt carrier, and a second gripping device which grips the severed end of the lacing cord during the formation of the four successive stitches of a single lacing, and then releases to permit the pulling out of the cord during the feeding movement of the support and upper.

The eye lacing needle 700 (see Figs. 61, 62, 64, 77, 78 and 80) is secured to a needle bar 714 slidably mounted for reciprocatory movement in an oscillatory needle carrier 715 which is secured to a U-shaped extension 716 of a rearwardly extending pivot shaft 717. The pivot shaft 717 which forms the rotational axis for the oscillatory or swinging movements of the needle, has secured to its rear end a curved downwardly extending lever arm 718 which forms part of the actuating connections for imparting the oscillatory movements to the needle and to the looper mechanism associated therewith as hereinafter more fully set forth. The lever arm 718 also provides a connection for imparting corresponding oscillatory movements to the looper mechanism for maintaining the looper mechanism in alignment with the needle. The needle bar 714 is slidably supported adjacent its lower end in a slotted guidway 719, and is supported at its upper end on a cross head 720 slidable in ways 721 in the needle carrier 715.

Vertical reciprocating movements are imparted to the needle 700 through connections from the main drive shaft 706 which comprises a crank arm 722 (see Figs. 59, 60, 61 and 62) which is connected by a link 723 with a lever arm 724 arranged to turn about a fixed pivot 725. The lever arm 724 is connected by a link 726 with a needle reciprocating lever 727 supported to turn about a fixed pivot 728. The lever arm 724 and link 726 act as a toggle connection which is straightened and then broken by the rotary motion of the crank so that the needle reciprocating lever 727 and needle 700 are caused to move rapidly to and from the downward eyelet penetrating position and to be held during a relatively extended dwell period in the raised stitch tightening position.

The needle is arranged to be reciprocated by the continuously driven needle reciprocating lever 727 through connections which are arranged to permit the needle to be disconnected from the driving lever, and thereby to render the lacing mechanism inoperative when so desired. These connections comprise a sliding block 729 supported for movement in the ways 721 in the needle carrier 715, and connected by means of a link 730 to be continuously reciprocated with the needle reciprocating lever 727. The driving block 729 is normally connected to reciprocate the needle bar and needle therewith by means of a latch 731 which is pivotally supported on a stud 732 on the cross head 720 secured to the needle bar 714, and is provided in its lower portion with an arcuate slot which engages with an arcuate segment 733 on the face of the driving block 729. The latch 731 is provided at its upper end with a notched potrion 734 which is arranged for a fully retracted position of the needle 700 and needle bar 714 to be engaged by a pawl 735 formed on the forward end of a rock shaft 736 carried in an upward extension of the U-shaped supporting member 716. Assuming that the needle has been moved to the fully retracted position so that the pawl 735 is engaged with the latch 731, a rocking movement of shaft 736 and pawl 735 in a clockwise direction as shown in Figs. 77 and 78, will act to rock the latch 731 in a counterclockwise direction so that the arcuate slot therein is moved out of engagement with the arcuate segment 733 and into engagement with an arcuate segment 738 formed on the face of the needle carrier 715, thus disconnecting the needle and needle bar from the reciprocating needle drive block 729, and at the same time latching these parts in a retracted inoperative position.

The connections for disconnecting the needle from active operation are provided for the purpose of disabling the lacing mechanism during the first lace forming cycle of the machine, so that no lacing will be inserted in the eyelet pair adjacent the bottom of the eyelet slit. Applicant's automatic machine is thus adapted to operate in accordance with the practice followed in many factories where the lacing is omitted from the first eyelet pair of the series, in certain types of shoes. With the present construction, the mechanism for disconnecting the needle is controlled automatically from the feed bar 506 through an actuating device which is rendered operative by movement of the bar 506 to its raised starting position to disconnect the needle, and by the downward feeding movement of the bar at the completion of the first lace forming cycle to again start needle reciprocation. The operating connections, as shown in Figs. 56, 64, and 77 to 80 inclusive, comprise a vertically movable slide bar 739 supported for vertical sliding movement in a stationary bracket 740, and having mounted at its upper end a latch plate 741 which is arranged to be swung between alternate positions topping the feed bar 506, and out of alignment therewith. The latch plate 741 is yieldingly supported in each of its alternate positions by means of a spring-presssed plunger 742 carried in a supporting member 743 attached to the slide bar 739, and arranged for engagement alternately in one or the other of two recesses formed in the under side of the latch plate 741. At its lower end the slide bar 739 is connected with a lever 745 which is pivotally supported on a pivot pin 746, and is yieldably connected to move as a unit with a second lever 747 supported on the pivot 746. The levers 745, 747 each have upwardly extending arms which abut one another and are held in engaging position by means of a compression spring 748 and its supporting plunger 749. The lever 747 is connected by a link 752 with an arm 753 secured to the rear end of the rock shaft 736 previously described which is operable to connect and disconnect the needle from its operating mechanism. A spring-pressed plunger 754 engaging the lever 745 and having a coiled compression spring 755 supported thereon between an enlarged butt of the plunger and a supporting lug on the bracket 740 tends to depress the lever 745 and thereby to shift the several operating connections including the needle latch 731 to the needle operating position.

Oscillatory movements are imparted to the needle, and to the looper mechanism associated therewith, by means of a crank arm 760 mounted on the forward end of the secondary half speed cam shaft 707 (see Figs. 60, 62, 63 and 65). The crank 760 is connected by a link 761 with one arm of a bell-crank 762, the other arm 763 of which is connected by a link 764 with a lever arm 765. A second lever arm 766 formed integrally with the arm 765 is connected through a link 767 with one arm 768 of a three-armed lever supported to turn on a pivot shaft 769. The connections above described including the crank 760 act to impart an oscillatory movement of fixed extent to the three-armed lever 768. From an inspection particularly of Fig. 65, it will be noted that the arm 763 of the bell-crank and link 764 act as a toggle connection which is straightened as the crank 760 reaches the top of its stroke, and similarly the arm 766 and link 767 form a toggle connection which is straightened as the crank arm 760 reaches the bottom of its stroke. This arrangement has the advantage that the dwell which is normally produced at each end of an oscillating movement derived from a crank motion is made substantially longer, so that ample time is provided at each limit of the needle oscillatory movement for the downward and return stroke of the needle through one eyelet of the pair. The arm 768 of the three-armed lever is provided with an elongated sleeve hub portion on which are formed a lever arm 770 which is connected to impart an oscillatory movement to the depending arm 718 for oscillating the needle and looper mechanisms, and a lever arm 771 from which is derived an oscillatory stepped feed movement for imparting a stepped advance to the work support and shoe upper mounted thereon, as hereinafter more fully set forth. The lever arm 770 is connected by elbow links 772 and 773 to the depending lever arm 718. The links 772 and 773 are connected by a pivot pin 774 carried on a radius arm 775 which is mounted to turn on an adjustable support provided by a pivot pin 776 carried on a supporting arm 777 adjustable about a fixed pivot 778.

Adjustment of the amplitude of the oscillatory movements imparted to the needle 700 and looper mechanism associated therewith is obtained by moving the supporting arm 777 about its pivot to vary the position of the pivot 776 for the radius arm 775. With the present construction, this adjustment is secured through connections which include a link 780 connecting the supporting arm 777 with a lever arm 781 (see Figs. 61, 62 and 63) sleeved on a pivot shaft 782. For manual control of the widthwise spacing adjustment, an oppositely extending arm 783 formed integrally with the lever arm 781 is arranged for engagement with a locking peg supported in any one of the series of holes 784 formed in a control plate 785 on the machine frame. An automatic control of the amplitude of oscillatory movement of the needle and looper mechanism when so desired to cause the needle to conform with variations in the widthwise spacing of the eyelet holes in accordance with a predetermined pattern is provided by means of operating connections which include an upwardly extending arm 786 formed integrally with the arms 781, 783, and having mounted thereon a follower roll 787 for engagement with a templet cam 788 secured to the lacing feed bar 506. In the illustrated embodiment of the invention, the locking peg referred to, has been removed so that the position of the adjustable support including pivot pin 776 and supporting arm 777 is wholly under the control of the cam 788. It will be understood that the cam 788 is constructed and arranged with relation to the corresponding templet cam on the feed bar 465 for the eyeleting mechanism, to cause the lacing needle to be registered exactly with the eyelets previously inserted in the supported upper by the eyeleting mechanism.

The looper mechanism of the machine, as previously noted, comprises the double pointed looper 701 secured to a rotatable carrier bar 702 which is supported for lateral movements bodily with the needle, and the double loop spreader 703 supported on a transverse pivot 704 on the looper 701 (see Figs. 56, 57, and 61 to 65 inclusive). The looper carrier bar is supported for rotational movement and lateral movement bodily in two slots 800 formed in a stationary frame, and having a radius of curvature about the needle carrier pivot shaft 717 as an axis. The carrier bar is further guided and supported by two depending carrier arms 801 pinned to a rock shaft 802 on the machine frame (see Figs. 61 and 64), and slotted for engagement with the carrier bar. Lateral movements bodily are imparted to the pivot shaft 702 in the slots 800 by means of the depending lever arm 718 which is secured as above noted at its upper end to the needle carrier pivot shaft 717, and at its lower end is forked for engagement with a slide block 803 supported on the pivot shaft 702.

Rocking movements are imparted to the double looper 701 by means of connections controlled from an eccentric 805 supported on the secondary half speed drive shaft 707. As shown in Figs. 59, 60, 63, 64 and 65, the eccentric is engaged by an eccentric strap 806 forming part of a lever arm 807, the other end of which is pivotally connected with the middle portion of a bowed lever 808. The lever 808 is supported to turn on a pivot pin 809 carried by a lever arm 810 formed integrally with the hub portion of the depending needle oscillating lever 118, and is connected by a downwardly extending link 811 with a laterally extending arm 812 secured to the rear end of the looper carrier bar 702.

The loop spreader 703 is arranged to be swung between open and closed positions on its transverse pivot 704 by means of connections actuated from an eccentric 814, supported on the main drive shaft 706 of the machine, so that the loop spreader is moved from the closed to the open position in timed relation with each needle reciprocation (see Figs. 64, 90 and 92). The eccentric 814 as shown in Fig. 64, is engaged by an eccentric strap 815 formed on the upper end of a depending lever arm 816 which is pivotally connected with one arm of a bell-crank 817 carried on a pivot shaft 818. The downwardly extending arm of the bell-crank 817 carries a slide block 819 which engages a track formed on a sleeve element 820 slidable on a rod 821 which is supported in axial alingment with and rearwardly of the pivot shaft 802. At its forward end the sleeve member 820 is provided with a downwardly extending connecting arm 823 which is loosely connected to the rear end of an axially movable loop spreader actuating rod 824 which is supported within an axial bore formed in the looper carrier rod 702, and at its forward end is pivotally connected with a downwardly extending loop spreader actuating lever 825 supported on the transverse pivot 704 with the loop spreader 703. A yieldable connection is provided between the loop spreader 703 and its actuating lever 825 which takes the form of a plunger 826 screw-threaded into a sleeve element 827 on a pivot 829 extending across a bifurcated portion of the actuating lever 825, and a compression spring 831 interposed between a knurled head on the plunger and a downwardly extending tail 830 of the loop spreader 703 through which the plunger extends.

The operation of the lacing mechanism including the looper mechanism above described, will be readily understood from an inspection of Figs. 62, and 90 to 94 inclusive, which illustrate the operation of the lacing mechanism in the formation of the first lacing stitch. As shown in Fig. 62, the needle has penetrated the left-hand eyelet hole of an eyelet pair, the looper 701 is located at the extreme left-hand limit of its bodily movement corresponding with the needle position, and has been rocked in a clockwise direction about its carrier bar to engage the left-hand or outer prong of the looper with the needle loop. The needle is then withdrawn and starts its shifting movement toward the right carrying with it the looper. In the extreme position shown in Fig. 91. the looper will act in the formation of succeeding stitches to pull in the previous stitch. As the needle and looper moving therewith reach the limit of their bodily movement to the right, the looper starts its rocking movement to the left giving up some cord, and the needle is moved downwardly to penetrate the right-hand eyelet hole of the eyelet pair. while at the same time the loop spreader is moved to its spread position so that the needle is caused to pass through the spread loop held on the left-hand prong of the looper and loop spreader. For the formation of the second lacing stitch the operation is then repeated in a reverse direction, the looper being rocked leftwardly about its carrier rod 702, so that the loop is cast off from the left-hand prong. The loop spreader is moved to its closed position, and the right-hand prong of the looper 701 is caused to penetrate the needle loop newly presented thereto. The needle is then retracted. During the bodily movement of the needle and looper again leftwardly, as shown in Fig. 94, the looper is rocked to its extreme position to the left in order to assist in the drawing in of the previously formed loop.

A lacing cord is supplied to the needle from a cop 834 supported in a container 836. As shown, for example, in Fig. 4, the cord passes through a tubular guide 838 in top of the container, and supported on a bracket attached to the cop container, through a tension device 842 under a friction guide 844 to the eye of the needle 700.

The tension device is arranged to be relieved during a portion of each needle reciprocation through connections controlled from a tension device control cam 846 secured to the main cam shaft 706 (see Figs. 60, 61, 64, 71 and 72). This mechanism acts to cause the tension device to be engaged during the downward stroke of the needle, and to be relieved during the upward movement of the needle. The tensioning device comprises a tension disk 847 (see Fig. 73) loosely supported on an axially shiftable tension control rod 848 against a shoulder of a supporting bracket 849, and a cooperating tension disk 850 supported on the control rod 848 against a flange 851. A compression spring 852 coiled about the control rod 848 between a disk 853, and an adjustable supporting arm 854 tends normally to force the control rod 848 rearwardly and to maintain an engaging frictional pressure on the cord passing between the disks. Adjacent its rear end the control rod 848 is provided with a collar 855 which is engaged by a forked arm of a small bell-crank 856. the other arm of which is arranged to be engaged by a vertically arranged cam lever 857 supported to turn on a pivot pin 858, and provided with a follower roll 859 for engagement with the tension relieving cam 846.

Applicant has found it desirable to provide a different timing of the tension device during the needle reciprocation in forming the first stitch of the lacing upon a new shoe upper. As previously noted, the tension device is normally engaged during the entire downward movement of the needle, so that all of the cord on the work side of the needle will be drawn in during the down stroke of the needle and before additional cord is drawn off from the supply. During the formation of the first stitch, the needle is acting directly against the clamped end of the cord, so that particularly during the latter half of the downward stroke of the needle, the cord must be reeved through the needle eye. The relieving of the tension on the cord during the latter half of the downward stroke of the needle has been found effective to relieve excessive strain on the cord at the needle eye which would otherwise result in breakage of cord or the pulling out of the cord end from the clamp.

The mechanism herein disclosed for relieving the tension on the cord during the latter portion of the downward stroke of the needle in the formation of the first stitch (as best shown in Figs. 61, 62. 71, and 73 to 76 inclusive), comprises a bell-crank lever 860 similar to the bell-crank 856 previously described, supported on the pivot pin 861, and having one arm thereof engaged behind a collar 862 on the tension control rod 848. The bell-crank 860 is arranged to be acted upon by a vertically arranged lever 864 supported on the pivot pin 858, and provided at its upper end with an offset block having an adjustable contact screw 865 for engagement with the free arm of the bell-crank 860. The actuating lever 864 is normally maintained in inoperative position to the left, as shown in Fig. 76, against a fixed stop 866 by means of a tension spring 867 attached at one end to the lever and at the other end to the machine frame. In order that the tension may be relieved during the latter portion of the first downward stroke of the needle in the formation of the first lacing on an upper, the actuating lever 864 is arranged to be operatively connected at this time with a cam follower lever 868 which is engaged with and is actuated by the oscillatory movement of a segmental cam member 870 secured to a short rock shaft 871. A lever arm 872 (see Fig. 61) secured to the rock shaft 871 is connected by a link 873 with the needle cross head 720, so that an oscillatory movement is imparted to the cam segment 870 in timed relation with each reciprocation of the lacing needle 700. A tension spring 874 connected at one end to the follower lever 868 and at its other end to the machine frame, acts to maintain the cam follower lever 868 at all times in engagement with the segmental cam 870. The actuating lever 864 is connected with the follower lever 868 during the first reciprocation of the needle by means of a latch 875 supported to turn on a pivot pin 876 on the actuating lever 864, and arranged for engagement with an abutment 877 on the follower lever 868. A spring 878 coiled about the pivot 876 tends to swing the latch upwardly into engaging position. In the normal operating position of the machine in which the actuating lever 864 is in its fully retracted position to the left, the latch 875 is disconnected, a smooth portion thereof riding against the abutment 877.

In the illustrated construction, connections are imparted which are rendered operative by the stop motion in stopping the machine to operatively connect the actuating lever 864 with the follower lever 868, so that during the first reciprocation of the needle when the lacing mechanism is again started, these connections will be operative to relieve the tension of the cord during the latter portion of the first downward stroke of the needle. To this end the actuating lever 864 is connected by a link 880 with an upwardly extending arm 881 secured to a stop motion controlled rock shaft 882 to which is imparted a clockwise rocking movement in stopping, and a counterclockwise rocking return movement in starting the machine. The movement of the rock shaft 882 and lever arm 881 to the right in stopping causes the actuating lever 864 to be moved therewith to an intermediate position in which the latch 875 is shifted to latching position, but without having any effect to relieve the tensioning device. This is the position of the parts as shown in Figs. 61 and 74. A loose connection provided between the link 880 and lever 881 permits the rock shaft 882 and lever 881 to be moved to the left upon starting the machine without affecting the operation of the actuating lever 864. During the first downward movement of the lacing needle 700 and cam segment 870 connected thereto at the start of the next lacing operation, the rocking movement imparted to the cam follower lever 868 is effective to rock the actuating lever 864 still further to the right to turn the bell-crank 860 and to relieve the tension as the follower lever rides against the high portion of its cam. This is the position of the parts shown in Fig. 75 of the drawings. Continued movement of the cam segment 870 with the needle to the limit of its down stroke causes a pin 884 thereon to engage and trip the latch 875, so that the actuating lever 864 is permitted to return again to its inoperative position to the left, as shown in Fig. 76.

A cutting and clamping device is provided which is particularly adapted for use with applicant's improved automatic lacing mechanism. This device comprises a knife located beneath the work and arranged upon the stopping of the machine to sever the loop of lacing cord last drawn out by the looper in tightening the previous stitch, and a clamping device arranged to engage and to hold the severed end of the lacing cord in a position above the work in close proximity to the needle, so that the cord end will be properly positioned for the operation of the needle and looper for the formation of the first stitch of the next succeeding lacing. The cutting and clamping device is arranged to be operated by means of a face cam 885 formed on the rear face of the needle crank 722, so that these elements will operate, when thrown into operation, in timed relation with the reciprocatory movements of the lacing needle 700. As best shown in Figs. 56, 60, 61, 62 and 64, the cam 885 is arranged to be engaged by a roll on a cam lever 886 which is keyed to turn with and is axially shiftable on a transversely extending rock shaft 887. A downwardly extending tail of the lever 886 has formed therein a ho'e which receives a pin 888 formed on a clamp actuating lever 889 secured to the shaft 887. During the normal operation of the machine, the cam lever 886 is supported in a position to the right, as shown in Fig. 62, in which it is out of engaging contact with the cam 885. The cam lever 886 is shifted leftwardly into operative relation with the cam 885 as shown in Figs. 60 and 61, during the stopping of the machine to impart a rocking and return movement to the rock shaft 887. The rocking movement of the stop motion control rock shaft 882 is employed for this purpose. As shown in Figs. 56, 60, 61 and 74, a downwardly extending arm 890 of the lever 881 secured to the rock shaft 882 carries at its lower end a pin 891 for engagement with a vertically arranged slot 892 formed in the sleeve hub of the cam follower lever 886. The rocking movement imparted to the rock shaft 882 in a c'ockwise direction as the stop motion is thrown into operation, acts to shift the cam follower lever 886 into operative relation with the face cam 885. The return movement of the rock shaft 882 when the machine is started, causes the cam lever 886 to be again shifted rightwardly to its inoperative position shown in Fig. 62.

The connections rendered operative by the rocking of the shaft 887 to sever the lacing cord comprise a lever arm 894 which is secured to the left end of the rock shaft 887 and is connected by a link 895 with a lever arm 896 which is in turn connected by a link 897 with the tail of a rotatable cutter 898 supported to turn on a vertical pivot 899 (see Figs. 60 and 64).

The connections rendered operative by the rocking of the shaft 887 to clamp the severed end of the lacing cord comprise the clamp actuating lever 889 above referred to, a forwardly extending clamp supporting slide rod 900, and a clamping element in the form of a transversely extending plate 902 secured to the rod 900 (see Figs. 56, 57, 60, 64, and 82 to 89 inclusive). The clamping plate 902 in its retracted position is located rearwardly of the needle, and is arranged to move forwardly directly beneath the needle when fully withdrawn, to cooperate with a clamping element 903 supported forwardly of the needle on the lower end of a plunger 904. The clamping element 903 and plunger 904 are vertically movable in a bracket 906 and are spring-pressed downwardly by means of a compression spring 905 coiled about the plunger between a shouldered portion thereof and the shouldered end of a recess formed in the supporting bracket 903. During the normal operation of the machine in which the clamping plate 902 is in a retracted position illustrated, for example, in Figs. 84 and 88, the yieldable clamping plate 903 is pressed downwardly against another clamping element 907 rotatably supported on a vertical pivot shaft 908 carried on the bracket 906. A spring 909 connected to an arm 910 secured to the upper end of the rock shaft 908 tends to maintain the last-mentioned clamping element 907 in its operating position determined by the engagement of the tail portion 911 of the clamping member 907 with the clamp supporting slide rod 900. In the operation of the device, the advancing movement of the slide bar 900 causes the clamping member 902 to engage with and carry the severed end of the lacing cord beneath the yieldable clamping element 903, the forward end of which is cammed so that it is raised by the engagement of the plate 902 therewith, to grip the cord yieldably between the under side of the element 903 and the upper side of the plate 902. This advancing movement of the slide bar 900 is effective also through the engagement of the forward end thereof with the tail 911 to swing the lower clamping element 907 out of the way. This is the position of the parts shown, for example, in Figs. 86 and 87. It will be understood that the operation of clamping the severed end of the lacing cord takes place as the machine is brought to a stop with the lacing needle 700 in its retracted position, and that Figs. 86 and 87 represent the relative positions of the several parts of the clamping device for the stop position of the machine. When the machine is again started, the slide bar 900 and clamping plate 902 are retracted out of the path of downward movement of the needle 700, and the pivoted clamping element 907 is at the same time permitted to swing about its pivot 908 under the influence of the spring 909 as the slide bar 900 is shifted toward its retracted position. This movement of the pivoted clamping member 907 causes the same to engage with the cord formerly held by the rearwardly moving clamping plate 902, so that as the clamping plate is fully withdrawn, the cord is firmly held between the yieldable clamping member 903 and the pivoted clamping member 907, as shown in Figs. 84, 85, 88 and 89.

The illustrated clamping device for controlling the end of the lacing cord is also provided with means for varying the amount of clamping pressure employed to exert a relatively heavy clamping pressure during the formation of the first stitch of the lacing which is formed in each succeeding pair of eyelets of the upper, and at other times to exert a relatively lighter clamping pressure. The principal function of the heavier clamping pressure thus provided is to insure a firm grip on the severed end of the lacing cord during the operation of the lacing mechanism to form the first lacing in an upper, when the pull exerted on the lacing cord by the lace forming instrumentalities is taken directly by the clamping device. The relatively lighter clamping pressure employed is suitable to permit the end of the lacing cord to be withdrawn from the clamp gradually as the upper is fed step-by-step with the formation of the lacings in succeeding pairs of eyelets.

The connections for varying the clamping pressure as above described, comprise a lever arm 912 adapted to be supported on the forward end of a rock shaft 913, and arranged at its outer end with a contact surface which overlies the plunger 904 (see Figs. 57, 60, 61, 64, 82 and 83). A downwardly extending arm 914 secured to the rock shaft 913 is engaged by a compression spring 915 which tends to rock the shaft 913 and arm 912 to force the plunger 904 down to exert a relatively heavy clamping pressure. The operation of the clamping arm 912 is controlled by means of a cam lever 916 secured to the rock shaft 913, and provided with a roll which engages a cam 918 forming part of the quarter speed segmental cam sleeve 708. In the stop position of the machine illustrated, for example, in Figs. 60, 61, 82 and 83, the lever 916 is opposite a high portion of the cam 918, but is slightly retracted therefrom by the action of the clamping plate 902 which has lifted the cooperating clamping element 903, plunger 904 and lever 912, so that the shaft 913 is rocked positively against the pressure of its spring 915 to maintain a relatively heavy clamping pressure on the severed end of the lacing cord. Upon starting the machine, as the clamp plate 902 is withdrawn and the clamping element 907 is shifted into its operative position, the lever 916 will ride against the depressed portion of the cam 918, causing the lever arm 912, plunger 904 and clamping element 903 to be depressed under a relatively heavy pressure against the clamping element 907 to hold the end of the lacing cord firmly against the thrust of the needle 700 during its initial downward stroke.

A stepped feeding movement of fixed extent downwardly is imparted to the feed bar 506 for the lacing mechanism by means of connections which include a feed pawl arranged to be oscillated from the crank 760 which also serves to impart the oscillatory swinging movements to the needle and looper mechanism (see Figs. 62, 63, and 65 to 70 inclusive). As previously set forth, the operating connections from the crank 760 include an arm 771 forming part of the three-armed lever supported on the pivot shaft 769 which has an oscillatory movement imparted thereto by the crank 760 and intervening connections as above set forth. The lever arm 771 is connected at its forward end to a vertically movable slide element 920 by means of a connecting pin 921 which passes through a block 922 carried by and horizontally slidable with relation to the slide and is supported at its opposite ends in the bifurcated end of the lever 771. The slide 920 provides support for a feed bar engaging plunger 924 which is spring-pressed toward the feed bar for engagement with any one of a series of apertures 925 formed therein. Movement of the plunger 924 into and out of operative engagement with the apertures 925 is controlled by means of an actuating lever 926 supported intermediate its length on a pivot pin 927 on the block 922 carried by the slide 920, and arranged at its lower end for engagement with a slot formed in the plunger 924. The actuating lever 926 is arranged to be acted upon by a cam lever 930 loosely supported to turn on the stop motion control rock shaft 882, and having a follower roll 932 for engagement with a cam 933 forming part of the segsegmental quarter speed cam sleeve 708. An arcuate-shaped engaging surface 934 formed in the lower end of the cam lever 930 is arranged to be engaged by a roller 935 on the actuating lever 926. A tension spring 936 connected to the cam lever 930 tends to rock the same in a clockwise direction as shown, for example, in Fig. 68, to maintain the lever in engagement with the actuating cam 933. The feed bar 506 is maintained in each successive stepped position to which it is fed by the operation of the feed lever and plunger 924 by means of a retaining pawl 937 which is loosely supported on a pivot pin 938, and is maintained in engaging position with the proper one of a series of notches 939 on the feed bar 506 by means of a spring-pressed plunger 940.

The pawl 937 is arranged to be moved positively out of engagement with the cooperating notch 939 during each downward feeding movement of the feed bar 506 by means of connections which include a feed retaining pawl cam lever 942 (see Figs. 57, 60 and 63) loosely sleeved on the stop motion controlled rock shaft 882. A follower roll 943 on the cam lever 942 is arranged for engagement with a cam 944 forming part of the quarter speed segmental cam sleeve 708. The lever 942 is operatively connected with the pawl 937 by means of a link 945 having a pin and slot connection with the pawl 937 to provide a limited amount of lost motion between the lever and the pawl.

In the illustrated construction, mechanism is provided which is rendered operative automatically at the completion of the lacing operation upon the shoe upper to release the feed bar 506 from the restraining action of the feed plunger 924 and retaining pawl 937, so that the feed bar will be returned rapidly to its raised starting position under the influence of springs 514, 515, and the feed slide, work support and shoe upper will be returned to their starting position preparatory for the next succeeding indexing movement of the machine turret. The means provided for automatically returning the feed mechanism to its starting position, takes the form of a latch mechanism which is rendered operative in stopping the lacing mechanism to hold the feed plunger 924 in a retracted position. The latch mechanism referred to, comprises a vertically arranged slide 946 supported adjacent the feed bar 506 in a guideway formed in the bracket 740, and having at its upper end an offset latch pin 947 arranged for a downward position of the slide 946 to engage behind a spring-pressed pin 948 supported on an upwardly extending arm 949 formed integrally with the feed plunger actuating cam lever 930 (see Fig. 65). During the last increment of downward movement of the feed bar 506, the slide 946 is connected to move downwardly therewith to engage the latch pin 947 behind the latch pin 948, as shown in Fig. 67. This movement is effected by means of a stop motion control block 950 which is mounted on the feed bar 506, and is brought into engagement with an offset lower end of the slide 946 by the stepped downward movement of the feed bar. The block 950 is slidably adjusted on the feed bar 506, being held in adjusted position with relation thereto by a spring-pressed plunger 951 on the block with any one of a series of recesses 952 in the feed bar. It is the function of the block 950 also to throw the stop motion into operation.

The movement of the latch pin 947 into its operative position with relation to the pin 948 takes place at the beginning of the last lace forming cycle of the lacing mechanism (see Fig. 67), but is not immediately effective, since the feed bar is at this time supported in position by the retaining pawl 937. Fig. 68 shows the parts in the positions taken when the quarter speed sleeve cam shaft has completed threefourths of a revolution with the feed element 920 and plunger 924 raised and about to move downwardly upon the feed stroke which is rendered effective by the action of cam surface 934. At the completion of the last lace forming cycle, the stop motion for the lacing mechanism operates, as more fully hereinafter set forth, to stop the several cam shafts of the machine, and especially the quarter speed segmental cam shaft 708 in a predetermined angular position in which the needle is fully retracted from the work. This is the position of the lacing mechanism in which the feed bar retaining pawl 937 is retracted to permit the feeding of the work. Therefore, as the quarter speed segmental cam sleeve 708 arrives at the stop position illustrated in Fig. 63, the cam lever 942 controlling the position of the pawl 937 is engaged with the high portion of its cam 944, thus releasing the feed bar 506. During the return movement of the feed bar 506 to its starting position, a pin 953 on the slide 946 engages the lower end of a slot 954 formed in the feed bar 506, causing the slide 946 and latch pin 947 to be moved upwardly therewith to the inoperative position, so that the feed plunger 924 is permitted again to move under the control of its operating cam 933. This is the final stop position of the parts shown, for example, in Fig. 63.

The driving and stopping mechanism for the lacing mechanism consists in a clutching and braking device which is in many respects similar to the main turret and eyeleting mechanism clutching and braking devices previously described, and is particularly adapted for automatic operation to start the lacing mechanism in operation, and to stop the lacing mechanism upon the completion of the lacing operation and with the lacing needle in a raised stop position. The driving clutch for the lacing mechanism is tripped into operation by means of connections controlled from the cam 146 and the rock shaft 160 in timed relation to the indexing movements of the turret, and is again actuated to stop the lacing mechanism by means of connections controlled from a stop block which is adjustable along the length of the lacing mechanism feed bar 506 in accordance with the number of eyelet pairs to be laced. Further in accordance with the invention, means are provided under the control of the operator for rendering the driving and stopping mechanism inoperative to start the lacing mechanism when the turret is indexed.

As best shown in Figs. 1, 4, 6, 56, 59 and 60 of the drawings, the lacing machine is driven from the main driving motor 86 by means of a belt 955 which passes around the double pulley 88 on the armature shaft of the motor, and around a pulley 956 loosely mounted to turn on the rear end of the main cam shaft 706. The pulley 956 is sleeved to turn freely on a rearwardly extending reduced portion of a sleeve 957 fixed on the cam shaft 706 (see Fig. 60), and is supported against axial movement between an enlarged portion 958 of the sleeve member 957 and a bearing washer 959 on a nut 960 screw-threaded to the outer end of the cam shaft 706. The cam shaft 706 is driven from the driving pulley 956 by means of a clutching and braking mechanism which comprises a friction clutch face 961 on the pulley 956 and a cooperating clutch face 962 formed on a clutch sleeve 963 slidably supported on the enlarged portion 958 of sleeve 957, and keyed to turn therewith. A friction brake face 964 formed on the clutch sleeve 963 is arranged for engagement with a stationary friction braking surface 965. A series of axially extending recesses formed in the face of the shouldered portion 958 of sleeve 957 and in an abutting portion of the clutch sleeve 963 have supported therein in alternation a series of pins (not shown) and compression springs 966 (see Fig. 60) which serve to key the clutch sleeve 963 to turn with the sleeve 957 and cam shaft 706, and also to urge the clutch sleeve rearwardly to the running position in which the friction clutch surfaces 961, 962 are engaged.

The lacing machine clutch above described, is operated through connections (see Figs. 6, 56, 57, 59 and 60) comprising a clutch shifting fork 967 secured to a pivot pin 968 which also carries a downwardly extending arm 969. Follower rollers 970 on the clutch shifting fork 967 engage respectively with concentric face cams 971, 972 formed on the brake flange 964. The clutch shifting fork and arm 969 are actuated by means of a toggle connection comprising links 973, 974, the link 973 being pivotally connected to the downwardly extending lever arm 969, and the link 974 being connected to a relatively stationary pivot 915. In the straightened position of the toggle connection 973, 974, the follower rolls 970 are forced forwardly and against the cams 971, 972, and cooperate therewith to stop and to hold the clutch sleeve 963 in the braking stop position of the machine illustrated in Figs. 56 and 60. The breaking of the toggle connection permits the clutch shifting fork to swing about its pivot, and the clutch sleeve 963 to be moved rearwardly to the clutching position under the influence of the springs 966. The toggle connection 973, 974 is acted upon by a spring-actuated connection which tends normally to move the toggle to its broken position. The spring-actuated connection comprises an arm 976 and a vertically movable plunger 977 which is supported for vertical movement in lugs 978, 979, and is connected by a link 980 with the lever arm 976. A compression spring 981 coiled about the plunger 977 between the lug 978 and a collar 982 fast on the plunger, tends to move the plunger and with it the toggle links 973, 974 downwardly to the broken position illustrated in Fig. 57.

The position of the lacing clutch toggle connection is controlled to maintain the toggle connection in a straightened stop position when the lacing mechanism is at rest, and to permit the connection to be broken to start the lacing mechanism in operation at the completion of an indexing movement of the work supporting turret by means of a latch connection specifically illustrated in Figs. 4, 5, 6 and 16. A stop lug 983 secured to the upper end of the plunger 977, is arranged to be engaged by a detent 984 supported on a pivot pin 985. A spring 986 is arranged to act upon a downwardly extending tail of the detent 984 to maintain the same in its latching position beneath the stop lug 983. When the detent 984 is moved out of engagement with the stop lug 983, the plunger 977 and toggle links 973, 974 are permitted to move downwardly to their broken position and the lacing mechanism starts.

The detent 984 is actuated by connections from rock shaft 160 to start the lacing mechanism in operation at the completion of the indexing movement of the turret. The connections referred to, comprise an upwardly extending lever arm 987 secured to the rock shaft 988, and a latch member 989 which is pivotally connected to the arm 987 and is arranged for engagement with a corresponding abutment on the detent 984. As best shown in Fig. 63, the latch 989 is forced yieldingly upwardly by means of a spring-pressed plunger 990 which is seated in a recess formed in the lever arm 987, and is arranged for engagement with a pin 991 on the latch member 989. The rock shaft 988 is supported in alignment with and is connected to turn as a unit with the shaft 160, which as previously set forth, is rocked in one direction prior to the indexing movement of the turret to depress the locating device and remove the turret locking pin, and is rocked in the opposite direction after the indexing movement of the turret has been completed. These movements when imparted to the rock shaft 988 forming a rearward extension of the shaft 160 are effective to cause the latch 989 to engage with and to move the detent 984 out of alignment with the abutment 983 to start the lacing mechanism in operation. The rocking movement imparted to the shafts 160, 988 prior to the indexing movement of the turret, causes the latch to be moved inwardly into its latching position with respect to the detent 984. The return movement of these shafts, and latch therewith, upon the completion of the indexing movement of the turret, is then operative to trip the detent 984.

From the foregoing description, it will be evident that the lacing mechanism is thrown into operation automatically at the completion of each successive indexing movement of the turret support to insert a series of lacings in the supported upper thus brought in register with the lacing mechanism. In the event, however, that the indexing movement of the turret causes a work support in which no upper has been mounted to be brought to the lacing station, the operation of the lacing mechanism would serve only to waste lacing cord and to cause snarls with the additional risk of damage to the machine parts. Such a situation will frequently arise in the normal operation of the machine as, for example, when the machine is first started or when the last of the run of uppers to be eyeletted and laced is being cleared from the machine. To enable the operator to render the lacing mechanism inoperative under circumstances in which the next succeeding indexing movement of the turret will cause an unloaded work support to be brought into register with the lacing mechanism, a lock rod 992 is provided extending rearwardly of the lacing mechanism. In a retracted position of the lock rod 992, the rear end thereof extends over the latch 989, so that the latch is prevented from moving upwardly under the influence of the spring-pressed plunger 990 into engagement with the lug on the detent 894, and is thereby rendered inoperative to trip the lacing mechanism into operation (see Fig. 5). The lock rod 992 is provided at its forward end with a knurled head for convenience of manipulation by the operator.

The lacing mechanism stop motion is constructed and arranged to stop the lacing mechanism automatically upon the completion of the series of stitches forming the lace in the last pair of eyelets of the upper, and with the needle withdrawn from the work. The stop motion for the lacing mechanism comprises a lock bolt and lock bolt carrier which is continuously oscillated in timed relation with the quarter speed cam sleeve 708 of the machine, so that the lock bolt carrier makes one complete oscillation for each lace forming cycle of four stitches through the eyelets of a pair. The lock bolt is actuated during the final stepped movement of the feed bar to operatively connect the rock shaft 882 for rocking movement with the lock bolt carrier to straighten the toggle links 973, 974 for shifting the lacing machine clutch to stop position (see Figs. 56, 59 and 60). Continued rotation of the main needle reciprocating cam shaft 706 causes the clutch shifting fork rollers 970 to ride against the high portions of the cams 971, 972, so that the cam shaft is stopped in a predetermined angular position by the heavy frictional engagement of the brake faces 964, 965, as the lacing needle 700 reaches its fully retracted position. The lock bolt carrier, as best shown in Figs. 56, 57 and 59, comprises an arm 994 which is loosely sleeved on the rock shaft 882, and provides support for a lock bolt 995. An arm 996 of the lock bolt carrier carries a roll 977 for engagement with an actuating cam 998 on the quarter speed cam sleeve 708, so that the lock bolt carrier has imparted thereto a rocking movement in one direction substantially at the completion of each lacing cycle of four stitches during the operation of the machine, and a rocking movement in the opposite direction at the beginning of the next lacing cycle. An extension 999 of the carrier arm 994 is arranged to be acted upon by a compression spring 1000 which is coiled about a supporting rod 1001, and bears against the extension 999 to maintain the roll 997 in engagement with its cam 998.

The position of the lock bolt 995 is controlled by means of a lock bolt control lever 1002 supported to turn on a fixed pivot 1003. The lever 1002 is provided at its upper end with a vertically extending slot in which is received a roll 1004 pivotally secured to the outer end of the lock bolt 995. The lever 1002 and lock bolt 995 are normally maintained in a retracted inoperative position by means of a compression spring 1005 coiled about a supporting pin 1006 between a lug on a fixed bracket 1007 and a laterally extending projection of the lever arm 1002. As shown, for example, in Fig. 57, the lever 1002 and lock bolt 995 are moved to the operating position through the engagement of the stop motion control block 950 with a roller 1008 on the lever 1002, this operation taking place as the feed bar 506 makes its last steeped downward movement. The lock bolt 995 is arranged for engagement with a socket formed in a block 1009 carried in an arm 1010 rigidly secured to the rock shaft 882, so that when the lock bolt 995 is shifted to its advanced position, the arm 1010 and rock shaft 882 are connected to turn as a unit with the carrier 994. The socket member 1009 is slidably supported in a cylindrical recess 1011 formed on the lever arm 1010, and is yieldably maintained in a fully advanced position by means of a compression spring 1012 coiled about a reduced stem of the plunger within the recess 1011. A collar 1013 secured to the protruding end of the plunger stem serves to limit movement of the plunger under the influence of its spring 1012. The rocking movement thus imparted to the rock shaft 882 through the operation of the lock bolt 995 above described, is effective to straighten the toggle connection 973, 974 by means of connections which comprise a laterally extending lever arm 1014 secured to the rear end of rock shaft 882, and connected by a downwardly extending link 1015 with the lever arm 976 which is connected as previously pointed out, to turn as a unit with the toggle link 973.

*Operation*

A coordinated statement of operation of the machine follows:

In the starting position of the machine, the locating device comprising slide 308 is in its elevated position; that is, extending upwardly through the slot 170 in the turret table top, and through the cooperating slot in the work support 56 at the loading station. The work clamping arms 172 and pads 196 are raised, with the clamping toggle 180, 184 in its broken position and the clutch of the eyeleting machine is in non-driving condition. The vamp spreader 174 associated with the work support at the loading station is in its raised or open position, and the lace measuring rod 176 associated with the work holder at the loading station is unlocked and freely movable on its supporting posts 236, 238. Assuming that there is no work in the machine, the operator while posted at the loading station ascertains that the lock rod 992 (Figs. 4, 5 and 6) which is capable of preventing operation of the lacing machine is in its retracted throw-out position against trip latch 989 to prevent the starting of the lacing mechanism during the first cycle of operation of the machine when an unloaded work holder starting at the eyeleting station will be presented to the lacing mechanism. The sizing lever 320 is set in accordance with the size of shoe which the operator is about to place in the machine. The operator now proceeds to locate the new upper on the work support at the loading station. This is done thus; the margins of the eyelet flaps are placed against the central fins 301, 302 of the locating device, and the top edges of the upper adjacent the lacing margins are engaged against the pins 304, the position of which has previously been determined in accordance with the size of the shoe upper by an adjustment in the position of the sizing lever 320. In order to secure the upper in place, the operator presses downwardly on the foot treadle 204 so that the hook 190 is engaged against the cooperating stirrup 212 to straighten the clamping toggle links 180, 184 to cause the clamping pads 199 to firmly engage the portions of the upper at both sides of the lacing margin against the cooperating spring-seated members 171 (see Fig. 17) on the work support 56 and to close the switch 211 (Fig. 7). The operator now moves the vamp spreader 174 downwardly to its clamping position where it is held by the action of the spring-seated latch 294. Fig. 10 illustrates work supports at the eyeleting and lacing stations with shoe uppers clamped thereon. This downward movement of the vamp spreader causes lug 295 thereof to depress pin plunger 293 to close the switch 289 (Fig. 7) which acts to energize solenoid 135 to start the machine turret, provided the safety switches 473, 521 and 211 (Fig. 3) placed in series in the solenoid circuit are closed, indicating that the work supports at the eyeleting and lacing stations respectively are in their fully retracted transfer positions, and that the treadle connection for clamping the work on the work holder at the loading station has operated properly, before the machine can be started. As best shown in Fig. 7, the energizing of solenoid 135 causes it to pull downwardly armature shaft 138 and link 134 and this acts to release the latch 126 so that the rock shaft 118 is permitted to rock in a counterclockwise direction to break the toggle connection 110, 112 to engage the main clutch 96, 98 for the turret operating mechanism.

Upon engagement of the main clutch 96, power is transmitted through shaft 84 and worm 82 (Fig. 8) to rotate the vertically arranged drive shaft 78 through one revolution. Rotation of the drive shaft 78 acts through the Geneva motion including driver 76 and roll 74 which engages in a slot 72 in the star wheel 70 (Fig. 11) to index the driven element 72 and turret through one quarter turn to transfer each of the work supports thereon to the next succeeding station, the work support at the loading station thus being transferred to the eyeleting station. During the first part of the rotation of the drive shaft 78 and before any indexing movement is imparted to the turret, rock shaft 160 (see Fig. 16) operated by cam 146 on cam disk 33 secured to the shaft 78, is rocked in one direction to lower the locating device comprising slide 308 to its depressed inoperative position, to remove the locking pin 142, to shift the auxiliary work support 159 associated with the lacing mechanism to its depressed inoperative position to move the lever 987 and latch 989 to the right into operative relation to latch 984 preparatory for starting the lacing mechanism, and through lever 549, link 548 and lever 547, raises the starting rod 546 for the eyeleting mechanism so that the shoulder formed thereon drops over the latch 545. During the latter part of the rotation of the drive shaft 78 and after the indexing movement of the turret is completed, the rock shaft 160 is rocked again in the opposite direction to raise the locating device comprising slide 308 to the operative position, to return the locking pin 142 to its locking position, to shift the auxiliary support 159 associated with the lacing machine to its work supporting position, to move the lever 987 and latch 989 to the left in order to trip the detent 984 which starts the lacing machine in operation, and to lower the starting rod 546 to retract the latch 545 which starts the eyeleting machine in operation. The lacing mechanism, however, is prevented from starting by the position of the lock rod 992 during this first cycle of operation of the machine, the lock rod, as above set forth, having earlier been pushed rearwardly by the operator to overlie latch 989 to prevent engagement with and tripping of the latch lever 984. Also, during the latter portion of the revolution of the drive shaft 78 after indexing movement of the turret is completed, the toggle connection 180, 184 for the work clamp associated with the work support at the station between the lacing and loading stations is broken to release the work. This is effected by means of the cam 220 on disk 133, and follower connections, including lever 228, link 229, lever 232 and slide 218 (Fig. 11) which causes plunger 212 to be moved against the strap 188 associated with the toggle connection.

At the beginning of the indexing movement of the turret, the lace measuring bar associated with the work holder upon which a new work piece has been loaded is moved to an adjusted position determined by the position of wing cams 254 and 258, and is locked in the adjusted position as the follower 248 rides out of engagement with the fixed cam 252 (Figs. 11 and 15). During this indexing movement, the measuring bar 176 associated with the work support approaching the loading station is released through engagement of the follower member 248 with the leading end of the fixed cam 252.

The operation of the mechanism for effecting adjustment of the loading device to cause the shoe upper to be located upon the work support in a position determined in accordance with the size of the upper, and for correspondingly setting the mechanism for transferring this adjustment to the feed mechanism associated with the eyeleting machine, and subsequently to the feed mechanism associated with the lacing machine is as follows: The setting of the feed adjustment lever 320 acts through the connections (see Fig 21) including lever arm 329, link 354, radius arm 360, proportional lever arm 356, rack 366, pinion 368, universally connected shaft 372 and pinion 376 to control the position of slide 300 and pins 304 of the locating device. Lever arm 438 associated with the feed adjustment lever 320 is operative at the same time to adjust the position of the associated cam 398 on the drum 400 (see Fig. 24) forming part of the feed transfer mechanism. During the subsequent indexing movement of the turret, the drum 400 is rotated through one quarter turn, causing the cam 398 first to be locked in the adjusted position, and then to be brought into engagement with a follower element 444 associated with the device for adjusting the effective length of the stepped advancing movements to be imparted to the eyeleting feed mechanism. The connections actuated by follower 444 include lever 446, link 491, lever 490, link 489 (see Fig. 24), which in turn acts through bell-crank levers 484, 485 to control the slope of the cam bar 466 which is connected to be moved downwardly with the feed bar 465 of the eyeleting mechanism. During the eyeleting operation stepped downward movements of fixed extent are imparted to the feed bar 465, and the cam bar 466 connected to move therewith acts through a follower connection to impart stepped feeding movements to the feed slide 460 of a length which is in proportion to the slope of the feed cam bar 466.

During a second complete operating cycle of the machine in which the turret is again indexed through a quarter turn, the work support carrying the eyeleted upper will be transferred to the lacing station, and the feed adjustment in accordance with the shoe size of the upper is transferred therewith as follows: At the same time that the turret is rotated through tne second one quarter indexing movement, the drum 400 is rotated through another one quarter turn, thus bringing the wing cam 398 into engagement with follower 448 which acts through connections (see Figs. 8 and 56) including levers 450, 452, link 541, lever 539, link 538 and bell-crank levers 534 and 535 to control the angular position or slope of cam bar 527. The bar 527 is connected to move downwardly with the feed bar 506 of the lacing machine in steps of fixed amount, and acts through a follower connection to impart corresponding stepped feeding movements to the feed slide 501 of the lacing mechanism of a length determined by the angular adjustment or slope of the cam bar 527.

There are four work supports on the turret and four corresponding associated wing cams correspondingly located on the feed adjustment transfer drum 400. It is contemplated that the operator will adjust the position of the adjusting lever 320 prior to the placing of a shoe upper on each of the four work supports in turn, and this adjustment which determines the location and spacing from one another of the eyelet pairs in each individual shoe upper, will be transferred with the particular work support to each of the eyeleting and lacing machines in turn.

During rotational movement of the turret, the several work supports 56 are in their fully retracted transfer positions toward the center of the turret, and are positively held in this position by the engagement of the locking ring 165 formed on the outer fixed shell of the turret with a corresponding notch in the under side of the work support 56. As shown, for example, in Fig. 12, when the indexing movement of the turret is completed, the work support 56 is brought into a position in which a hook 166 fitted into a recessed portion of the locking arm 165 engages with the slotted under side of the work support 56, thus operatively connecting the work support at the eyeleting station with the eyeleting feed mechanism. Similarly, the work support at the eyeleting station moves into operative relation to the feed hook 167 associated with the lacing feed mechanism.

The operation of the eyeleting mechanism will be described as follows: The return movement of the rock shaft 160 after the indexing movement of the turret has taken place is effective through connections shown in Figs. 16 and 34 including lever 549, link 548, lever 547 and starting rod 546 to disengage latch 545 so that the eyeleting mechanism control lever 544 rocks in a counterclockwise direction, acting through link 656 to raise rod 650 out of engagement with the cam actuated lever 648 so that the rock shaft 606 is permitted to move counterclockwise under the influence of its actuating spring. The rocking of shaft 606 is effective through cam 605 (see Fig. 37), cam follower lever 608, link 609, lever arms 610, 611 and link 614 to swing the bearing members 565 with the punch heads 567 thereon to their operative punch position. Rocking of shaft 606 is effective also through cam 667, bell-crank 666 and lever 663 (see Figs. 37 and 43) to engage the feed clutch 661 for feed pinion 662. Rocking of the shaft 666 is effective also through cam 652, lever 645 and link 646 (see Fig. 34), to break the toggle connection 637 to engage the eyeleting machine clutch 631. The eyeleting clutch, as best shown in Fig. 35, acts through pinions 627, 622 to drive the cam shaft 620 of the eyeleting machine.

The eyeleting machine operates in accordance with a cycle of operations recurring with each revolution of the cam shaft 620 to punch a pair of eyelet holes, to feed eyelets thereto, and to clench the eyelets of the pair, whereupon the work holder is advanced so that the upper thereon is positioned for the operation of the machine to introduce the next succeeding pair of eyelets. In accordance with this cycle of operations the punches 550 are raised through the operation of connections comprising the crank 560, link 562 and toggles 556, 558 (see Fig. 39), and at the same time the punch beds 567 are lowered by means of connections (see Fig. 38) which include cam 676 on cam shaft 620, follower lever 677, link 679, bell-crank 680, link 681 and toggle connections 682, 684 (see Fig. 33).

Thereafter the punch beds 567 are slightly raised to clear the work by the action of cam 676 and spring 678 (see Fig. 38), and thereupon the bearing members 565 are swung forwardly to place the eyelet inserting tools 568 in line with the punches 550 (see Fig. 49). This swing of the bearing members 565 is produced by the rotation of the eccentric 618 (see Figs. 29 and 43) which is in turn controlled through connections including eccentric 618, pinion 624 and cam lever 623 which is actuated by a cam 687 formed in one face of the gear 622 (see Figs. 29 and 43).

The eyelets are now mounted in the work and are clenched, and for this operation the tools 568 are caused to approach the punches by means of connections from the crank 560 on the shaft 620 (see Fig. 29), link 563 and actuating lever 564. At the same time the punches 550 are moved upwardly a second time to a slightly higher level to place the shoulders 555 at their operating level. This movement of the punches is effected by the combined action of the crank 560 and the eccentric 558 which carries the lower pivot of the toggle connection. The operating connections for the eccentric 558 as shown in Fig. 29, include the cam 687, lever 688 with gear segment 689 engaging pinion 559. Now when the first two eyelets have been clenched (see Figs. 51 and 52), the continued rotation of crank 560 is effective to raise the tools 568 and to depress the punches 550.

Upon the completion of the eyeleting operation above described, the Geneva feed mechanism for the eyeleting machine is rendered operative by the engagement of the feed arm 658 on cam shaft 620 with the star wheel 659 to rotate the star wheel through one index, and thereby to depress the feed bar 465 one step to feed the work.

During the last feeding step of the feed bar 465, and as the last pair of eyelets is being inserted in the upper, the knock-off pin 669 carried by the feed bar engages with and depresses the arm 671 (see Figs. 29 and 34), thus rocking the control lever 544 is a clockwise direction to the position shown in Fig. 34, and depressing the link 656 and rod 650 so that an operative connection is established between the link 650 and the oscillating clutch lever 648 driven by cam shaft 620. Substantially at the completion of the revolution of the shaft 620 during which the last pair of eyelets are inserted, the lever 648 is rocked in a direction to rock the rock shaft 606 in a clockwise direction. This rocking movement of shaft 606 acts through the connections shown in Fig. 37, including cam 667 and lever 666 to disengage the feed clutch 661 (see Fig. 43). The rocking movement of shaft 606 is effective through the connections including cam 605, lever 608, link 609, levers 610, 611 and link 614, to move the bearing members 565 to their retracted inoperative positions (see Figs. 37 and 29). Also, the rocking movement of shaft 606 is effective through the cam 652 (see Fig. 34), lever 645 and link 646 to straighten the clutch toggle 637 (see Fig. 35) to shift the eyeleting machine clutch to the disengaged braking position.

The complete automatic cycle of operation of the lacing mechanism to lace a shoe upper presented thereto on the turret, will be summarized briefly as follows: The indexing movement of the turret causes a work holder to be brought into register with the feed hook 167 of the lacing mechanism feed machine (Figs. 12 and 56). In this position the upper is located so that the lacing needle is accurately registered with the first eyelet pair at the bottom of the eyelet slit. The return movement of rock shaft 160 at the completion of the indexing operation now causes the auxiliary support 159 (Figs. 4, 5, 6 and 16) to be raised into operating position, and the detent 984 supporting the toggle members 973 and 974 to be tripped to release the arm 969 and clutch shifting fork 967 to permit the shifting of the lacing mechanism clutch sleeve 963 to the clutching position under the influence of the spring 966, and thus to start the lacing mechanism in operation.

The return movement of the stop motion lock bolt carrier actuated rock shaft 882 in starting the lacing mechanism causes the clamp plate 902 of the lacing cord clamping mechanism to be withdrawn and the clamping member 907 to be moved into gripping engagement with the lacing cord (Figs. 88 and 89).

The machine now operates in accordance with a recurring cycle of operation previously described, to insert four enchained loops of lacing cord through the eyelets of the pair, and the work holder is then advanced by a stepped downward feeding movement of the feed bar 506.

During each recurring cycle of operation, the main cam shaft 706 (Fig. 60) is driven through four revolutions, the half speed cam shaft 707 is driven through two revolutions, and the quarter speed member 708 is driven through one revolution. The needle receives four reciprocations through connections from the shaft 706 (see Figs 59 to 62) including crank 722, link 723, lever 724, link 726, and needle reciprocating lever 727. During the same period the needle is given two full vibratory movements to cause the needle to pass alternately through the eyelets of a pair, and the double looper mechanism is given a lateral vibratory movement bodily with the needle, through connections from the half speed cam shaft 707 including crank 760, link 761, bell-crank 762, link 764, levers 765, 766, link 767, lever 768, lever 770 and the depending arm 718. During this period also the double looper is rocked twice in each direction to cause each of the points in turn to receive the needle loop and to enchain the loops, said rocking movements being imparted through connections comprising an eccentric 805 on the half speed drive shaft 707, eccentric strap 806, lever arm 807, lever 808, lever arm 810, link 811, arm 812 and looper carrier bar 702 (see Figs. 59, 60, 63, 64 and 65). The tension disk 847 is released to relieve the thread tension during each up stroke of the needle through connections comprising cam 846 on the main cam shaft 706, cam lever 857, bell-crank 856 and collar 855 on control rod 848.

During the formation of the first stitch upon starting the lacing mechanism, the thread tension is relieved also during the latter portion of the first downward stroke of the needle to prevent breakage of the cord or pulling out of the end from its clamp. The connections for further relieving the cord tension comprise the link 873 connected with the needle cross-head 720, lever arm 872, rock shaft 871, segmental cam member 870, cam follower lever 868, actuating lever 864, bell-crank 860 and collar 862 on the tension control rod 848 (Figs. 61, 62, 71 and 73 to 76).

As the needle is withdrawn from the work upon the completion of the fourth and last stitch of the lace forming cycle, a stepped feeding movement downwardly is imparted to the feed bar 506 by means of connections driven from the crank 760 for imparting the lateral vibratory movements to the needle and double looper mechanism. These connections include an arm 771 on pivot shaft 769 continuously oscillated by crank 760, the vertically movable slide element 920, connecting pin 921, block 922 and feed bar engaging plunger 924. The plunger 924 is normally held in a retracted position and is rendered operative during alternate reciprocations only to advance the feed bar at the completion of the stitch forming cycle through connections controlled from the quarter speed cam sleeve 708 comprising cam 933 on the cam sleeve 708, cam lever 930 and actuating lever 926 which engages in a slot formed in the plunger 924 (Figs. 57, 59, 60 and 63).

Assuming that it is desired to omit the lacing from the first pair of eyelets, the plate 741 is set to cause the latch member 731 forming part of the lacing needle driving connections to be moved to the inoperative position so that during the first cyclical movement of the lacing mechanism for the formation of a group of enchained lacing loops, the lacing needle 700 is held in its raised inoperative position (Figs. 77, 78, 79, 80). The first stepped downward movement of the lacing mechanism feed bar 506 causes the latch member 731 to be moved to its operative position (Fig. 61) so that the needle is again connected to reciprocate in its normal manner for the insertion of the lacing loops in the second pair of eyelets.

During the first reciprocatory movement of the needle in the formation of a lacing through an eyelet pair, the vertically yieldable stationary element 903 (Figs. 82 to 85 inclusive) of the clamping device is subjected to a heavy downward pressure to increase the holding tension on the end of the lacing cord by means of connections including an operating cam 918. Also, during the first downward movement of the needle, the auxiliary tension release device (Figs. 71, 74, 75 and 76) is rendered operative through connections including rocker cam 870 actuated by the needle movement to provide an additional release of the thread tension during the initial downdraw stroke of the needle in forming the first loop. It will be noted that this mechanism is rendered operative only by the actual downward movement of the needle, and therefore does not come into operation during the dummy operation of the machine when the needle is disconnected in order to omit the lacing from the first eyelet pair.

The number of stepped advancing movements of the feed bar 506 and the number of lacings placed in successive pairs of eyelets is determined by the setting of the block 950 (Fig. 56) adjustably supported on the feed bar 506.

The movement of the block 950 into engagement with the roll 1008 of the lock bolt actuating lever 1002 of the stop motion during the last stepped advancing movement of the feed bar 506 renders the continuously oscillating lock bolt carrier 994 operative to rock the shaft 882 which in turn acts through connections above described including arm 1014 and link 1015 (Figs. 56, 59) to straighten toggle connections 973, 974 to disengage the lacing mechanism clutch so that the lacing mechanism is stopped with the needle withdrawn from the work to sever the lacing cord and to advance the plate 902 to clamp the severed end, and to permit the feed bar 506 to be returned to its raised starting position and the work holder and upper supported thereon simultaneously to be returned in a single rapid movement to the initial starting position of Fig. 56 in which the work holder can be indexed with the turret away from the lacing station.

The nature and scope of the invention having been indicated, and an embodiment of the invention having been specifically described, what is claimed is:

1. The method of eyeleting a shoe upper and of lacing the eyeleted shoe upper, which comprises the steps of supporting portions of the shoe upper adjacent the lacing slit in a fixed position on a work holder, performing an eyeleting operation on the supported shoe upper, and thereafter performing a lacing operation upon the eyeleted shoe upper while so supported.

2. The method of performing a number of related operations upon a shoe upper preparatory for the assembly of the upper with other shoe parts on a last, which comprises locating the upper in a predetermined position on a work holder, and thereafter coupling said work holder in a predetermined relation successively with eyeleting and lacing mechanisms for the performance of the respective eyeleting and lacing operations upon the supported upper.

3. The method of eyeleting and of lacing the eyeleted shoe upper, which comprises the steps of locating the upper on a work holder, coupling the work holder in predetermined relation with an eyeleting mechanism, eyeleting the upper, coupling the support in predetermined relation with a lacing mechanism, and inserting lacings through the eyelets in the supported upper.

4. The method of eyeleting and of lacing the eyeleted shoe upper, which comprises the steps of locating the upper on a work holder in a position predetermined with reference to the size of the shoe upper, coupling the work holder in a predetermined relation with an eyeleting mechanism, and imparting to the work holder stepped feeding movements each of a length predetermined in accordance with the size of shoe upper, and thereafter coupling the work holder in a predetermined relation with a lacing mechanism, and imparting stepped feeding movements each identical in length with the stepped feeding movements previously imparted to the work holder while coupled with the eyeleting mechanism.

5. The method of eyeleting and of lacing the eyeleted shoe upper, which comprises the steps of locating the upper in a predetermined position on a work holder with the edges of the eyelet flaps in an opened-out edge-to-edge relation, and coupling the work holder successively with eyeleting and lacing mechanisms for the performance of the respective eyeleting and lacing operations to cause the eyelets to be located in predetermined positions in the upper, and the lacing mechanism to register with the eyelets of the eyeleted upper.

6. The method of eyeleting and lacing a shoe upper, which comprises the steps of locating the upper on a work holder with the edges of the eyelet flaps located in an opened-out edge-to-edge relation, and in a position longitudinally of the work holder predetermined with reference to the size of the shoe upper, coupling the work holder successively with eyeleting and lacing mechanisms for eyeleting and for lacing the eyeleted upper, and controlling the operation of each of the eyeleting and lacing mechanisms in turn in accordance with the determined size of the upper for the performance of the respective eyeleting and lacing operations.

7. The method of eyeleting and lacing an eyeleted shoe upper which comprises the steps of locating the upper in a predetermined position on a work holder with the edges of the eyelet flaps in an opened-out edge-to-edge relation, coupling the work holder successively with eyeleting and lacing mechanisms for the performance of successive eyeleting and lacing operations on the supported upper, and for each of said eyeleting and lacing operations imparting to the holder a series of stepped feeding movements of the same extent.

8. Apparatus for eyeleting a shoe upper and for lacing the eyeleted shoe upper, which comprises a work holder on which the upper is supported, eyeleting mechanism adapted for forming lace receiving eyelet holes through the upper, lacing mechanism, means for feeding the work holder between said mechanisms, and means associated with each of said eyeleting and lacing mechanisms for controlling the work holder in predetermined relation during the respective eyeleting and lacing operations on the supported upper.

9. Apparatus for eyeleting a shoe upper and for lacing the eyeleted shoe upper, which comprises a work holder on which the upper is supported, a locating device for locating the shoe upper on the holder, eyeleting mechanism adapted for forming lace receiving eyelet holes through the upper, lacing mechanism, means for feeding the work holder from one to the other of each of said locating device, eyeleting mechanism and lacing mechanism, and means associated with each of said eyeleting and lacing mechanisms for controlling the work holder in predetermined relation during the respective eyeleting and lacing operations on the supported upper.

10. Apparatus for eyeleting a shoe upper and for lacing the eyeleted shoe upper, which comprises a work holder on which the upper is supported in a predetermined position, a locating device for locating the shoe upper on the holder, an eyeleting mechanism adapted to form lace receiving eyelet holes through the upper, a lacing mechanism, means for feeding the work holder from one to the other of each of said eyeleting mechanism and lacing mechanism, means associated with each of said eyeleting and lacing mechanism for coupling the holder in predetermined relation thereto, and means actuated in timed relation with said eyeletting and lacing mechanisms respectively for imparting stepped feeding movements of the same extent to the work holder.

11. Apparatus for eyeleting a shoe upper and for lacing the eyeleted shoe upper, which comprises a work holder on which the upper is supported in opened-out position and with the edges of the eyelet slit substantially in edge-to-edge relation, an eyeleting mechanism adapted to form lace receiving eyelet holes through the supported upper, a lacing mechanism adapted for lacing the supported upper, means for feeding the work holder between said mechanisms, and means for controlling the relation of the work holder to each of said eyeleting and lacing mechanisms respectively for the performance of the respective eyelet hole forming and lacing operations upon the supported upper.

12. Apparatus for eyeleting a shoe upper and for lacing the eyeleted shoe upper, which comprises a work holder on which the upper is supported with the edges of the eyelet slit in opened-out substantially edge-to-edge relation, a locating device arranged for locating the upper on the holder, an eyeleting mechanism arranged for forming lace receiving eyelet holes through the supported upper, a lacing mechanism for lacing the supported upper through said eyelet holes, means for feeding the holder from one to the other of each of said locating device, eyeleting mechanism and lacing mechanism, and means for controlling the work holder in predetermined relation successively to each of the locating device, the eyeleting mechanism and the lacing mechanism for the performance of the respective locating, eyeleting and lacing operation.

13. Apparatus for eyeleting a shoe upper and for lacing the eyeleted shoe upper, which comprises a work holder on which the upper is supported with the edges of the eyelet slit in opened-out substantially edge-to-edge relation, means for locating the upper on the holder in accordance with a predetermined spacing relation of the eyeleting and lacing operations to the upper, an eyeleting mechanism for forming lace receiving eyelet holes through the upper, a lacing mechanism, means for feeding the work holder from one to the other of each of said locating device, eyeleting mechanism and lacing mechanism, means for coupling the holder in predetermined relation to each of the eyeleting and lacing mechanisms, feeding means associated with each of the eyeleting and lacing mechanisms for imparting to the work holder stepped feeding movements which are of the same extent, and means for adjusting the length of said stepped feeding movements in accordance with said predetermined spacing relation of the eyeleting and lacing operations to the upper.

14. Apparatus for eyeleting a shoe upper and for lacing the eyeleted shoe upper, which comprises a work holder having cooperating supporting and clamping surfaces spaced to support the eyelet flaps of a shoe upper between them in opened-out substantially edge-to-edge relation, an eyeleting mechanism for forming lace receiving eyelet holes in the upper, a lacing mechanism, means for feeding the work holder between said mechanisms, means for coupling the work holder in predetermined relation with each of the eyeleting and lacing mechanisms, and feeding means associated with each of the eyeleting and lacing mechanisms for imparting stepped feeding movements of equal length to the work holder.

15. Apparatus for eyeleting and for lacing the eyeleted shoe upper, which comprises a work holder having cooperating supporting and clamping surfaces spaced to support the eyelet flaps of a shoe upper between them in opened-out substantially edge-to-edge relation, means for determining the position of the upper on the work holder in accordance with the shoe size of upper, an eyeleting mechanism for forming lace receiving eyelet holes through the upper, a lacing mechanism, means for feeding the work holder between said mechanisms, and feed mechanisms associated with each of said eyeleting and lacing mechanisms comprising feed members driven in timed relation to the respective eyeleting and lacing mechanisms and arranged to have imparted thereto stepped movements of fixed extent, a work holder coupling means associated with each feed member and a variable motion transmitting connection to control the length of the stepped feeding movements imparted to the coupling means by the feed member, and means for adjusting each of said variable connections in accordance with the shoe size of upper.

16. Apparatus for eyeleting and for lacing the eyeleted upper, which comprises a work holder on which the upper is supported, an eyeleting mechanism adapted to form pairs of eyelet holes in a series of operations along the eyelet slit, a lacing mechanism adapted for inserting lacings through the eyelet pairs in a series of operations along the eyelet slit, means for feeding the work holder between said mechanisms, feed devices associated with each of the eyeleting and lacing mechanisms for imparting to the work holder stepped feeding movements which are of the same extent, and means for coupling the holder in predetermined relation to each of said feed devices for the performance of the respective eyeleting and lacing operations on the supported upper.

17. Apparatus for performing a series of manufacturing operations on a shoe upper, which comprises a work holder on which the upper is supported in a predetermined position, a plurality of operating mechanisms for the performance of successive manufacturing operations upon the supported upper, each provided with means for coupling the holder in a predetermined relation to the respective operating mechanism and with feeding means for imparting stepped feeding movements of adjustable extent to the coupled work holder, means for feeding the work holder between said mechanisms, and means for effecting an identical adjustment of each feeding means to impart to the work holder stepped feeding movements of the same extent.

18. Apparatus for performing a series of manufacturing operations on a shoe upper, which comprises a work holder, a locating device associated with the holder for positioning a shoe upper in a predetermined relation on the holder, a plurality of operating mechanisms adapted for the performance of successive manufacturing operations upon the supported upper, each operating mechanism having means for coupling the holder in a predetermined relation to each of said operating mechanisms, feeding means associated with each of said mechanisms for imparting stepped feeding movements of adjustable extent to the coupled work holder, means for feeding the work holder from one to the other of each of said locating device and said operating mechanisms in turn, means for adjusting the locating device in accordance with a predetermined spacing relation of said manufacturing operations to the shoe upper to be operated upon, and means to effect a corresponding adjustment of each feeding means for imparting to the work holder stepped feeding movements of the same extent.

19. Apparatus for eyeleting a shoe upper and for lacing the eyeleted shoe upper, which comprises a work holder, a locating device adjustable in accordance with a predetermined spacing relation of said lacing and eyeleting operations to the shoe upper for locating the upper on the holder, an eyeleting mechanism adapted to form pairs of eyelet holes in a series of operations along the eyelet slit, a lacing mechanism adapted for inserting lacings through the eyelet pairs in a series of operations along the eyelet slit, means for feeding the holder from one to the other of each of said locating device, eyeleting mechanism and lacing mechanism, means for coupling the work holder in predetermined relation with each of the eyeleting and lacing mechanisms, feed mechanisms associated with each of said eyeleting and lacing mechanisms for imparting stepped feeding movements of equal length to the work holder and upper, means under the control of the operator for adjusting the relation of the locating device to the holder in accordance with a predetermined spacing relation of the eyeleting and lacing operations to the shoe upper, and means for effecting identical adjustments of each of said feed mechanisms in accordance with said predetermined spacing relation.

20. Apparatus for eyeleting a shoe upper and for lacing the eyeleted shoe upper, which comprises a work holder on which the upper is supported in a predetermined position, an eyeleting mechanism for forming lace receiving eyelet holes through the upper, a lacing mechanism, means for feeding the work holder between said mechanisms, feed mechanisms associated with each of said eyeleting and lacing mechanisms comprising feed members driven in timed relation with the respective eyeleting and lacing mechanisms and arranged to have imparted thereto stepped movements of fixed extent, work holder coupling means associated with each feed member, and adjustable driving connections to control the length of the stepped feeding movements imparted to each coupling means by the associated feed member.

21. Apparatus for eyeleting a shoe upper and for lacing the eyeleted shoe upper, which comprises a work holder on which the upper is supported in a predetermined position, an eyeleting mechanism for forming lace receiving eyelet holes through the upper, a lacing mechanism, means for feeding the work holder between said mechanisms, and feed mechanisms associated with said eyeleting and lacing mechanisms comprising feed members driven in timed relation to the respective eyeleting and lacing mechanisms and arranged to have imparted thereto stepped movements of fixed extent, work holder coupling means associated with each feed member, variable driving connections to control the length of the stepped feeding movements imparted to each coupling means by the associated feed member, and means for controlling said variable driving connections to effect identical adjustments of said feed mechanisms.

22. In a machine for operating upon shoe uppers, a work holder, mechanism for forming lace receiving eyelet holes in the upper, and mechanism for lacing the eyeleted upper at different stations, means for moving the work holder to the eyeleting station and thereafter to the lacing station, an adjustable element, means at each of said eyeleting and lacing stations controlled by said adjustable element for controlling the relation between the work holder and the eyeleting and lacing mechanisms at their respective stations, and means to adjust said adjustable element whereby said element is effective thereafter to correspondingly alter the relation between the work holder and each of said eyeleting and lacing mechanisms at their respective stations.

23. In a machine for operating upon shoe uppers, a work support, mechanism for forming lace receiving eyelet holes in the upper and mechanism for lacing the eyeleted upper at different stations, means for moving the work support to each of the eyeleting and lacing stations, means for effecting relative positioning movement of the work support and eyeleting and lacing mechanisms respectively at the respective stations, an adjustable cam, means for adjusting the cam, and means controlled by said cam in accordance with the adjustment made for controlling the relative positioning movement of the work support and the eyeleting and lacing mechanisms at the respective stations.

24. The combination with a work holder, of means for moving the holder to different stations, operating mechanisms at certain of said stations each arranged for the performance of a series of operations spaced from one another on a work piece, a feed device associated with each of said mechanisms for imparting a stepped feeding movement of variable length to the work holder, adjusting means for each of said feed devices, and an adjusting element for controlling said adjusting means operable to effect a like adjustment of each feed device in turn upon movement of the work holder to the associated station.

25. The combination with a work holder, of means for moving the holder to different stations, operating mechanisms at certain of said stations each arranged for the performance of a series of operations spaced from one another on a work piece, a feed device associated with each of said mechanisms for imparting a stepped feeding movement of variable length to the work holder, an adjustable cam movable in synchronism with the holder, means actuated by said cam to effect a like adjustment of each feed device in turn, and means operative at one station for effecting an adjustment of said adjustable cam, which adjustment thereafter controls the adjustment of each of said feed devices in turn.

26. The combination with a work holder, of means for moving the work holder to different stations, locating means at one of said stations adjustable to control the location of a work piece with relation to the work holder, an operating mechanism at another of said stations arranged for the performance of a series of operations spaced from one another on the work piece and including a feed device for imparting a stepped feeding movement of variable length to the work holder, an adjustable element, and means controlled by said adjustable element for controlling the feed device in accordance with the adjustment made.

27. The combination with a work holder, of means for moving the work holder to different stations, locating means at one of said stations adjustable to control the location of a work piece with relation to the work holder, an operating mechanism at another of said stations arranged for the performance of a series of operations spaced from one another on the work piece and including a feed device for imparting a stepped feeding movement of variable length to the work holder, an adjustable element, means controlled by said adjustable element for controlling the feed device in accordance with the adjustment made, and a control device operable to effect an adjustment of the locating means and to effect a related adjustment of said adjustable element.

28. The combination with a work holder, of means for moving the work holder to different stations, locating means at one of the stations adjustable to control the location of a work piece with relation to the work holder, and operating mechanism at another of said stations arranged for the performance of a series of operations spaced from one another on the work piece and including a feed device for imparting a stepped feeding movement of variable length to the work holder, an adjustable element, controlling means arranged to be acted upon by said adjustable element to determine the length of the stepped feeding movement of said feed device, and means for effecting an adjustment of the locating means and for effecting a related adjustment of said adjustable element, said adjustable element thereafter acting upon said controlling means to determine the length of said stepped feeding movements at the operating station.

29. In a machine for operating upon shoe uppers, a turret, a plurality of work holders mounted upon the turret and movable thereby to different stations, devices operative at one of said stations for locating and securing a shoe upper upon the work holder, an eyeleting mechanism for inserting lace receiving eyelet holes through the upper, and a lacing mechanism at others of said stations, adjustable means for controlling the operating relation of the work holders to each of the eyeleting and lacing mechanisms at their respective stations, a sizing device for adjusting said locating means to alter the position in which the work is secured on the work holder in accordance with the shoe size of the upper being operated upon, an adjustable element, means actuated thereby for controlling successively the adjustment of the work holder, controlling means associated with each of said eyeleting and lacing mechanisms, and means acting when rendered operative to adjust the sizing device and to effect a corresponding adjustment of said adjusting element.

30. In a machine for operating upon shoe uppers, the combination with a work holder, of means for moving the work holder to different stations, devices operative at one of said stations to control the location of a work piece upon and to secure the work piece to the work holder, upper eyeleting mechanism adapted for forming lace receiving eyelet holes through the upper at another of said stations, mechanism for inserting laces through said eyelet holes at another of said stations, adjustable means for controlling the operating relation of the work holder to each of the eyeleting and lacing mechanisms at their respective stations, a sizing device for adjusting said locating means to alter the position in which the work is secured to the work holder in accordance with the shoe size of upper being operated upon, an adjusting element, means actuated by said element for adjusting successively the controlling means associated with each of said eyeleting and lacing mechanisms, and means acting when rendered operative to adjust the sizing device and to effect a related adjustment of said adjusting element.

31. In a machine for operating upon shoes having a plurality of operating stations, a work holder, means for moving the work holder to different stations, devices operative at one of said stations to control the location of a work piece upon the work holder, means to adjust said locating device and thereby to alter the position in which the work is located on the work holder, operating means at another of said stations for operating upon the supported work piece, adjustable means for controlling the operating relation between the work holder and the operating mechanism, an adjusting element, means actuated by said adjusting element for adjusting said controlling means to alter the operating relation between the work holder and operating mechanism, and means under the control of the operator operative to effect an adjustment of said adjustable means and to effect a related adjustment of said adjusting element.

32. In a machine for operating upon shoes, a work holder, means for moving the work holder to different stations, devices operative at one of said stations to control the location of a work piece with relation to the work holder and to secure the work piece on the work holder, means to adjust said locating device and thereby to alter the position in which the work is secured on the work holder, operating means at another of said stations for operating upon the supported work piece, adjustable means for controlling the operating relation between the work holder and the operating mechanism, an adjusting element, means for transferring the adjusting element to successive positions to cooperate with the work holder at each successive station, means under the control of the operator operative at said first-mentioned station and for one position of the adjusting element to effect an adjustment of said adjustable means and to effect a related adjustment of said adjusting element, and means controlled by said adjusting element upon movement to another position for adjusting said controlling means to alter the operating relation between the work holder and the operating mechanism at the later-mentioned station.

33. In a machine for operating upon shoe uppers, the combination with a turret, of a work holder movable by the turret to different stations, a device operative at one of said stations to control the location of a work piece on the work holder, means to adjust the locating device and thereby to alter the position in which the work piece is located on the work holder, mechanism at another of said stations for operating upon an upper located on the work holder, adjustable means for effecting an adjustment of the operating relation between the work holder and the operating mechanism related to the location of said work piece on the work holder at said later-mentioned station, an adjusting element, means controlled by said adjusting element for controlling the operating relation between the work holder and operating mechanism in accordance with the adjustment made, and means under the control of the operator operative to effect an adjustment of said adjustable means and to effect a related adjustment of said adjusting element.

34. In a machine for operating upon shoe uppers, the combination with a turret, of a work holder movable by the turret to different stations, a device operative at one of said stations to control the location of a work piece on the work holder, means to adjust said locating device and thereby to alter the position in which the work piece is secured on the work holder, operating means at another of said stations for operating upon the supported work piece, adjustable means for controlling the operating relation between the work holder and the operating mechanism, an adjusting element, means timed with relation to the movement of the turret for transferring the adjusting means to successive positions corresponding with the location of the work holder at successive stations, manually operable control means operative at said first-mentioned station to effect an adjustment of said adjustable means and to effect a related adjustment of said adjusting element, and means controlled by movement of the adjusting element to another position to alter the operating relation between the work holder and the operating mechanism at the later-mentioned station in accordance with the adjustment made.

35. In a machine for operating upon shoe uppers, a rotatable turret, a plurality of work holders movable upon the turret and movable by the turret to different stations, a device operative at one of said stations for controlling the location of the work upon the work holder, operating mechanism at another of said stations including means for moving the work holder for the performance of a series of spaced operations upon the upper at said station, adjustable means for controlling the operating relation between the work holder and the operating mechanism to vary the spacing between the operations of said series, an adjusting element associated with each work holder, means synchronized with the movement of the work holders to successive stations for transferring the associated adjusting elements successively to different positions, means under the control of the operator operative at said first-mentioned station to effect an adjustment of said locating device for the location of a work piece on a work holder and to effect a related adjustment of the associated adjusting element in one of said positions, said adjusting element acting thereafter in a different position to adjust said controlling means to control the spacing of the operations of said series.

36. In a machine for operating upon shoe uppers, a work support, means for moving the work support to different stations, a device at one of said stations operative to control the location of a work piece on the work holder, mechanism for performing a series of operations in spaced relation upon the upper located on the work support at another of said stations including means for effecting relative stepped positioning movements of the work support, and mechanism at said later-mentioned station for controlling the length of the steps between the operations of the series, an adjusting element, means actuated by said adjusting element for adjusting said control means to alter the operating relation between the work holder and operating mechanism, and means under the control of the operator to adjust said locating device and thereby to alter the position in which the work is located on the work holder, and to effect a related adjustment of said adjusting element.

37. In a machine for operating upon shoe uppers, a rotatable turret, a plurality of work holders movable upon the turret and movable by the turret to different stations, an adjustable device operative at one of said stations for controlling the location of the work upon the work holder, operating mechanism at another of said stations arranged for the performance of a series of operations spaced from one another on a work piece, a feed device associated with said mechanism for imparting a stepped feeding movement of variable length to the work holder on the turret, an adjustable connection for controlling the length of said stepped feeding movements, a plurality of adjustable cams associated with respective work holders, a support on which the cams are moved synchronously with the turret to successive positions, a manually operable control to adjust said locating device and to effect a corresponding adjustment of the associated cam, the movement of said cam to another position thereafter adjusting said connection to control the length of said stepped feeding movements.

38. In a machine for operating upon shoe uppers, a rotatable turret, a plurality of work holders movable upon the turret and movable by the turret to different stations, an adjustable device operative at one of said stations for controlling the location of the work upon the holder, operating mechanisms at others of said stations, each arranged for the performance of a series of operations spaced from one another on a work piece, a feed device associated with each of said operating mechanisms, each arranged for imparting a stepped feeding movement of variable length to a work holder presented thereto from the turret, a plurality of adjustable cams associated with the respective holders, a support on which the cams move to different positions corresponding with the respective stations, a manually operable control for adjusting the locating device, and a connection actuated by said manual control for controlling the adjustment of the cam in the corresponding position, and connections arranged to be acted upon by said cam in positions of said cam corresponding with each operating station for thereafter controlling the length of the stepped feeding movements at each successive operating station.

39. In a machine for operating upon shoe uppers having locating and operating stations, the combination of a work holder having supporting and clamping elements spaced for clamping portions of the upper at each side of an open operating area, a turret on which the work holder is transferred to different stations comprising a rotatable table on which the work holder is supported for movements radially of the table, and an aperture in the table to register with the open operating area of the holder, a locating device movable into the aperture and operating area for positioning a shoe upper in a predetermined relation on the holder, means for rotating the table to move the work holder from the locating station to an operating station, and means acting before the table has started to rotate for withdrawing the locating device from said open operating area and aperture.

40. In a machine for operating upon shoe uppers, the combination of a turret comprising a table arranged to turn on a vertical axis, shoe upper holders supported at equally spaced intervals about the table for displacement radially and having supporting and clamping elements arranged for clamping portions of an upper at each side of an operating area, said table having apertures formed therein to register with said operating areas, a locating device at the locating station movable into said aperture and operating area of the work support for locating the upper on the holder, means for rotating the turret to transfer the support from the locating station to an operating station, and means acting prior to said rotating movement to move the locating device away from the work holder and turret.

41. In a machine for operating upon shoe uppers, the combination with a turret, of a work holder movable by the turret to different stations, operating mechanism at one station including means for controlling the relative position of the operating means and work holder at said station, a locating device at another station for positioning the upper in a predetermined relation on the work holder including an adjustable guide against which the upper is located, and means for adjusting the position of said locating device with relation to the work holder in accordance with a predetermined spacing relation of the operating mechanism to the upper to be located on the work holder comprising a manual control element shiftable from one to another of a plurality of predetermined positions of adjustment, and an operating connection from said manual element for adjusting said guide.

42. The combination with a rotatable turret, of a plurality of work holders movable on the turret and movable by the turret to different stations, means for indexing and for holding the turret stationary in each indexed position with the holders at said different stations, means situated at one of said stations for locating and for causing the work to be secured upon a work holder, mechanism for performing a series of operations progressively along the work at another of said stations, including means for imparting feeding movements to the holder and work secured thereon relatively to the turret, and means for operatively connecting and disconnecting the holder from the feeding means at said other station.

43. In a machine for operating upon shoe uppers, a turret, power actuated means for indexing the turret, a plurality of individually movable work holders supported on the turret arranged to be transferred by the indexing movement of the turret to different stations, eyeleting and lacing mechanisms at different stations, each including means for feeding the holder outwardly from the turret and returning it to a predetermined position on the turret, coupling means associated with each feed mechanism for coupling a work holder thereto, and guiding means operable during the indexing movement of the turret to move the holder into and out of operative relation to the coupling means.

44. The combination with a rotatable turret, of a plurality of work holders movable outwardly on the turret and movable by the turret to different stations, means for use in locating a work piece upon the work holder at one of said stations, mechanism for performing a series of operations progressively along the work piece at another of said stations, said mechanism including means for feeding the work holder and work piece thereon outwardly of the turret in timed relation to the operation of said mechanism, and coupling elements associated respectively with the feeding means and work holders arranged to be moved into and out of coupling relation by movement of a holder on the turret to and from the operating station.

45. In a machine having means for operating on a work-piece and power-driven mechanism for producing operation thereof, a feed carriage movable with respect to said means and in cooperative relation thereto, a plurality of individually movable work-holders, said feed carriage and each of said work-holders having cooperative coupling elements, transfer means on which said work-holders are arranged and by which they may be carried successively into and out of coupled relation to the feed carriage, power-driven mechanism arranged to operate said transfer means, and power-driven mechanism arranged to operate the feed carriage.

46. In a machine having means for operating on a work-piece and power-driven mechanism for producing operation thereof, a feed carriage movable with respect to said means and in cooperative relation thereto, a plurality of individually movable work-holders, said feed carriage and each of said work-holders having cooperative coupling elements, transfer means on which said work-holders are arranged and by which they may be carried successively into and out of coupled relation to the feed carriage, a fixed track arranged to guide the work-holders into coupled relation with the feed carriage, and power-driven means arranged to operate the transfer means and the feed carriage alternately.

47. In a machine of the character described, a stationary machine unit having means for operating on a work-piece, a plurality of individually movable work-holders, a turret on which said work-holders are arranged in a circular series and by which they are presented successively to said stationary machine unit, said unit including means for feeding said holders one step at a time and returning them to a starting position on the turret, said feeding means and said holders having cooperative coupling portions formed and arranged to be coupled and uncoupled by travel of the holders around the axis of said turret, power-driven means for imparting steps of rotation to said turret, and power-driven means controlled by said turret for operating said stationary machine unit.

48. In a machine of the character described, a stationary machine unit having means for operating on a work-piece, a plurality of individually movable work-holders, a turret on which said work-holders are arranged in a circular series and by which they are presented successively to said stationary machine unit, said unit including means for feeding said holders one step at a time and returning them to a starting position on the turret, said feeding means and said holders having cooperative coupling portions formed and arranged to be coupled and uncoupled by travel of the holders around the axis of said turret, power-driven means controlled in part by said feeding means for imparting steps of rotation to said turret, and power-driven means controlled by said turret for operating said stationary machine unit.

49. In a machine for lacing shoe uppers, the combination of a work holder on which the upper is supported, a rotatable turret on which the holder is presented successively to different stations, a lacing mechanism at one of said stations, a lace measuring bar on the work holder, means operative at one point in the rotation of the turret to adjust the bar with relation to the lacing margins of the shoe upper, means for locking the lace measuring bar in the adjusted position, and means operative at another point in the rotation of the turret to release the lace measuring bar from said adjustment.

50. In a machine for lacing shoe uppers, the combination of a work holder on which the upper is supported, a rotatable turret on which the holder is presented successively to different stations, a lacing mechanism at one of said stations, a lace measuring bar on the work holder, means operative at one point in the rotation of the turret to adjust the bar with relation to the lacing margins of the shoe upper, means rendered operative by the rotational movement of the turret and work holder from the point of adjustment of the lace measuring bar for locking the lace measuring bar in the adjusted position, and means operative at another point in the rotation of the turret to release the lace measuring bar from said adjustment.

51. In a machine of the character described, a turret, means for rotating the turret to successive stations with a period of dwell at each of them, a work holder mounted on the turret and arranged for supporting the upper with the lacing margins in an opened-out substantially edge-to-edge relation, a lace measuring bar, a pair of vertically adjustable pivotal supports for the lace measuring bar spaced from one another longitudinally of the lacing margin, means operative at one point in the revolution of the turret to adjust the position of said pivotal supports, and thereafter to lock the pivotal supports and lace measuring bar in the adjusted position, and means for imparting relative positioning movements to the work holder and lacing mechanism to position successive pairs of eyelets with respect to the lacing mechanism.

52. In a machine for lacing shoe uppers, a turret, means for rotating the turret to successive stations with a period of dwell at each of them, a lacing mechanism at one of said stations, a work holder mounted on the turret, a lace measuring bar, a pair of pivotal supports for the lace measuring bar spaced from one another longitudinally of the bar and individually vertically adjustable on the holder, wing cams on a fixed portion of the machine, and followers arranged for engagement with said cams to adjustably determine the position of said pivotal supports, manually operable means for adjusting the position of said cams, means rendered operative by movement of the turret and work holder therewith to lock said pivotal supports in their adjusted positions, and means operative at another point in the rotation of the turret to release said pivotal supports from the locking means.

53. In a machine for operating upon eyeleted shoe uppers, a turret, means for rotating said turret to successive stations, an upper lacing mechanism at one of said stations, a plurality of individually movable work holders mounted on the turret, each holder having a lace measuring bar supported thereon for movement with relation to the supported upper to control the length of the laces inserted in the eyeleted upper, means including adjustably supported cams for locating each measuring bar with relation to its associated holder at one point in the rotation of the turret on its axis, means rendered operative by a subsequent movement of the turret to lock the measuring bar in its adjusted position, and means rendered operative at another point in the rotation of the turret to release said measuring bar.

54. In a machine for operating upon shoe uppers having transfer means for moving a work holder to different stations, and means at one of said stations for operating upon a shoe upper, the combination of a work holder which comprises supporting elements spaced from one another to receive thereon an upper with the lacing margins supported between said elements in an opened-out edge-to-edge relation, and outwardly of said elements an additional transversely extending vamp supporting member, cooperating clamping elements similarly spaced from one another for engagement with portions of the upper overlying the supporting elements, and a vamp spreader having a transverse engaging surface for engaging and forcing loose portions of the clamped upper against the vamp supporting surface.

55. In a machine for operating upon shoe uppers having transfer means for moving a work holder to different stations, and at one of said stations means for operating upon a shoe upper, the combination of a work holder which comprises supporting elements spaced from one another to receive thereon an upper with the lacing margins supported between said supporting elements in an opened-out edge-to-edge relation, and a transversely extending arcuate vamp support, cooperating clamping elements similarly spaced from one another for engagement with portions of the upper overlying said supporting elements, and a vamp spreader having a transverse clamping surface cooperating with the vamp support to clamp portions of the upper therebetween, and an additional arm on said vamp spreader to prevent portions of the upper adjacent the heel from falling inwardly into the field of operation of said operating means.

56. A work holder for presenting a shoe upper to a shoe operating mechanism for the performance of an operation along the lacing margins thereof which comprises supporting elements spaced from one another to receive thereon an upper with the lacing margins supported between said elements in an opened-out edge-to-edge relation, cooperating clamping elements similarly spaced from one another for engagement with portions of the upper overlying said supporting elements, and a vamp spreader having an upper engaging surface located outwardly of said clamping elements to engage and force downwardly loose portions of the clamped upper.

57. In a machine for operating upon shoe uppers having work transfer means, the combination of a work holder arranged to be moved to the different stations by the transfer means, said holder comprising supporting elements spaced from one another to receive thereon an upper with the lacing margins supported between said elements in an opened-out edge-to-edge relation, cooperating clamping elements similarly spaced from one another for engagement with portions of the upper overlying said supporting elements, and a vamp spreader for engaging and forcing downwardly loose portions of the clamped upper extending outwardly of said clamping elements.

58. In a machine for operating upon shoe uppers having shoe upper locating and operating mechanisms at different stations, a work holder movable to each of said stations and comprising a support arranged to receive thereon an upper with the lacing margins in opened-out edge-to-edge relation, clamping means arranged for engaging portions of the upper adjacent said lacing margins to clamp the shoe upper on the work support, and a vamp spreader shiftable to engage with and position loose portions of the clamped upper extending outwardly of said clamping means.

59. In a machine for operating upon shoe uppers having shoe upper locating and operating mechanisms at different stations, the combination with a turret, of a work holder movable on the turret and movable by the turret to the different stations, said work holder comprising a support arranged to receive thereon an upper with the lacing margins in opened-out edge-to-edge relation, clamping means on the work holder for clamping engagement with portions of the upper adjacent the lacing margins, and a vamp spreader movable on the work support to engage with and position loose portions of the upper.

60. In a machine for operating upon shoe uppers having shoe upper locating and operating mechanisms at different stations, the combination of a turret, a work holder movable by the turret to the different stations, said work holder comprising a support on which the upper is positioned with the lacing margins in opened-out substantially edge-to-edge relation, clamping means on the work holder for clamping portions of the upper adjacent the lacing margins, a vamp spreader movable to engage with and position loose portions of the upper extending outwardly of said clamping means, and means controlled by the indexing movement of the turret to rerease the clamp and vamp spreader on the work holder at the loading station.

61. In a machine for operating upon shoe uppers having shoe upper locating and operating mechanisms at different stations, the combination of a turret, a work holder movable by the turret to the different stations, said work holder comprising a support on which the upper is located with the lacing margins in an opened-out substantially edge-to-edge relation, clamping means on the work holder arranged for clamping engagement with portions of the upper adjacent the lacing margins, means under the control of the operator for engaging the clamping means, a vamp spreader on the work holder movable by the operator to a guard position to engage with and position loose portions of the upper extending outwardly of the clamping means, driving and stopping mechanism for the machine including the turret, and control means actuated by movement of the vamp spreader to operative position to start the machine.

62. In a machine for operating upon shoe uppers, a turret, driving mechanism for indexing the turret, a work holder movable on the turret and movable by the turret to different stations, said work holder comprising a support on which the upper is located with the eyelet margins in opened-out substantially edge-to-edge relation, clamping means on the holder for clamping portions of the upper adjacent the eyelet margins to the holder, a vamp spreader on the holder movable to a guard position to engage with and position loose portions of the upper, means for latching the vamp spreader in guard position, means acting in timed relation with the indexing movement of the turret to release said clamping means and vamp spreader and to stop the turret, means under the control of the operator for engaging the clamp, and means rendered operative by movement of the vamp spreader to operative position to start the machine including the turret.

63. In a machine of the character described, a plurality of stationary machine units for operating individually on a work-piece at successive stations arranged in a series about an axis, a turret arranged to rotate about said axis, a plurality of individually movable work-holders mounted on said turret to cooperate successively with said stationary machine units, each of said workholders including means for clamping a workpiece, means for rotating said turret to successive stations with a period of dwell at each of them, each of said stationary units including means for feeding a work-holder from and returning it to an initial position with respect to the turret, means for operating said clamping means successively at one point in their path around said axis to clamp work-pieces, and means for operating said clamping means at another point in said path to unclamp the work-pieces.

64. In a machine for operating upon shoe uppers, the combination of a turret, a work holder movable by said turret to different stations, said work holder comprising supporting elements on which the shoe upper is located with the eyelet margins in an opened-out substantially edge-to-edge relation, a clamping mechanism mounted on the work support comprising clamping elements arranged to clamp portions of the upper adjacent the lacing margins to the support, a toggle device arranged when in straightened position to apply the clamp, and treadle actuated means including a member extending through said turret along the axis of rotation thereof arranged in the loading position of the work support to establish an operating connection from the treadle to the toggle device.

65. In a machine for operating upon shoe uppers, a turret, a work holder movable by the turret to different stations including loading and operating stations, said work support comprising supporting elements on which the shoe upper is located with the eyelet flaps in an opened-out substantially edge-to-edge relation, a clamping mechanism mounted on the work support comprising clamping elements arranged to clamp the eyelet flaps to the support, a toggle device arranged when in straightened position to apply the clamp, a treadle connection including a connection extending through said turret along the axis of rotation thereof arranged in the loading position of the work support to act upon the toggle device, and means rendered operative by movement of the work support and turret to loading position to release the clamp comprising a fixed cam and a connection actuated thereby to break the toggle device.

66. In a machine having means for operating repeatedly on a work-piece and power-driven mechanism for producing a series of operating cycles of said means, a work-holder, means for guiding the work-holder with respect to the operating means, a cam follower connected with the work holder, and a cam movable in one direction to feed the work-holder and in the opposite direction to return the work-holder to a starting position, and power-driven mechanism arranged to impart periodic steps of feeding movement to said cam and thereafter one uninterrupted movement in the opposite direction to the starting position in each operating cycle of the cam.

67. In a machine having means for operating repeatedly on a work-piece and power-driven mechanism for producing a series of operating cycles of said means, a work-holder, means for guiding the work-holder with respect to the operating means, a cam follower connected with the work holder, and a cam movable in one direction to feed the work-holder and in the opposite direction to return the work-holder to a starting position, power-driven mechanism arranged to impart periodic steps of feeding movement to said cam and thereafter one uninterrupted movement in the opposite direction to the starting position in each operating cycle of the cam, and means for adjusting the cam to regulate its steepness and the length of the steps of feeding movement imparted by it to the work-holder.

68. In a machine having means for operating repeatedly on a work-piece and power-driven mechanism for producing a series of operating cycles of said means, a work-holder, means for guiding the work-holder with respect to the operating means, a cam follower connected with the work holder, and a cam movable in one direction to feed the work holder and in the opposite direction to return the work-holder to a starting position, and power-driven mechanism arranged to impart periodic steps of feeding movement to said cam and thereafter one uninterrupted movement in the opposite direction to the starting position in each operating cycle of the cam, and adjustable means arranged to vary the number of feeding steps imparted to the cam in each operating cycle thereof.

69. In a machine having means for operating repeatedly on a work-piece and power-driven mechanism for producing a series of operating cycles of said means, a work-holder, means for guiding the work-holder with respect to the operating means, a cam follower operatively connected to the work-holder, a straight cam arranged to cooperate with said follower, and power-driven mechanism by which said cam is operated with periodic steps of movement of translation in one direction to feed the work and thereafter with one uninterrupted movement in the opposite direction to return the work-holder to a starting position.

70. In a machine having means for operating repeatedly on a work-piece and power-driven mechanism for producing a series of operating cycles of said means, a work-holder, means for guiding the work-holder with respect to the operating means, a cam-bar having two straight parallel camming surfaces opposed to each other, a cam follower engaging said surfaces and operatively connected to said work-holder, power-driven mechanism by which said cam-bar is operated with periodic steps of movement of translation in one direction to feed the work and thereafter with one uninterrupted movement in the opposite direction to a starting position, and means for adjusting the cam-bar to various angles of obliquity with respect to its path of operating movement.

71. In a machine for operating upon shoe uppers, a turret, means for indexing the turret, a plurality of individually movable work holders supported on the turret arranged to be transferred by said indexing movements to different stations, an eyeleting mechanism operable in accordance with an automatic cycle for the insertion of pairs of eyelets in an upper on the work holder and including means for feeding the holder from and returning it to an initial position with respect to the turret, a lacing mechanism operable in accordance with an automatic cycle for the insertion of laces in the eyelet pairs and including means for feeding the holder from and returning it to the initial position with respect to the turret, means under the control of the operator for initiating the indexing movement of the turret, and a clutch actuating element acting automatically upon completion of said indexing movement to start each of said eyeleting and lacing mechanisms.

72. In a machine for operating upon shoe uppers, a turret, means for indexing the turret, a plurality of individually movable work holders supported on the turret arranged to be transferred by the indexing movements of the turret to different stations, an eyeleting mechanism operable in accordance with an automatic cycle for the insertion of pairs of eyelets in an upper supported on the work holder and including means for feeding the holder from and returning it to an initial position with respect to the turret, a lacing mechanism operable in accordance with an automatic cycle for the insertion of laces in the eyelet pairs and including means for feeding the holder from and returning it to the initial position with respect to the turret, means under the control of the operator for initiating the indexing movement of the turret, means acting automatically upon completion of said indexing movement to start each of said eyeleting and lacing mechanisms, and means under the control of the operator for rendering the eyeleting and lacing mechanisms individually inoperative.

73. In a machine for operating upon shoe uppers, a turret, power operated means for indexing the turret, a plurality of individually movable work holders supported on the turret arranged to be transferred on the turret to different stations, an eyeleting mechanism at one of said stations arranged to insert pairs of eyelets in an upper on the work holder, a lacing mechanism at another of said stations operable to insert laces in the eyelet pairs in the supported upper, power means for actuating each of the eyeleting and lacing mechanisms, and control means acting automatically upon the completion of each indexing movement of the turret to initiate the power operation of said eyeleting and lacing mechanisms.

74. In a machine for operating upon shoe uppers, a turret, power operated means for indexing the turret, a plurality of individually movable work holders supported on the turret arranged to be transferred by said indexing movements to different stations, an eyeleting mechanism at one of said stations arranged to insert pairs of eyelets in an upper on the work holder, a lacing mechanism at another of said stations operable to insert laces in the eyelet pairs in the supported upper, power means for actuating each of the eyeleting and lacing mechanisms, a cam arranged to be driven in timed relation with the rotational indexing movements of the turret, and cam follower connections controlled by said cam to initiate power operation of the eyeleting and lacing mechanisms upon completion of each successive indexing movement of the turret.

75. In a machine for operating upon shoe uppers, a turret, power operated means for indexing the turret, a plurality of individually movable work holders supported on the turret arranged to be transferred by said indexing movements to different stations, means at one of said stations for locating a shoe upper on a work holder, means for adjusting said locating means in accordance with the size of shoe upper, an eyeleting mechanism at another station arranged to insert pairs of eyelets in an upper on the work holder, a lacing mechanism at another station operable to insert lacings in the eyelet pairs in the supported upper, adjustable means for controlling the positional relation between the work holder and the eyeleting and lacing mechanisms at the respective stations, means acting in synchronism with the indexing movement of the turret in accordance with the adjustment imparted to the locating means to thereafter effect a light adjustment of the positional relation of the work holder and each of the eyeleting and lacing mechanisms successively to locate the eyelets and lacings in the supported upper in accordance with the shoe size of the upper operated upon, and power operated means for indexing the turret and for actuating the eyeleting and lacing mechanisms including control means acting automatically upon the completion of each indexing movement of the turret to initiate power operation of said eyeleting and lacing mechanisms.

76. In a machine for operating upon shoe uppers, a turret, a plurality of work holders supported on the turret and for movement relatively thereto, means for indexing the turret to transfer the work holders to different stations, each work holder comprising means for clamping shoe uppers with the lacing margins in an opened-out substantially edge-to-edge relation, and means operable to hold down loose portions of the vamp, an eyeleting mechanism and a lacing mechanism at different stations, each operable in accordance with an automatic cycle and including means for imparting feeding and return movements to the work holder with relation to the turret, means acting automatically upon completion of the indexing movement of the turret to start said eyeleting and lacing mechanisms, and an electrical control circuit for the machine including means responsive to the closing of said circuit to start the indexing movement of the turret, safety switches in said circuit arranged to be closed to permit starting of the turret only for a fully returned position of said feeding means and work holders controlled thereby, a switch in said circuit arranged to be closed only upon operation of the clamping means to clamp the upper on the work support, and a starting switch in said circuit arranged to be closed only upon operation of said means to hold down loose portions of the vamp.

77. In a machine for operating upon shoe uppers, a turret, a plurality of work holders supported on the turret and for movement relatively thereto, means for indexing the turret to transfer the work holders to different stations, each work holder comprising means for clamping a shoe upper with the lacing margins in an opened-out substantially edge-to-edge relation, and means operable to hold down loose portions of the vamp, an operating mechanism at another of said stations for performing an operation along the lacing margin of the upper including means for imparting feeding and return movements to the holder with relation to the turret, power driving means for said operating mechanism, means acting automatically upon completion of the indexing movement of the turret to start said operating mechanism, and an electrical control circuit for the machine including means responsive to the closing of said circuit to start the indexing movement of the turret, a safety switch in said circuit arranged to be closed only for a fully returned position of said feeding means and work holder controlled thereby, a second switch in said circuit arranged to be closed only upon operation of the clamping means to clamp the upper on the work support, and a third switch in said circuit arranged to be closed only upon operation of said means to hold down loose portions of the vamp.

78. In a machine for operating upon shoe uppers, a turret, a plurality of work holders movable with the turret and movable with relation to the turret, means for indexing the turret to transfer the work holders to different stations, each work holder comprising means for clamping a shoe upper with the lacing margins in an opened-out substantially edge-to-edge relation, and means operable to hold down loose portions of the vamp, an operating mechanism at another of said stations for performing an operation along the lacing margin of the shoe upper, power driving means for said operating mechanism, means acting automatically upon completion of the indexing movement of the turret to start said operating mechanism, and an electrical control circuit for the machine including means responsive to the closing of said circuit to start the indexing movement of the turret, a switch in said circuit arranged to be closed only upon operation of the clamping means to clamp the upper on the work support, and a starting switch in said circuit arranged to be closed only upon operation of said means to hold down loose portions of the vamp.

79. In a machine for operating upon shoe uppers, a turret, a plurality of work holders supported on the turret, means for rotating the turret and work holders thereon to transfer the work holders to successive stations with a period of dwell at each of them, each work holder comprising means for clamping a shoe upper thereon, means including a member extending to said turret in concentric relation therewith movable axially to operate said clamping means successively at one point in their path around said axis, supporting means for said member arranged to permit rotational movement thereof from operating position as a result of an inadvertent interfering position of said member and clamping means during indexing movement of the turret, and an electrical control circuit for the machine including means responsive to the closing of said circuit to start indexing movement of the turret, a safety switch in said circuit arranged to be closed only upon the axial clamp actuating movement of said member in the normal angular operating position.

80. In a machine of the character described, a turret, a plurality of individually movable workholders mounted thereon in a circular series, starting and stopping means for rotating said turret step by step with periods of dwell at a series of stations to locate said carriers successively in register with said stations, a series of stationary machine units arranged to operate on workpieces held in said holders, a plurality of power-driven mechanisms arranged to feed said holders individually in cooperative relation to said machine units and return them to initial positions with respect to said turret, and means including a plurality of controlling units responsive to said feeding mechanisms respectively to prevent starting movement of said starting and stopping means when any one of said feeding mechanisms is in other than its initial position.

81. In a machine for operating upon shoe uppers, a turret, power actuated means for indexing the turret, a plurality of individually movable work holders supported on the turret arranged to be transferred by the indexing movement of the turret to different stations, an eyeleting mechanism operable in accordance with an automatic cycle for the insertion of pairs of eyelets in an upper on the work holder, and including means for feeding the holder from and returning it to an initial position with respect to the turret, a lacing mechanism operable in accordance with an automatic cycle for the insertion of laces in the eyelet pairs and including means for feeding the holder from and returning it to an initial position with respect to the turret, power driving means for each of said eyeleting and lacing mechanisms, means acting automatically upon completion of the indexing movement to start each of the eyeleting and lacing mechanisms, means under the control of the operator for initiating the indexing movement of the turret, and safety devices controlled by each of said feeding means constructed and arranged to disable the starting means when any one of said feeding means and holders controlled thereby is out of its initial starting position.

82. In a machine for operating upon shoe uppers, a turret, a work holder supported for movement with the turret and for movement relatively thereto, means for rotating the turret to transfer the work holder to different stations, an operating mechanism at one of said stations including means for imparting feeding and return movements to the work holder relatively to the turret, coupling means for operatively connecting the feeding means with the holder at said operating station, means for controlling the position of the work holder on the turret during the rotational movement of the turret to move the holder into and out of operative relation with the coupling means, and means to prevent starting of the turret when the holder is in other than its initial position relatively to the turret.

83. In a machine for lacing shoe uppers, a work holder comprising cooperating supporting and clamping surfaces spaced from one another to support the eyeleted lacing margins of the upper between them in an opened-out substantially edge-to-edge relation, a lacing mechanism arranged for operation within the area provided between said supporting surfaces for lacing the eyeleted lacing margins, a feed mechanism for imparting feeding movements to the work holder relative to the lacing mechanism, and a relatively stationary supplemental work supporting element arranged to support the eyeleted lacing margins between the work holder supporting surfaces for the operation of said lacing mechanism.

84. In a machine for operating upon shoe uppers, a rotatable turret, a work holder movable on the turret and movable by the turret to and from different stations, said work holder comprising cooperating supporting and clamping surfaces spaced from one another to support the eyeleted lacing margins of the upper between them in an opened-out substantially parallel relation, a lacing mechanism comprising a lacing needle arranged for oscillatory and vibratory movements, and cooperating loop forming devices, a feed mechanism for imparting feeding movements to the work holder relative to the lacing mechanism, and a supplemental work supporting element arranged for supporting engagement with the under side of the eyeleted edges between the work holder supporting surfaces adjacent the point of operation of the needle.

85. In a machine for operating upon shoe uppers, a rotatable turret, a work holder movable on the turret and movable by the turret to and from different stations, said work holder comprising cooperating supporting and clamping surfaces spaced from one another to support the eyeleted lacing margins of the upper between them in an opened-out substantially parallel relation, a lacing mechanism comprising a lacing needle arranged for oscillatory and vibratory movements, and cooperating loop forming devices, a feed mechanism for imparting feeding movements to the work holder relative to the lacing mechanism, a supplemental work supporting element arranged for supporting engagement with the under side of the eyeleted lacing margins between the work holder supporting surfaces adjacent the point of operation of the needle, and means operative during the rotation of the turret to move said supplemental support away from said engaging position.

86. In a machine of the class described, a rotatable turret, work holders movable on the turret and movable by the turret to different stations, each of said holders having supporting and clamping surfaces spaced to support the edges of the lacing margins between them in an opened-out substantially edge-to-edge relation, power means for imparting successive indexing movements to the turret to move the work holders to different stations, eyeleting and lacing mechanisms at said different stations, each having a feed mechanism arranged to be coupled and uncoupled respectively with the holders presented at the respective stations and to impart feeding and return movements to the holders, driving and stopping mechanisms for each of said eyeleting and lacing mechanisms, an auxiliary support associated with the lacing mechanism movable into operative position with relation to the lacing mechanism to further support the lacing margins of the upper held by the work holder, a locating device at another station movable between the supporting surfaces of the holder for use in locating a shoe upper on the holder, a locking bolt shiftable to lock the turret in each successive indexed position, a driving and stopping mechanism for the turret, a rock shaft connected with said driving and stop mechanism to be rocked in one direction upon starting and in the other direction upon stopping of the indexing movement of the turret, and connections controlled by the first movement of said rock shaft to move the locating device, lock bolt and auxiliary support to inoperative position, and by the latter rocking movement of said shaft to return the locating device, lock bolt and auxiliary support to the operative position and to start the eyeleting and lacing mechanisms in operation.

87. In a machine for operating upon shoe uppers, the combination of a turret, a work holder transferable by the turret to different stations and arranged to be moved radially outwardly thereof from a normal transfer position, said holder comprising supporting and clamping elements spaced for clamping portions of the upper at each side of the lacing margins held in opened-out substantially edge-to-edge relation, operating means at one of said stations arranged for performing a series of operations along the lacing margins of the upper and including means for feeding the holder and supported upper radially outwardly on the turret, and a locating device at another station comprising a vertically movable slide, a locating element carried thereby and movable longitudinally of the work holder, a fin mounted on said first-mentioned slide for engagement between the lacing margins in edge-to-edge relation, and upper positioning elements on the locating element for engagement with the edges of the upper adjacent the open ends of the lacing margins, a sizing device connected to position said locating element and upper positioning elements in accordance with the size of upper to be operated upon, and means for raising and lowering said slide to move the locating device to and from operating position between the supporting and clamping elements of the work holder.

88. In a machine for operating upon shoe uppers, the combination of a turret, a work holder transferable by the turret to different stations and arranged to be moved radially outwardly thereof from a normal transfer position, said holder comprising supporting and clamping elements spaced for clamping portions of the upper at each side of the lacing margins held in opened-out substantially edge-to-edge relation, operating means at one of said stations arranged for performing a series of operations along the lacing margins of the upper and including means for feeding the holder and supported upper radially outwardly on the turret, and a locating device at another station comprising a fin for engagement between the edges of the lacing margins, and gauging elements for engagement with the edges of the upper adjacent the open ends of the lacing margins, and means for positioning said gauging elements longitudinally of the holder in said transfer position in accordance with the shoe size of upper to be operated upon.

89. In a machine for operating upon shoe uppers, the combination of a turret, a work holder transferable by the turret to different stations and arranged to be moved radially outwardly thereof from a normal transfer position, said holder comprising supporting and clamping elements spaced for clamping portions of the upper at each side of the lacing margins held in opened-out substantially edge-to-edge relation and with the vamp extending outwardly on the holder from the axis of the turret, a locating device for use in locating an upper on the work holder, and means for rotating the turret to transfer the work holder from one to the other station.

90. In a machine for operating upon shoe uppers, the combination of a turret, a work holder transferable by the turret to different stations and arranged to be moved radially outwardly thereof from a normal transfer position, said holder comprising supporting and clamping elements spaced for clamping portions of the upper at each side of the lacing margins held in opened-out edge-to-edge relation and with the vamp extending outwardly on the holder from the axis of the turret, a vamp supporting surface on the holder outwardly of the turret and extending laterally on an arc substantially concentric with the turret, and a vamp spreader movable to hold loose portions of the vamp against said supporting surface, a locating device for use in locating an upper on the work holder, a stationary guard surface outwardly of the turret extending about the turret from the locating device to the operating mechanism for guiding outwardly extending loose portions of the upper, and means for rotating the turret to transfer the work holder from the locating station to the operating station.

91. In a machine for operating upon shoe uppers, the combination of a turret, a work holder transferable by the turret to different stations and arranged to be moved radially outwardly of the turret from a normal transfer position, said holder comprising supporting and clamping elements spaced for clamping portions of the upper at each side of the lacing margins held in an opened-out substantially edge-to-edge relation and with the vamp portion extending outwardly on the holder from the axis of the turret, operating means at one of said stations arranged for performing a series of operations along the lacing margins of the upper and including means for feeding the holder and supported upper radially outwardly on the turret, a locating device at another station comprising gauging elements for engagement with the edges of the upper adjacent the open ends of the lacing margins, and means under the control of the operator for positioning said gauging elements longitudinally of the holder in said transfer position in accordance with the length of lacing margin of the upper to be operated upon including a control member having a range of movement corresponding with a range of such lengths of margin from small to large, and connections therefrom for effecting a proportionate movement of said gauging elements towards the axis of the turret.

92. In a machine for operating upon shoe uppers, the combination of a turret, a work holder transferable by the turret to different stations and arranged to be moved radially outwardly of the turret from a normal transfer position, said holder comprising supporting and clamping elements spaced for clamping portions of the upper at each side of the lacing margins held in an opened-out edge-to-edge relation and with the vamp portion extending outwardly on the holder from the axis of the turret, operating means at one of said stations arranged for performing a series of operations along the lacing margins of the upper and including means for feeding the holder and supported upper radially outwardly on the turret, a locating device at another station comprising gauging elements for engagement with the edges of the upper adjacent the open ends of the lacing margins, and means under the control of the operator for positioning said gauging elements longitudinally of the holder in said transfer position in accordance with the length of lacing margin of the upper to be operated upon including a control member having a range of movement corresponding with a range of such lengths of margin from small to large, and connections therefrom for effecting a proportionate movement of said gauging elements towards the axis of the turret, said connections including a further means for variably adjusting the extent of the movement imparted to said gauging elements by the size control member.

93. In a machine of the character described, having a turret, a work holder movable by the turret to different stations and a locating device at one of said stations comprising gauging elements movable radially of the turret with relation to the work holder, and means under the control of the operator for positioning said gauging elements including a lever movable over an arc corresponding with a range of sizes from small to large, and connections therefrom for effecting a proportionate movement of the gauging elements including a further means for variably adjusting the extent of the linear movement imparted to the gauging elements by the lever.

94. In a machine for operating upon shoe uppers, the combination with a work holder having means for securing a shoe upper thereon with the lacing margins in an opened-out substantially edge-to-edge relation, of operating mechanism for performing a series of operations along the length of the lacing margins at the location of successive eyelet pairs and including means for controlling the widthwise extent of each operation of the series, feeding means for imparting a stepped advancing movement to the work holder timed with relation to the operating mechanism, and means for adjusting said control means in accordance with the desired widthwise spacing of each successive pair of eyelets of the series.

95. In a machine for operating upon shoe uppers, the combination with a work holder having means for securing a shoe upper thereon with the lacing margins in an opened-out substantially edge-to-edge relation, of operating mechanism for performing a series of operations along the length of the lacing margins at the location of successive eyelet pairs and including means for controlling the widthwise extent of each operation of the series, feeding means for imparting a stepped advancing movement to the work holder timed with relation to the operating mechanism and including means for adjusting the length of each successive stepped movement in accordance with the desired lengthwise spacing of the eyelet pairs, and means controlled from said feeding means for adjusting said control means in accordance with the desired widthwise spacing of each successive pair of eyelets of the series.

96. In a machine for operating upon shoe uppers, the combination with a work holder having means for securing a shoe upper thereon with the lacing margins in an opened-out substantially edge-to-edge relation, of operating mechanism for performing a series of operations along the length of the lacing margins at the location of successive eyelet pairs and including means for controlling the widthwise extent of each operation of the series, means for guiding the work holder in a linear path with respect to the operating mechanism, a feed device comprising a feed member for imparting feeding movements to the work holder, means for imparting a stepped advancing movement to the feed member and holder timed with relation to the operating mechanism, and adjusting means actuated by said feeding device for adjusting said control means in accordance with the desired widthwise spacing of each successive pair of eyelets of the series.

97. In a machine for operating upon shoe uppers, the combination with a work holder having means for securing a shoe upper thereon with the lacing margins in an opened-out substantially edge-to-edge relation, of operating mechanism for performing a series of operations along the length of the lacing margins at the location of successive eyelet pairs and including means for controlling the widthwise extent of each operation of the series, means for guiding the work holder in a linear path with relation to the operating mechanism, a feeding device comprising a feed member movable with the work holder, a feed bar axially shiftable in a direction intersecting the path of movement of the feed member, means for imparting a series of stepped advancing movements each of fixed extent to the feed bar in timed relation with the operating mechanism, means for transmitting motion of the feed bar to the feed member, and cam means rendered operative by movement of the bar for adjusting said control means in accordance with the desired widthwise spacing of each successive pair of eyelets of the series.

98. In a machine having means for operating repeatedly on a shoe upper, power driven mechanism for producing a series of operating cycles of said means, and a work holder, the combination of a feed mechanism for imparting a relative stepped movement to the holder and operating means comprising a feed member movable in a linear path for effecting said relative movement, a feed element movable in a path intersecting the path of movement of said feed member, cam means for transmitting the motion of the feed element to the feed member, and means for imparting successive stepped advancing movements each of predetermined extent to the feed element.

99. In a machine having means for operating repeatedly on a shoe upper, power driven mechanism for producing a series of operating cycles of said means, and a work holder, the combination of a feed mechanism for imparting a relative stepped movement to the holder and operating means comprising a feed member movable in a linear path for effecting said relative movement, a feed element movable in a path intersecting the path of movement of said feed member, cam means for transmitting the motion of the feed element to the feed member, and means for imparting successive stepped advancing movements each of predetermined extent to the feed element, and means for controlling the inclination of said cam to vary the extent of said stepped feeding movements.

100. In a machine having means for operating repeatedly on a shoe upper, power driven mechanism for producing a series of operating cycles of said means, and a work holder, the combination of a feed mechanism for imparting a relative stepped movement to the holder and operating means comprising a feed element movable in a linear path for effecting said relative movement, a feed member movable in a path intersecting the path of movement of said feed element, means acting in timed relation with said operating mechanism for imparting successive stepped movements to the feed element each of predetermined extent, cam means for transmitting movement of the feed element to the feed member, and means operable at the completion of said series of operations to return the feed element and feed member to their initial starting position.

101. In a machine having means for operating repeatedly on a shoe upper, power driven mechanism for producing a series of operating cycles of said means, and a work holder, the combination of a feed mechanism for imparting relative stepped movements to the holder and operating means comprising a feed slide movable in a linear path for effecting said relative movement, a feed bar movable in a path substantially perpendicular to the path of movement of the feed slide, means acting in timed relation to said operating mechanism for effecting successive stepped movements each of predetermined extent to the feed bar, and cam means connecting said feed bar with the feed element to impart a stepped feeding movement to the feed slide.

102. In a machine having means for operating repeatedly on a shoe upper, power driven mechanism for producing a series of operating cycles of said means, and a work holder, the combination of a feed mechanism for imparting a relative stepped movement to the holder and operating means comprising a feed slide movable in a linear path for effecting said relative movement, a feed bar movable in a path substantially perpendicular to the path of movement of the feed slide, means acting in timed relation with the operating mechanism for effecting successive stepped movements of the feed bar, each of predetermined extent, cam means for transmitting movement of the feed bar to the feed slide, and spring means operable at the completion of the series of operations to return the feed bar and feed slide to an initial starting position.

103. In a machine having means for operating repeatedly on a shoe upper, power driven mechanism for producing a series of operating cycles of said means, and a work holder, the combination of a feed mechanism for imparting a relative stepped movement to the holder and operating means comprising a feed slide movable in a linear path for effecting said relative movement, a feed bar movable in a path substantially perpendicular to the path of movement of the feed slide, cam means for transmitting motion of the feed bar to the feed slide, spring means connected to urge the feed bar continuously to an initial starting position, means including an operating pawl acting in timed relation with the operating mechanism for effecting a stepped advance of the feed bar against the pressure of said spring, and means operative at the completion of the series of operations to dissociate said pawl from said feed bar to permit the return of the feed bar to its initial starting position under the influence of said spring means.

104. In a machine of the character described having an operating mechanism for performing a series of operations spaced from one another upon a shoe upper, the combination with a work holder on which the shoe upper is supported, of a feed mechanism which comprises a feed slide movable in a linear path for imparting feed and return movements to the holder, a feed bar movable in a path substantially perpendicular to the path of movement of the feed slide, a sloping cam bar and follower connection between the feed bar and feed slide, means timed with said operating mechanism for imparting successive stepped movements each of predetermined extent to the feed bar, and means for adjusting the slope of said cam bar to control the length of said stepped feeding movements.

105. In a machine of the character described having an operating mechanism for performing a series of operations spaced from one another upon a shoe upper, the combination with a work holder on which the shoe upper is supported, of a feed mechanism which comprises a feed slide movable in a linear path for imparting feed and return movements to the holder, a feed bar movable in a path substantially perpendicular to the path of movement of the feed slide from a fixed starting position, a sloping cam bar pivotally supported on said feed bar, means for adjustably maintaining the angle of slope of said cam bar, a follower on the feed slide arranged for the starting position of the feed bar to overlie the pivotal connection of the cam bar with the feed bar, means timed with said operating mechanism for imparting successive stepped movements each of predetermined extent to the feed bar, means for returning the feed bar to the initial fixed starting position, and means for adjusting the angle of slope of said cam bar to control the length of said stepped feeding movements.

106. In a machine of the character described, the combination with a work holder on which the shoe upper is supported, of an operating mechanism for performing a series of operations spaced from one another upon the shoe upper, a feed mechanism which comprises a feed slide movable in a linear path for imparting feed and return movements to the holder relative to the operating mechanism, a feed bar movable in a path substantially perpendicular to the path of movement of the feed slide, means including a motion transferring cam means connecting the feed bar with the feed slide, means acting in timed relation with the operating mechanism for effecting successive stepped movements of the feed bar, each of predetermined extent, means acting when rendered operative to return the bar to an initial starting position, and means rendered operative by an element of the bar upon completion of a determined number of stepped movements thereof to render said return means operative to return the bar.

107. In a machine of the character described, the combination with a work holder on which the shoe upper is supported, of an operating mechanism for performing a series of operations spaced from one another upon the shoe upper, a driving and stopping mechanism including a clutch and means arranged for controlling the clutch to stop the operating mechanism in a predetermined position, a feed mechanism which comprises a feed slide movable in a linear path for imparting feed and return movements to the holder, a feed bar movable in a path substantially perpendicular to the path of movement of the feed slide, means including a motion transferring cam means connecting the feed bar with the slide, means acting in timed relation with the operating mechanism for effecting successive stepped movements of the feed bar, each of predetermined extent, means acting when rendered operative to return the bar to an initial starting position, and means rendered operative by an element of the bar upon completion of a determined number of stepped movements thereof to initiate the operation of said stopping mechanism and said means for returning the bar to the initial starting position.

108. In a machine of the character described having an operating mechanism for performing a series of operations spaced from one another upon a shoe upper, and a work holder on which the shoe upper is presented to the operating mechanism, the combination of a feed mechanism for relatively moving the work holder and operating mechanism to present successive portions of the upper to said mechanism, which comprises a feed member movable in a linear path for effecting said relative movement, a feed bar movable in a path substantially perpendicular to the path of movement of the feed member, means for effecting a stepped advance of the feed bar, a slide support movable in a plane parallel to the feed bar, a guideway for said slide support shiftable to vary the spacing between the feed bar and slide support, a cam bar mounted in a sloping position on the feed bar and on said sliding support, a follower connected with the feed member and having sliding engagement with the cam bar, and means for adjusting said guideway to vary the slope of said cam bar and thereby to adjust the stepped feeding movement of the feed member in accordance with the spacing of the pairs of eyelets in the upper.

109. In a machine for lacing shoe uppers, the combination with a work holder for supporting a shoe upper with the lacing margins thereof in an opened-out edge-to-edge relation, of a lacing mechanism comprising a lacing needle arranged for longitudinal reciprocating and transverse positioning movements to pass alternately through the eyelets of the pair, and a looper mechanism cooperating with the needle to form a lacing of enchained loops, guiding means for guiding the work holder in a linear path with relation to the lacing mechanism, and a feed mechanism constructed and arranged to impart stepped advancing movements to the work holder to present successive pairs of eyelets to the lacing mechanism.

110. In a machine for lacing shoe uppers, the combination with a work holder for supporting a shoe upper with the lacing margins thereof in an opened-out edge-to-edge relation, of a lacing mechanism comprising a lacing needle arranged for longitudinal reciprocating and transverse positioning movements to pass alternately through the eyelets of the pair, and a looper mechanism cooperating with the needle to form a lacing of enchained loops, guiding means for guiding the work holder in a linear path with relation to the lacing mechanism, and a feed mechanism comprising a feed member, coupling means for coupling and uncoupling the feed member with the work holder, and means for imparting stepped advancing movements to the feed member and work holder timed with relation to the lacing mechanism to present successive pairs of eyelets to the lacing mechanism.

111. In a machine for lacing shoe uppers, the combination with a work holder for supporting a shoe upper with the lacing margins thereof in an opened-out edge-to-edge relation, of a lacing mechanism comprising a lacing needle arranged for longitudinal reciprocating and transverse positioning movements to pass alternately through the eyelets of the pair, and a looper mechanism cooperating with the needle to form a lacing of enchained loops, guiding means for guiding the work holder in a linear path with relation to the lacing mechanism, feed mechanism constructed and arranged to impart a stepped advancing movement to the support timed with relation to the lacing mechanism to present successive pairs of eyelets to the lacing mechanism, and means for adjusting the length of the successive stepped advancing movements to accord with the spacing of the eyelet pairs.

112. In a machine for lacing shoe uppers, the combination with a work holder for supporting a shoe upper with the lacing margins thereof in an opened-out edge-to-edge relation and with the leading eyelet pair in a predetermined fixed position on the holder, of a lacing mechanism comprising a lacing needle arranged for longitudinal reciprocating and transverse positioning movements to pass alternately through the eyelets of the pair, and a looper mechanism cooperating with the needle to form a lacing of enchained loops, guiding means for guiding the work holder in a linear path with relation to the lacing mechanism, and a feed mechanism comprising a feed member, means for coupling the feed member with the work holder, means for imparting a series of stepped feeding movements to the feed member from a fixed starting position, means for controlling the number of said stepped feeding movements in the series, and means for controlling the length of the stepped feed movements to accord with the spacing of the eyelet pairs.

113. In a machine for lacing shoe uppers, the combination with a work holder for supporting a shoe upper with the lacing margins thereof in an opened-out edge-to-edge relation, of a lacing mechanism comprising a lacing needle arranged for longitudinal reciprocating and transverse positioning movements to pass alternately through the eyelets of the pair, and a looper mechanism cooperating with the needle to form a lacing of enchained loops, guiding means for guiding the work holder in a linear path with relation to the lacing mechanism, feed mechanism comprising a feed member, coupling means for coupling the feed member to the work holder, means for imparting a stepped feed movement to the work holder, and means for controlling the length of the stepped feed movements to accord with the spacing of the eyelet pairs, and driving and stopping mechanism operable in accordance with an automatic cycle for driving the lacing mechanism and for imparting successive stepped feeding movements to the work holder in timed relation thereto, and including means acting after a predetermined number of stepped feeding movements to stop the lacing mechanism.

114. In a machine for inserting lacings through the eyelet pairs along the lacing margins of a shoe upper, which comprises a lacing mechanism operable in accordance with an automatic cycle for lacing a shoe upper including a feed mechanism having a stepped feed timed with relation to the operation of the lacing mechanism to present the eyelet pairs successively to the lacing mechanism, and means acting when rendered operative in said automatic cycle for rendering the lacing mechanism inoperative to pass a lacing through the pair of eyelets adjacent the vamp of the upper.

115. In a machine for lacing shoe uppers, the combination of a lacing mechanism operable in accordance with an automatic cycle for inserting lacings through the eyelet pairs along the lacing margins of a shoe upper including a feed mechanism having a stepped advancing movement timed with relation to the lacing mechanism to present the eyelet pairs successively to the lacing mechanism, a work holder on which the upper is supported with the eyelet pair adjacent the vamp in a leading position to be first acted upon by the lacing mechanism, and means acting when rendered operative during said automatic cycle for rendering the lacing mechanism inoperative to pass a lacing through said first pair of eyelets adjacent the vamp.

116. In a machine for lacing shoe uppers, the combination with a work holder for supporting a shoe upper with the lacing margins thereof in an opened-out edge-to-edge relation, of a lacing mechanism operable in accordance with an automatic cycle for inserting lacings through the eyelet pairs along the lacing margins of the shoe upper from the vamp upwardly including a lacing needle arranged for longitudinal reciprocating and transverse positioning movements to pass alternately through the eyelets of the pair, and a looper mechanism cooperating with the needle to form a lacing of enchained loops, a feed mechanism constructed and arranged to impart stepped advancing movements to the work holder to present successive pairs of eyelets to the lacing mechanism, and means acting when rendered operative during said automatic cycle for rendering the lacing needle inoperative to pass a lacing through said first pair of eyelets adjacent the vamp.

117. In a machine for lacing shoe uppers, the combination with a work holder for supporting a shoe upper with the lacing margins thereof in opened-out edge-to-edge relation, of a lacing mechanism for inserting lacings through the eyelet pairs along the lacing margins including a lacing needle arranged for longitudinal reciprocating and transverse positioning movements to pass alternately through the eyelets of the pair, and a looper mechanism cooperating with the needle, a continuously reciprocating needle driver, a latch connection for the needle shiftable to one position to connect the needle with the driver and to an alternate position to disconnect and to support the needle in a raised inoperative position, a feed mechanism including a feed bar, and means for imparting the stepped advancing movement to the feed bar and work holder connected thereto to present successive pairs of eyelets to the lacing mechanism, and means controlled from said feed bar for rendering the lacing needle inoperative to pass a lacing through a pair of eyelets.

118. In a machine for lacing shoe uppers, a lacing mechanism comprising a lacing needle having a longitudinal reciprocating movement to pass a lacing cord through the eyelets, a continuously reciprocating needle driver, a latch connection shiftable to one position to connect the needle to be driven by the driver and to an alternate position to disconnect and support the needle in a raised inoperative position, a feed device timed with relation to the lacing mechanism for imparting stepped feeding movements to the upper to present successive pairs of eyelets to the lacing mechanism, and means controlled from the feed device for actuating said latch connection to connect and to disconnect the needle to cause the lace to be omitted from a predetermined pair of eyelets.

119. In a machine for lacing eyeleted shoe uppers, a work holder on which an upper is located with the lacing margins in an opened-out edge-to-edge relation, a lacing mechanism for inserting lacings in the series of eyelet pairs comprising lace inserting means arranged to be registered with each eyelet of a pair for lacing together the lacing margins of the upper, feed mechanism acting in timed relation with the lacing mechanism for imparting relative positioning movements to the work holder and lace inserting means to present successive pairs of eyelets of the upper to the lacing mechanism, and means operative during said relative feedings movements to register the eyelets with the lace inserting means including means adjustable to accord with variations in the spacing between eyelets of the respective pairs.

120. In a machine for lacing eyeleted shoe uppers, a work holder on which an upper is located with the lacing margins in an opened-out edge-to-edge relation, a lacing mechanism comprising a lacing needle arranged for longitudinal reciprocating and transverse positioning movements to pass alternately through the eyelets of the pair, a looper mechanism cooperating with the needle, feed mechanism acting in timed relation to the lacing mechanism for imparting stepped feeding movements to the work holder to present successive pairs of eyelets to the lacing mechanism, means for varying the extent of the transverse positioning movements of the needle, and means controlled from the feed mechanism for altering said extent of transverse positioning movements in accordance with the widthwise spacing of the eyelets of any of said successive pairs.

121. In a machine for lacing eyeleted shoe uppers, a work holder having means for securing the lacing margins in an opened-out edge-to-edge relation, and means for guiding the work holder along a linear path, the combination of a lacing mechanism comprising a lacing needle arranged for longitudinal reciprocating and transverse positioning movements to pass alternately through the eyelets of a pair, and a looper mechanism cooperating with the needle, a feed mechanism comprising a feed member movable with the work holder, a feed bar movable in a path intersecting the path of movement of the feed member, means for effecting a stepped advancing movement of the feed bar, cam means connecting the feed bar to the feed member to impart a stepped feeding movement to the feed member, and means comprising a cam member movable with the bar and connections therefrom for controlling the amplitude of the transverse positioning movements of the needle to accord with the spacing of the eyelets of successive pairs.

122. In a machine for lacing eyeleted shoe uppers, a work holder having means for securing the lacing margins in an opened-out edge-to-edge relation, and means for guiding the work holder along a linear path, the combination of a lacing mechanism comprising a lacing needle, means for imparting longitudinal eyelet piercing reciprocating movements to the needle, means for imparting transverse positioning movements to the needle to cause the needle to pass alternately through the eyelets of the pair, and a looper mechanism cooperating with the needle, a feed mechanism comprising a feed member movable with the work holder, a feed bar movable in a path intersecting the path of movement of the feed member, means for effecting a stepped advancing movement of the feed bar, cam means connecting the feed bar to the feed member to impart a stepped feeding movement to the feed member, and means comprising a cam member movable with the bar and connections from the cam member acting on said needle transverse positioning means for controlling the amplitude of the transverse positioning movements of the needle to accord with the spacing of the eyelets of successive pairs.

123. In a machine for lacing eyeleted shoe uppers, the combination with a work holder, of a lacing mechanism comprising a lacing needle arranged for longitudinal reciprocatory and transverse vibratory positioning movements, and a looper mechanism cooperating therewith to form lacings of enchained loops through the eyelet pairs, a feed mechanism for imparting a stepped advancing movement to the work holder, and driving connections including a common actuator having an oscillatory movement for vibrating the needle and for imparting said stepped advancing movements to the work holder.

124. In a machine for lacing eyeleted shoe uppers, the combination with a work holder, of a lacing mechanism comprising a lacing needle arranged for longitudinal reciprocatory and transverse vibratory positioning movements, and a looper mechanism cooperating therewith, said lacing mechanism being operable in accordance with an automatic cycle to form a lacing of enchained loops through each of a series of eyelet pairs, a feed mechanism comprising a feed element to which is imparted a stepped movement to advance the work holder, and driving connections including a common actuator having an oscillatory movement, connections therefrom for vibrating the needle and connections therefrom acting when rendered operative for imparting a stepped advancing movement to the work holder, and means timed with relation to the operation of said needle at the completion of each lace forming cycle for rendering said connections from the common actuator operative to advance the work holder.

125. In a machine for lacing eyeleted shoe uppers, the combination of a work holder on which the shoe upper is located with the lacing margins thereof in an opened-out edge-to-edge relation, a lacing mechanism comprising a lacing needle arranged for longitudinal reciprocatory and transverse vibratory positioning movements, and a looper mechanism cooperating therewith in accordance with an operating cycle to form a lacing of enchained loops through each eyelet pair of a series, a feed mechanism for imparting a stepped advancing movement to the work holder to present successive pairs of eyelets to the lacing mechanism comprising a feed member movable in a linear path for advancing the work holder, a feed bar movable in a path substantially perpendicular to the path of movement of the feed member, and motion transmitting means connecting the feed bar to the feed member to advance the feed member, and driving connections including a common actuator having an oscillatory movement, connections therefrom for v'brating the needle, and connections therefrom including a reciprocating feed pawl acting when rendered operative for imparting stepped advancing movements to the work holder, and means acting in timed relation with the movement of the needle upon completion of a lace forming cycle for rendering said pawl operative to impart a stepped advancing movement to said feed bar.

126. In a machine for lacing eyeleted shoe uppers, a lacing mechanism operable in accordance with a recurring cycle of operation for the insertion of a lace consisting of four enchained loops through the eyelets of a pair, which comprises a lacing needle arranged for longitudinal reciprocatory and transverse vibratory movements, a looper mechanism, a feed device for imparting stepped feeding movements to the shoe upper to present successive pairs of eyelets to the lacing mechanism, and driving connections for said lacing mechanism comprising a main driving element for reciprocating the needle, a secondary driving element connected to be driven at half the speed of the main driving element for vibrating the needle, and a third driving element connected to be driven at one-fourth the speed of the main driving element controlling said feed device to impart a stepped feeding movement to the needle.

127. In a machine for lacing eyeleted shoe uppers, a lacing mechanism operable in accordance with a recurring cycle of operation for the insertion of a lace consisting of four enchained loops through the eyelets of a pair, which comprises an eye lacing needle arranged for longitudinal reciprocatory and transverse vibratory movements, a looper mechanism cooperating with the needle, a feed device for imparting stepped feeding movements to the shoe upper to present successive pairs of eyelets to the lacing mechanism, a machine stop motion, a main driving element connected to reciprocate the needle, a second driving element driven at one-half the speed of the main driving element connected to vibrate the needle and to feed the upper, and a driving element driven at one-quarter the speed of the main driving element connected to control the operation of the feed mechanism and the machine stop motion in timed relation with said cycle of operation.

128. In a machine for lacing eyeleted shoe uppers, having a lacing mechanism operable in accordance with a recurring cycle of operation for the insertion of a lace consisting of four enchained loops passing through the eyelets of a pair, which comprises a lacing needle arranged for longitudinal reciprocating and lateral oscillatory movements, a looper mechanism, a feed device comprising a feed element arranged for stepped feeding movements to present successive pairs of eyelets to the lacing mechanism, driving connections for the lacing mechanism comprising a main driving element, a secondary driving element connected to be driven at half the speed of the main driving element, a third driving element driven at one-fourth the speed of the main driving element, and feed actuating means comprising a feed element actuating connection having a reciprocating motion from said half speed driving shaft, and control means actuated from said third driving element for connecting said actuating connection with the feed element during alternate reciprocations only.

129. In a machine for lacing shoe uppers, a lace forming mechanism operable in accordance with a recurring loop forming cycle to form a lacing of enchained loops of lacing cord passing through the eyelets of a pair which comprises a reciprocatory needle having longitudinal advancing and retracting movements, and looper mechanism cooperating therewith, a holding device for holding the leading end of the lacing cord, a tension device for tensioning the lacing cord from the supply, means for relieving the tension periodically during a portion of each loop forming cycle, and means operable during the initial eyelet entering movement of the needle in lacing a shoe upper to relieve the tension during an additional portion of the loop forming cycle, and thereby to relieve the strain exerted on the lacing cord by the stitch forming devices against the action of said holding device.

130. In a machine for lacing eyeleted shoe uppers, a lace forming mechanism comprising a reciprocable eye needle and a looper mechanism cooperating therewith to insert a series of enchained loops of lacing cord through the eyelets of an eyeleted shoe upper, a holding device for holding the leading end of the lacing cord, a tension device, means for relieving the tension periodically during each retracting stroke of the needle, and means operable during the initial work entering stroke of the needle in lacing a shoe upper to relieve the tension during at least a portion of said needle work entering stroke.

131. In a machine for lacing eyeleted shoe uppers, a lace forming mechanism comprising a needle and a looper mechanism cooperating therewith to form a series of enchained loops of lacing cord passing through the eyelets of an eyeleted shoe upper, a driving and stopping mechanism for the machine, a holding device for holding the leading end of the lacing cord, a tension device, means for relieving the tension periodically during each retracting stroke of the needle, a second tension relieving means including an actuator moving in timed relation with the reciprocation of the needle, and connections therefrom acting when rendered operative for relieving the tension during the latter portion of the downward movement of the needle, and control means actuated by said stop mechanism in stopping the machine for rendering said connections operative to relieve the tension during the initial needle work piercing stroke.

132. In a machine for lacing eyeleted shoe uppers, a lace forming mechanism comprising an eye needle and a looper mechanism cooperating therewith to insert a series of enchained loops of lacing cord through the eyelets of an eyeleted shoe upper, a driving and stopping mechanism for the machine, a severing and holding device for the lacing cord, a tension device, means for relieving the tension periodically during each retracting stroke of the needle, and a second tension relieving device comprising a cam moving in timed relation to the needle, a cam follower, and connections including a motion transmitting latch operable when connected to release the tension during the latter portion of the work piercing stroke of the needle, and control means rendered operative by said driving and stopping mechainsm in stopping the machine to connect the latch, and means rendered operative upon completion of the initial advancing stroke of the needle to disengage the latch.

133. In a machine for lacing eyeleted shoe uppers, the combination with a work holder on which the shoe upper is mounted, of a lace forming mechanism comprising a reciprocable eye needle, and a looper mechanism cooperating therewith, a feed mechanism operable in accordance with an automatic cycle for imparting a stepped advancing movement to the supported upper for the insertion of lacings in successive eyelet pairs of a series, means acting when rendered operative to render the needle inoperative during the initial lace forming cycle, a holding device for holding the leading end of the lacing cord, a cord tensioning device, means for relieving the tension periodically during each retracting stroke of the needle, a second tension relieving device acting when rendered operative to relieve the tension during an additional preceding portion of the needle stroke including a portion of the initial down draw movement thereof, a driving and stopping mechanism for the machine, and control means rendered operative by said driving and stopping mechanism in stopping the machine to render said latter tension relieving device operative.

134. In a machine for lacing eyeleted shoe uppers, a lace forming mechanism operable in accordance with a recurring loop forming cycle to form a lacing of enchained loops passing through the eyelets of a pair, including a needle reciprocable for passing the lacing cord through the eyelets, a holding device for holding the leading end of the lacing cord, tensioning means for tensioning the lacing cord from the supply, means for relieving the tension periodically during a portion of each loop forming cycle, means for relieving the tension during an additional portion of the cycle, and means actuated by the reciprocatory movement of the needle for rendering said latter tensioning means operative.

135. In a lacing machine, a needle having longitudinal reciprocatory and lateral vibratory movements for passing a lacing cord through the eyelets of a pair, means for imparting longitudinal reciprocatory movements to the needle, and means for imparting vibratory movements of variable extent to the needle, comprising a driving member having a vibratory movement of fixed extent, a pair of links pivoted to one another and connected respectively with said member and with the needle for transmitting said vibratory movements to the needle, and means determining the path of movement of the pivotal connection of said links, including means for varying said path to correspondingly vary the extent of the needle vibration.

136. In a lacing machine, a needle having longitudinal reciprocatory and lateral vibratory movements for passing a lacing cord through the eyelets, means for imparting longitudinal reciprocatory movements to the needle, and means for imparting vibrations of variable extent to the needle, said latter means comprising a driving member having a vibratory movement of fixed extent, a pair of links pivoted to one another and connected respectively with said member and with the needle for transmitting said vibratory movements to the needle, a radius arm connected to control the path of movement of the pivotal connection of said links, a supporting pivot for the radius arm, and means for moving said pivot to vary the extent of the needle vibration.

137. In a lacing machine, an eye needle having longitudinal reciprocatory movements and lateral vibratory movements about a transverse axis for passing a lacing cord through the eyelets, and a looper mechanism cooperating therewith comprising a pair of looper arms supported to rock as a unit about a single pivot, a pivotal support for the looper arms movable with the needle about said transverse vibratory axis of the needle as a center, a pair of loop spreaders supported for movement toward and away from the looper members, and means for vibrating the needle and looper pivotal support in unison about said transverse vibratory axis.

138. In a lacing machine, an eye needle having longitudinal reciprocatory movements and lateral vibratory movements about a transverse axis for passing a lacing cord through the eyelets, and a looper mechanism cooperating therewith comprising a pair of looper arms supported to rock as a unit about a single pivot, a pivotal support for the looper arms movable with the needle about said transverse vibratory axis of the needle as a center, a pair of loop spreaders supported for movement toward and away from the looper members, means for actuating the needle and the looper mechanism with relation thereto to form and to draw in a series of enchained loops passing through the eyelets of a pair, means for vibrating the needle and looper pivotal support in unison about said transverse vibratory axis, and means for varying the amplitude of vibration of the needle and looper mechanism therewith.

139. In a lacing machine comprising a lacing mechanism including a lace inserting needle, a looper mechanism cooperating therewith, a work holder, and means for imparting relative stepped feeding movements to the holder and lacing mechanism to present successive eyelet pairs to the lacing mechanism, the combination of a lacing cord clamping device comprising a stationary clamping element, a movable clamping element operative upon stopping the machine to engage and clamp the cord against the stationary member and upon starting of the machine to disengage the cord, and a second movable clamping element operative upon disengagement of said first-mentioned movable member to clamp the lacing cord.

140. In a lacing machine comprising a lacing mechanism including a lace inserting eye needle having longitudinally reciprocatory and lateral vibratory movements, a looper mechanism, a work holder, and means for imparting relative stepped feeding movements to the holder and lacing mechanism to present successive eyelet pairs to the lacing mechanism, and a driving and stopping mechanism, the combination of a lacing cord clamping device comprising a stationary clamping element located at the side of the work with the needle and to that side of the needle from which the work is fed, a movable clamping element operative in stopping the machine to engage a portion of the lacing cord extending from the needle to the work against said stationary member and upon starting the machine to disengage the cord, and a second movable clamping element operative upon disengagement of said first-mentioned movable clamping element to engage the cord against the stationary clamping member.

141. In a lacing machine comprising a lacing mechanism including a lace inserting needle and a looper mechanism, a work holder and means for imparting relative stepped feeding movements to the holder and lacing mechanism to present successive eyelet pairs to the lacing mechanism, the combination of a cord clamping device which comprises a vertically yieldable stationary clamping member, a movable clamping member rendered operative in stopping the machine to engage the lacing cord against said yieldable stationary member and upon starting the machine to disengage the cord, and a second movable member controlled with respect to said first-mentioned movable member to engage the cord against the stationary member when the first-mentioned movable member is moved away therefrom.

142. In a lacing machine comprising a lacing mechanism including a lace inserting needle and a looper mechanism, a work holder and means for imparting relative stepped feeding movements to the holder and lacing mechanism to present successive eyelet pairs to the lacing mechanism, the combination of a lacing cord clamping device which comprises a vertically yieldable stationary clamping member, a movable clamping member and means for moving said clamping member into clamping relation beneath said yieldable stationary member to clamp the cord in stopping the machine and for moving the clamping member to disengage the cord upon starting the machine, a second movable clamping member controlled with relation to said first-mentioned movable clamping member for movement into clamping relation beneath the stationary member when the first-mentioned movable clamping member is moved to disengage the cord, and means acting on said vertically yieldable member for varying the holding tension of said clamping device upon the held lacing cord.

143. In a lacing machine comprising a lacing mechanism including a lace inserting needle and a looper mechanism operative in accordance with a recurring cycle for inserting a group of enchained loops through the eyelets of a pair, a work holder and means for imparting relative stepped feeding movements to the holder and lacing mechanism to present successive eyelet pairs to the lacing mechanism, the combination of a cord clamping device comprising a vertically yieldable stationary clamping member, a cooperating clamping member movable into engagement with and beneath said yieldable member to clamp the lacing cord, a second movable clamping member movable in alternation with said first-mentioned movable member into clamping engagement beneath said yieldable stationary member to clamp the cord, and means acting when rendered operative during the formation of the initial enchained loop of a group for moving said yieldable member downwardly under increased pressure to hold the lacing cord during the formation of the initial enchained loop of the group.

144. An eyeleting machine comprising a movable work-holder having duplex clamping means arranged to clamp both quarters of a shoe-upper in edge-to-edge relation in a common plane, duplex power-driven mechanism arranged to punch holes and insert eyelets one at a time in each quarter but in both at once, and power-driven means arranged to feed the work-holder step by step with respect to said punching and eyelet-inserting means.

145. An eyeleting machine comprising a movable work-holder having means arranged to clamp a shoe-upper, power-driven mechanism arranged to punch holes and insert eyelets into an upper so clamped, power-driven means arranged to feed the work-holder step by step in one direction from a starting position and release the work-holder in consequence of imparting a series of feeding steps thereto, and power-operated means arranged to move the work-holder in the opposite direction to the starting position without interruption.

146. An eyeleting machine comprising a movable work-holder having means arranged to clamp a shoe-upper, power-driven mechanism arranged to punch holes and insert eyelets in an upper so clamped, power-driven mechanism arranged to feed the work-holder step by step in one direction, said feeding mechanism including a coupler, means actuated by the feeding mechanism to uncouple said coupler at a predetermined point in the feeding range of the work-holder, and yieldable means arranged to move the work-holder in the reverse direction to a starting position in consequence of uncoupling the coupler.

147. An eyeleting machine comprising a clutch, punching and eyelet-inserting means driven thereby, means driven by said clutch for feeding a work-piece step by step with respect to said punching and eyelet-inserting means, said feeding means including a coupler, means operable by said clutch for declutching the latter, and means operable by said work-feeding means to uncouple said coupler and initiate the operation of said declutching means.

148. An eyeleting machine comprising a punch having a shoulder for upsetting an eyelet, a plunger, an eyelet-inserting tool carried by said plunger, a bearing member by which said plunger is guided, a punch-bed carried by said bearing member, power-driven mechanism for shifting said bearing member to and fro to place the punch-bed and the fastener-inserting tool alternately in cooperative relation to the punch, power-driven mechanism for operating the punch and the fastener-inserting plunger, and power-driven mechanism arranged to feed a work-piece with respect to the punching and eyelet-inserting elements.

149. An eyeleting machine comprising a punch having a shoulder for upsetting an eyelet, a toggle for operating the punch, the toggle having a knee pivot, a crank, a link connecting the crank and the toggle for moving the knee pivot thereof through a range of which the dead-center position is approximately midway to obtain four strokes of the punch for each revolution of the crank, a plunger having an eyelet-inserting tool, a bearing member in which the plunger is arranged, a punch-bed carried by the bearing member, means for shifting the bearing member to and fro to place the punch-bed and the eyelet-inserting tool alternately in cooperative relation to the punch, and means operable by said crank for imparting operating movement to said plunger.

150. An eyeleting machine comprising a punch having a shoulder for upsetting an eyelet, a punch-bed and an eyelet-inserting tool arranged to cooperate alternately with the punch, means arranged to shift the punch-bed and the eyelet-inserting tool alternately to and from alignment with the punch, a crank, means operable by the crank to move the punch toward and from the punch-bed and thereafter toward and from the eyelet-inserting tool in each revolution of the crank, and means operable by the same crank to move the eyelet-inserting tool toward and from the punch while in alignment therewith.

151. An eyeleting machine comprising punching and eyelet-inserting means, a work-holder, means for guiding the work-holder along a path cooperatively related to the punching and eyelet-inserting means, a feed cam, power-drive means for moving said cam with periodic steps in one direction, yieldable means arranged to move the cam in the opposite direction, means operable by the feed cam for imparting steps of feeding movement to the work-holder, means arranged to release the feed cam from the effect of said power-drive means after an arbitrary number of feeding steps thereof, the releasing means being actuated by said power-drive means, and power-driven means for operating the punching and eyelet-inserting means in accordance with the feeding steps of said cam.

152. An eyeleting machine comprising duplex punching and eyeleting means arranged side by side, a work-holder having means for maintaining the lacing margins of a shoe upper in substantially edge-to-edge relation in a common plane, work-feeding mechanism including a straight cam capable of moving the work-holder through a total range as long as the lacing margins, a member by which one end of said cam is carried in a straight path, means for adjusting the cam relatively to said carrying member to regulate its steepness, and power-driven means for imparting a series of operating cycles to the punching and eyelet-inserting means and periodic steps of work-feeding movement in one direction to said carrying member.

153. An eyeleting machine comprising mechanism arranged to punch holes and insert eyelets one at a time, a work-holder, power-driven means arranged to transfer the work-holder from a loading station to a punching and eyeleting station, mechanism arranged to feed the work-holder step by step at said punching and eyeleting station, said feeding mechanism including adjustable means for regulating the length of the feeding steps, manually adjustable gauging means arranged to locate a work-piece at said loading station with respect to the work-holder, an adjustable actuator for setting said feed-regulating means with variable extent of regulating effect, connections operable by said gauging means for adjusting said actuator in accordance with the setting of the gauging means, and means operatively coupled with said transferring means for imparting setting movement to said actuator.

154. An eyeleting machine comprising a punching plunger having a combined punch and eyelet-setting tool, an eyelet-inserting plunger having an eyelet-inserting tool, a bearing member having a punch-bed and means for guiding said eyelet-inserting plunger, mechanism arranged to shift the bearing member to and fro to place the punch-bed and the eyelet-inserting tool alternately in alinement with the tool first specified, toggle mechanisms arranged to move said punching plunger and said bearing member toward and from each other, and mechanism arranged to impart individual operating movement to said eyelet-inserting plunger.

155. An eyeleting machine comprising duplex punching and eyelet-inserting means arranged side by side to operate simultaneously on two eyelet rows in a common plane, means for adjusting them toward and from each other to regulate the distance between the eyelets of each pair, a pair of raceways arranged to supply eyelets to the eyelet-inserting means, and means by which the eyelet-inserting means and the raceways are coupled to adjust the delivery ends of the raceways in accordance with the spacing of the eyelet-inserting means.

156. An eyeleting machine comprising a punching member provided with a combined punch and setting tool, a plunger provided with an eyelet-inserting tool, a movable bearing member in which said plunger is guided, a punch-bed carried by said bearing member, and power-operated means arranged to shift said bearing member back and forth to place the punch-bed and the eyelet-inserting tool alternately in register with the combined punch and setting tool.

157. An eyeleting machine comprising a punching member provided with a combined punch and setting tool, a movable bearing member, a punch-bed and an eyelet-inserting member arranged one beside the other in said bearing member, power-operated means arranged to shift said bearing member back and forth to place the punch-bed and the eyelet-inserting member alternately in register with said combined punch and setting tool, power-driven means arranged to move the bearing member toward and from the combined punch and setting tool when the punch-bed is in register therewith, and power-driven means arranged to move the eyelet-inserting member toward and from the combined punch and setting tool when they are in register with each other.

158. An eyeleting machine comprising a punching member provided with a combined punch and setting tool, an eyelet-inserting member, a bearing member in which the latter is guided, a punch-bed affixed to said bearing member, power driven means arranged to shift said bearing member back and forth to place the punch-bed and the eyelet-inserting member alternately in register with the punch, power-driven means arranged to move said bearing member toward and from the punch when the punch-bed is in register therewith, power-driven means including a rotary crank and a connecting rod carried thereby, a toggle operable by said connecting rod for moving the punch against the punch-bed, and means also operable by said connecting rod for operating said eyelet-inserting member.

159. An eyeleting machine comprising a punching member provided with a combined punch and setting tool, a punch-bed, an eyelet-inserting member, power-driven means arranged to shift the punch-bed and the eyelet-inserting member to place them alternately in register with the punch, a toggle engaging said punching member, power-driven means arranged to move the knee of the toggle across its dead center in one direction to punch a hole and in the opposite direction to clench an eyelet, and power-driven means arranged to shift the entire toggle toward the plane of the work for each clenching operation and away from that plane for each punching operation.

160. An eyeleting machine comprising a punching member, a punch-bed, a bearing member by which the punch-bed is carried, an eyelet-inserting member guided by said bearing member, power-driven means for shifting said bearing member to place the punch-bed and the eyelet-inserting member alternately in register with the punch, power-driven means including a toggle arranged to move said bearing member toward and from the punching member, power-driven means arranged to operate the punching member, and power-driven means arranged to operate the eyelet-inserting member.

JOSEPH FOSSA.

REFERENCES CITED

The following references are of record in the file of this patent:

UNITED STATES PATENTS

| Number | Name | Date |
|---|---|---|
| 1,136,166 | Prime | Apr. 20, 1915 |
| 1,366,417 | Preo et al. | Jan. 25, 1921 |
| 1,958,536 | Fossa | May 15, 1934 |
| 1,989,682 | Coffey | Feb. 5, 1935 |
| 1,991,138 | Christie | Feb. 12, 1935 |
| 2,056,961 | Fossa et al. | Oct. 13, 1936 |
| 2,056,962 | Fossa et al. | Oct. 13, 1936 |
| 2,106,320 | Fossa | Jan. 25, 1938 |
| 2,144,722 | Hooper | Jan. 24, 1939 |
| 2,175,005 | Fossa | Oct. 3, 1939 |
| 2,182,021 | Gookin | Dec. 5, 1939 |
| 2,300,499 | Gookin | Nov. 3, 1942 |
| 2,311,165 | Fossa | Feb. 16, 1943 |
| 2,325,137 | Keaney | July 27, 1943 |
| 2,383,538 | Fossa | Aug. 28, 1945 |

FOREIGN PATENTS

| Number | Country | Date |
|---|---|---|
| 55,472 | Germany | Feb. 28, 1891 |
| 501,845 | Great Britain | Mar. 6, 1939 |